United States Patent [19]

Engeler

[11] Patent Number: 5,167,008
[45] Date of Patent: Nov. 24, 1992

[54] DIGITAL CIRCUITRY FOR APPROXIMATING SIGMOIDAL RESPONSE IN A NEURAL NETWORK LAYER

[75] Inventor: William E. Engeler, Scotia, N.Y.

[73] Assignee: General Electric Company, Schenectady, N.Y.

[21] Appl. No.: 752,290

[22] Filed: Aug. 29, 1991

Related U.S. Application Data

[62] Division of Ser. No. 628,257, Dec. 14, 1990, Pat. No. 5,115,492.

[51] Int. Cl.$^5$ .............................................. G06F 15/18
[52] U.S. Cl. ................................ 395/27; 364/715.01; 364/602; 395/24
[58] Field of Search ............... 395/27, 24; 364/715.01, 364/716, 729, 602

[56] References Cited

U.S. PATENT DOCUMENTS

| | | | |
|---|---|---|---|
| 4,156,284 | 5/1979 | Engeler | 364/862 |
| 4,807,168 | 2/1989 | Moopenn et al. | 364/602 |
| 4,866,645 | 9/1989 | Lish | 364/602 |
| 4,873,661 | 10/1989 | Tsividis | 364/807 |
| 4,888,721 | 12/1989 | Kondoh et al. | 364/736 |
| 4,896,287 | 1/1990 | O'Donnell et al. | 364/754 |
| 4,903,226 | 2/1990 | Tsividis | 364/807 |
| 4,931,674 | 6/1990 | Kub et al. | 307/529 |
| 4,941,122 | 7/1990 | Weideman | 364/807 |
| 4,988,891 | 1/1991 | Mashiko | 307/201 |

OTHER PUBLICATIONS

Eberhardt et al., "Design of Parallel Hardware Neural Network Systems From Custom Analog VLSI 'Building Block' Chips", IJCNN, 1989, pp. II-183-190.
Schwartz et al., "A Programmable Analog Neural Network Chip", IEEE Jour. Solid-State Circuits, vol. 24(3), 1989, 688-697.
Kub et al., "Programmable Analog Vector-Matrix Multipliers", IEEE Jour. Solid-State Circuits, vol. 25(1), 1990, 207-214.
Schwartz, T. J., "A Neural Chips Survey", AI Expert, Dec. 1990, pp. 34-39.
Fu et al., "A Universal Digital VLSI Design for Neural Networks", IJCNN, 1989.

Primary Examiner—Michael R. Fleming
Assistant Examiner—Robert W. Downs
Attorney, Agent, or Firm—Marvin Snyder

[57] ABSTRACT

A plurality of neural circuits are connected in a neural network layer for generating their respective digital axonal responses to the same plurality of synapse input signals. Each neural circuit includes digital circuitry for approximating a sigmoidal response connected after respective circuitry for performing a weighted summation of the synapse input signals to generate a weighted summation result in digital form. In this digital circuitry the absolute value of the digital weighted summation result is first determined. Then, a window comparator determines into which of a plurality of amplitude ranges the absolute value of the weighted summation result falls. A digital intercept value and a digital slope value are selected in accordance with the range into which the absolute value of the weighted summation result falls. The absolute value of the digital weighted summation result is multiplied by the selected digital slope value to generate a digital product; and the digital intercept value is added to the digital product to generate an absolute value representation of a digital axonal response. The polarity of the weighted summation result is determined, and the same polarity is assigned to the absolute value representation of the digital axonal response, thereby to generate the digital axonal response.

4 Claims, 37 Drawing Sheets

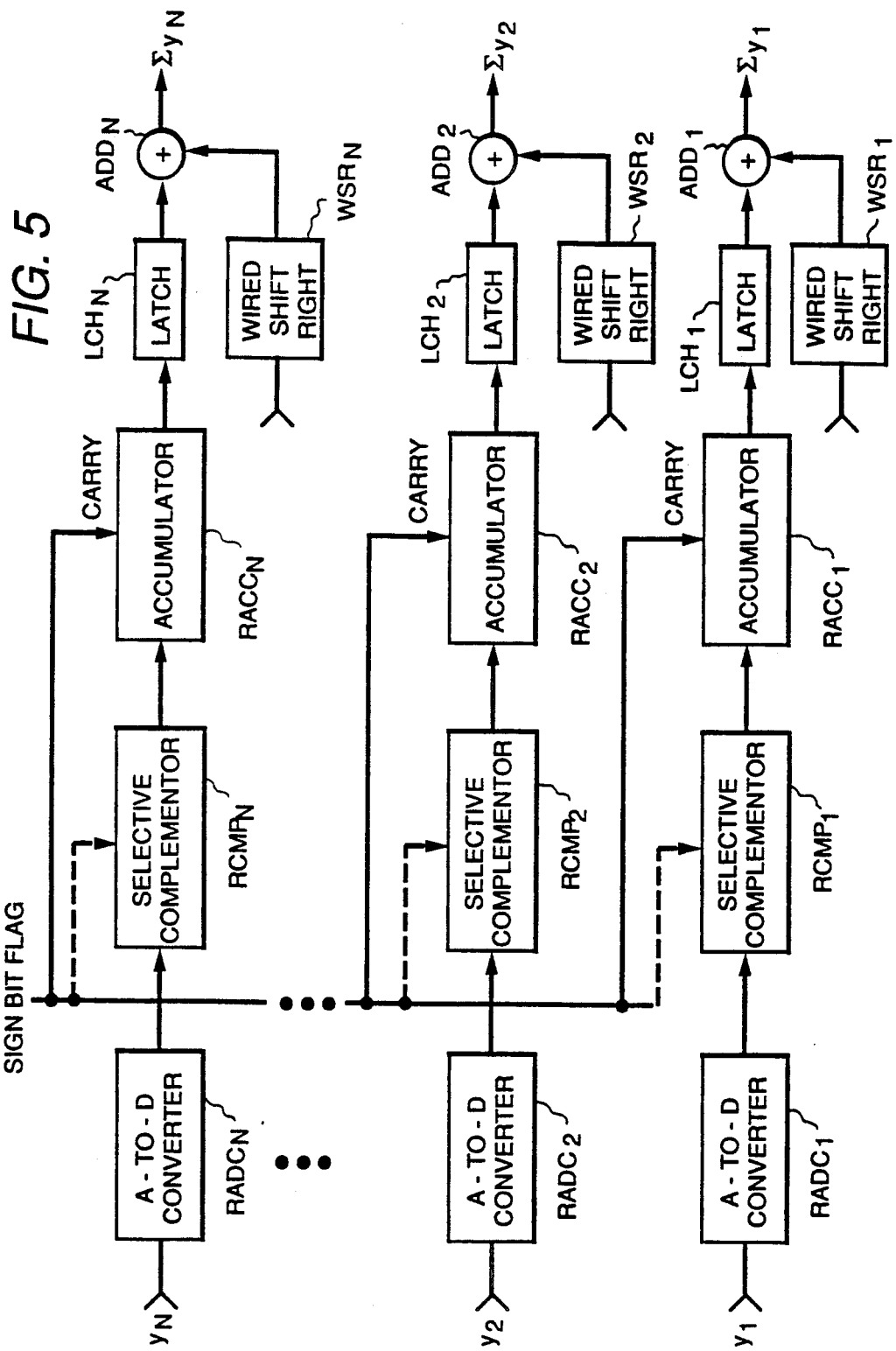

DIGITAL CIRCUITRY FOR APPROXIMATING SIGMOIDAL RESPONSE IN A NEURAL NETWORK LAYER

This is a division of Ser. No. 628,257 filed Dec. 14, 1990 now U.S. Pat. No. 5,115,492 issued May 19, 1992.

The invention relates to analog computer structures that perform correlations of sampled-data functions and can be incorporated into neural networks which emulate portions of a brain in operation, and more particularly, to adapting such analog computer structures for use with digital electronic circuits.

BACKGROUND OF THE INVENTION

Computers of the von Neumann type architecture have limited computational speed owing to the communication limitations of the single processor. These limitations can be overcome if a plurality of processors are utilized in the calculation and are operated at least partly in parallel. This alternative architecture, however, generally leads to difficulties associated with programming complexity. Therefore, it is often not a good solution. Recently, an entirely different alternative that does not require programming has shown promise. The networking ability of the neurons in the brain has served as a model for the formation of a highly interconnected set of analog processors, called a "neural network" or "neural net" that can provide computational and reasoning functions without the need of formal programming. The neural nets can learn the correct procedure by experience rather than being preprogrammed for performing the correct procedure. The reader is referred to R. P. Lippmann's article "An Introduction to Computing With Neural Nets" appearing on pages 4–21 of the April 1987 IEEE ASSP MAGAZINE (0740-7467/87/0400/-0004/$10.00" 1987 IEEE), incorporated herein by reference, for background concerning neural nets.

Neural nets are composed of a plurality of neuron models, processors each exhibiting "axon" output signal response to a plurality of "synapse" input signals. In a type of neural net called a "perceptron", each of these processors calculates the weighted sum of its "synapse" input signals, which are respectively weighted by respective weighting values that may be positive- or negative-valued, and responds non-linearly to the weighted sum to generate the "axon" output response. This relationship may be described in mathematical symbols as follows.

$$v_j = f\left(\sum_{i=1}^{M} W_{i,j} X_i\right) \quad j = 1, 2, \ldots N \quad (1)$$

Here, i indexes the input signals of the perceptron, of which there are an integral number M, and j indexes its output signals, of which there are an integral number N. $W_{i,j}$ is the weighting of the $i^{th}$ input signal as makes up the $j^{th}$ output signal at such low input signal levels that the function $$f\left(\sum_{i=1}^{M} W_{i,j} X_i\right)$$

is approximately linear. At higher absolute values of its argument, the function $$f\left(\sum_{i=1}^{M} W_{i,j} X_i\right)$$

no longer exhibits linearity but rather exhibits a reduced response to $$\sum_{i=1}^{M} W_{i,j} X_i.$$

This type of non-linear response is termed "sigmoidal". The weighted summation of a large number of sampled-data terms can be viewed as the process of correlating the sampled-data function described by those sampled-data terms with the sampled-data function described by the pattern of weights; and the analog processor used as a neuron model in a "perceptron" can be viewed as a correlator with non-linear circuitry exhibiting a sigmoidal response connected thereafter.

A more complex artifical neural network arranges a plurality of perceptrons in hierarchic layers, the output signals of each earlier layer providing input signals for the next succeeding layer. Those layers preceding the output layer providing the ultimate output signal(s) are called "hidden" layers.

In the present-day development of the integrated electronic circuitry art, the weighted summation of a large number of terms, each of which has resolution that would require plural-bit digital sampling, can be done appreciably faster and at less cost in integrated circuit die area by processing in the analog regime rather than in the digital regime. Using capacitors to perform weighted summation in accordance with Coulomb's Law provides neural nets of given size operating at given speed that consume less power than those the analog processors of which use resistors to implement weighted summation in accordance with Ohm's Law. Y. P. Tsividis and D. Anastassion in a letter "Switched-Capacitor Neural Networks" appearing in ELECTRONICS LETTERS, Aut. 27th 1987, Vol. 23, No. 18, pages 958,959 (IEE) describe one method of implementing weighted summation in accordance with Coulomb's Law. Their method, a switched capacitor method, is useful in analog sampled-data neural net systems. Methods of implementing weighted summation in accordance with Coulomb's Law that do not rely on capacitances being switched and avoid the complexity of the capacitor switching elements and associated control lines are also known.

U.S. patent application Ser. No. 366,838 entitled "NEURAL NET USING CAPACITIVE STRUCTURES CONNECTING INPUT LINES AND DIFFERENTIALLY SENSED OUTPUT LINE PAIRS" describes a type of neural net in which each analog synapse input signal voltage drives a respective input line from a low source impedance. Each input line connects via a respective weighting capacitor to each of a plurality of output lines. The output lines are paired, with the capacitances of each pair of respective weighting capacitors connecting a pair of output lines to one of the input lines summing to a prescribed value. A respective pair of output lines is associated with each axonal output response to be supplied from the neural net, and the differential charge condition on each pair of output lines is sensed to generate a voltage that describes a weighted summation of the synapse input signals supplied to the neural net. A respective operational amplifier connected as a Miller integrator can be used for sensing the differential charge condition on each pair of output lines. Each weighted summation of the synapse input signals is then non-linearly processed in a circuit with sigmoidal transfer function to generate a respective axonal output response. This type of neural net is particularly well-suited for use where all input synapse signals are always of one polarity, since the single-polarity synapse input signals may range over the entire operating supply.

U.S. patent application Ser. No. 366,839 entitled "NEURAL NET USING CAPACITIVE STRUCTURES CONNECTING OUTPUT LINES AND DIFFERENTIALLY DRIVEN INPUT LINE PAIRS" describes a type of neural net in which each analog synapse input signal voltage is applied in push-pull from low source impedances to a respective pair of input lines. Each pair of input lines connect via respective ones of a respective pair of weighting capacitors to each of a plurality of output lines. The capacitances of each pair of respective weighting capacitors connecting a pair of input lines to one of the output lines sum to a prescribed value. Each output line is associated with a respective axonal output response to be supplied from the neural net, and the charge condition on each output line is sensed to generate a voltage that describes a weighted summation of the synapse input signals supplied to the neural net. A respective operational amplifier connected as a Miller integrator can be used for sensing the charge condition on each output line. Each weighted summation of the synapse input signals is then non-linearly processed in a circuit with sigmoidal tranfer function to generate a respective axonal output response. This type of neural net is better suited for use where input synapse signals are sometimes positive in polarity and sometimes negative in polarity.

U.S. Pat. No. 5,039,871 issued Aug. 13, 1991 by W. E. Engeler, entitled "CAPACITIVE STRUCTURES FOR WEIGHTED SUMMATION, AS USED IN NEURAL NETS" and assigned to General Electric Company describes preferred constructions of pairs of weighting capacitors for neural net layers, wherein each pair of weighting capacitors has a prescribed differential capacitance value and is formed by selecting each of a set of component capacitive elements to one or the other of the pair of weighting capacitors. U.S. Pat. No. 5,039,870 issued Aug. 13, 1991 by W. E. Engeler, entitled "WEIGHTED SUMMATION CIRCUITS HAVING DIFFERENT-WEIGHT RANKS OF CAPACITIVE STRUCTURES" and assigned to General Electric Company describes how weighting capacitors can be constructed on a bit-sliced or binary-digit-sliced basis. These weighting capacitor construction techniques are applicable to neural nets that utilize digital input signals, as will be presently described, as well as being applicable to neural nets that utilze analog input signals.

The neural nets as thusfar described normally utilize analog input signals that may be sampled-data in nature. A paper by J. J. Bloomer, P. A. Frank and W. E. Engeler entitled "A Preprogrammed Artifical Neural Network Architecture in Signal Processing" published in December 1989 by the GE Research & Development Center describes the application of push-pull ternary samples as synapse input signals to neural network layers, which push-pull ternary samples can be generated responsive to single-bit digital samples.

U.S. patent application Ser. No. 546,970 filed Jul. 2, 1990 by W. E. Engeler, entitled "NEURAL NETS SUPPLIED SYNAPSE SIGNALS OBTAINED BY DIGITAL-TO-ANALOG CONVERSION OF PLURAL-BIT SAMPLES" and assigned to General Electric Company describes how to process plural-bit digital samples on a digit-slice basis through a neural net layer. Partial weighted summation results, obtained by processing each bit slice through a neural net layer, are combined in final weighted summation processes to generate final weighted summation results. The final weighted summation results are non-linearly amplified to generate respective axonal output responses. After the weighted summation and non-linear amplification procedures have been carried out in the analog regime, the axonal output responses are digitized, if digital signals are desired in subsequent circuitry.

U.S. patent application Ser. No. 561,404 filed Aug. 1, 1990 by W. E. Engeler, entitled "NEURAL NETS SUPPLIED DIGITAL SYNAPSE SIGNALS ON A BIT-SLICE BASIS" and assigned to General Electric Company describes how to process plural-bit digital samples on a bit-slice basis through a neural net layer. Partial weighted summation results, obtained by processing each successive bit slice through the same capacitive weighting network, are combined in final weighted summation processes to generate final weighted summation results. The final weighted summation results are non-linearly amplified to generate respective axonal output responses. After the weighted summation and non-linear amplification procedures have been carried out in the analog regime, the axonal output responses are digitized, if digital signals are desired in subsequent circuitry. Processing the bit slices of the plural-bit digital samples through the same capacitive weighting network provides good guarantee that the partial weighted summation results are scaled in exact powers of two respective to each other.

The neural network herein described differ from that described in U.S. patent application Ser. No. 561,404 in that the final weighted summation processes used to combine partial weighted summation results, obtained by processing each bit slice through a neural net layer, are carried out in the digital, rather than the analog, regime to generate final weighted summation results. That is the sampled-data function described by the digital input signals is correlated with the sampled-data function described by each pattern of weights established with the weighting capacitors to generate a respective digital correlation signal. Performing the final weighted summation processes in the digital regime avoids the need for a further array of capacitive structures for performing the final weighted summation; a digital accumulator circuit is used instead, which tends to be more economical of area on a monolithic integrated-circuit die. Also, performing the final weighted summation process in the digital regime has high accuracy since it avoids undesirable non-monotonic non-linearities that can be introduced by inaccuracies in the scaling of the capacitances of weighting capacitors when performing the final weighted summation in the analog regime as described in U.S. patent application Ser. No. 561,404. Performing the final weighted summation processes in the digital regime is particularly advantageous in large neural net layers formed using a plurality of monolithic integrated circuits for processing a set of synapse input signals, since corruption of desired signals by stray pick-up of electrical signals in the interconnections between the monolithic integrated circuits can be remedied if the desired signals are digital in nature.

In neural networks using digital correlators of this type, the non-linear circuitry exhibiting a sigmoidal response used after each digital correlator has to be digital in nature, rather than being analog in nature as in previous neural networks. Neural nets employing capacitors lend themselves to being used in performing parts of the computations needed to implement a back-propagation training algorithm. The determination of the slope of the non-linear transfer function, which determination is necessary when training a neural net layer using a back-propagation training algorithm, can be simply accomplished in certain digital non-linear circuitry as will be described further on in this specification. This contrasts with the greater difficulty of determining the slope of the non-linear transfer function in analog non-linear circuitry.

The back-propagation training algorithm is an iterative gradient algorithm designed to minimize the mean square error between the actual output of a multi-layer feed-forward neural net and the desired output. It requires continuous, differentiable non-linearities in the transfer function of the non-linear circuitry used after the weighted summation circuits in the neural net layer. A recursive algorithm starting at the output nodes and working back to the first hidden layer is used iteratively to adjust weights in accordance with the following formula.

$$W_{i,j}(t+1) = W_{i,j}(t) - \eta \delta_j x_i \quad (2)$$

In this equation $W_{i,j}(t)$ is the weight from hidden node i (or, in the case of the first hidden layer, from an input node) to node j at time t; $x_i$ is either the output of node i (or, in the case of the first hidden layer, is an input signal); $\eta$ is a gain term introduced to maintain stability in the feedback procedure used to minimize the mean square errors between the actual output(s) of the perceptron and its desired output(s); and $\delta_j$ is a derivative of error. The general definition of $\delta_j$ is the change in error energy from output node j of a neural net layer with a change in the weighted summation of the input signals used to supply that output node j.

Lippman presumes that a particular sigmoid logistic non-linearity is used. Presuming the non-linearity of processor response is to be defined not as restrictively as Lippmann does, then $\delta_j$ can be more particularly defined as in equation (2), following, if node j is an output node, or as in equation (3), following, if node j is an internal hidden node.

$$\delta_j = z_j' (d_j - z_j) \quad (3)$$

$$\delta_j = z_j' \sum_k \delta_k W_{j,k} \quad (4)$$

In equation (3) $d_j$ and $z_j$ are the desired and actual values of output response from the output layer and $z_j'$ is differential response of $z_j$ to the non-linearity in the output layer—i.e., the slope of the transfer function of that non-linearity. In equation (4) k is over all nodes in the neural net layer succeeding the hidden node j under consideration and $W_{j,k}$ is the weight between node j and each such node k. The term $z_j'$ is defined in the same way as in equation (3).

The general definition of the $z_j'$ term appearing in equations (3) and (4), rather than that general term being replaced by the specific value of $z_j'$ associated with a sigmoid logistic non-linearity, is the primary difference between the training algorithm as described here and as described by Lippmann. Also, Lippmann defines $\delta_j$ in opposite polarity from equations (1), (3) and (4) above.

During training of the neural net, prescribed patterns of input signals are sequentially repetitively applied, for which patterns of input signals there are corresponding prescribed patterns of output signals known. The pattern of output signals generated by the neural net, responsive to each prescribed pattern of input signals, is compared to the prescribed pattern of output signals to develop error signals, which are used to adjust the weights per equation (2) as the pattern of input signals is repeated several times, or until the error signals are detected as being negibly valued. Then training is done with the next set of patterns in the sequence. During extensive training the sequence of patterns may be recycled.

SUMMARY OF THE INVENTION

A plurality of neural circuits are connected in a neural network layer for generating their respective digital axonal responses to the same plurality of synapse input signals. Each neural circuit includes digital circuitry for approximating a sigmoidal response connected after respective circuitry for performing a weighted summation of the synapse input signals to generate a weighted summation result in digital form. In this digital circuitry the absolute value of the digital weighted summation result is first determined. Then, a window comparator determines into which of a plurality of amplitude ranges the absolute value of the weighted summation result falls. A digital intercept value and a digital slope value are selected in accordance with the range into which the absolute value of the weighted summation result falls. The absolute value of the digital weighted summation result is multiplied by the selected digital slope value to generate a digital product; and the digital intercept value is added to the digital product to generate an absolute value representation of a digital axonal response. The polarity of the weighted summation result is determined, and the same polarity is assigned to the absolute value representation of the digital axonal response, thereby to generate the digital axonal response.

BRIEF DESCRIPTION OF THE DRAWING

FIG. 5 is a schematic diagram of apparatus for digitizing analog partial weighted summation results as sequentially supplied from one of the FIG. 2, FIG. 3 and FIG. 4 apparatuses and then digitally performing a plurality of weighted summation procedures, each of which weighted summation procedures weights and sums a respective succession of digitized sequentially supplied data.

FIGS. 3, 5 and 6; FIGS. 9, 11 and 12; or FIGS. 10, 11 and 12 for the programmable weighting of the capacitances used in performing weighted summations of synapse signals.

DETAILED DESCRIPTION

Figure 1:
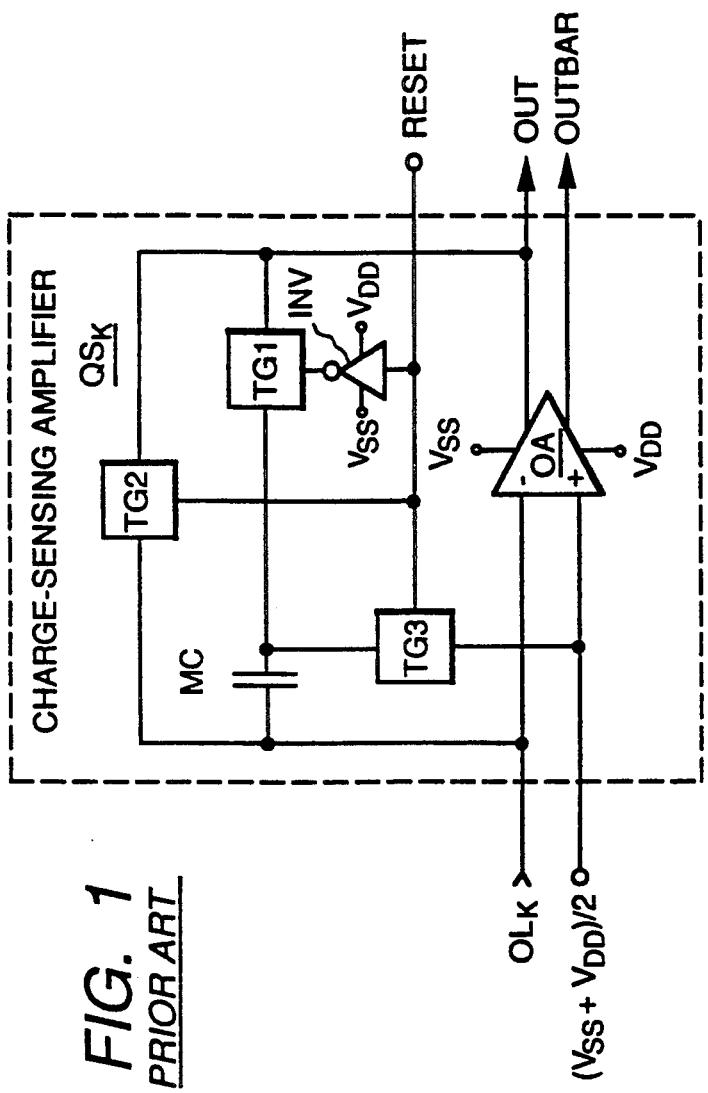
FIG. 1 is a schematic diagram of a prior-art single-ended charge sensing amplifier comprising a Miller integrator with resetting circuitry that compensates for input offset error in the differential-input operational amplifier the Miller feedback capacitor provides degenerative feedback to; this type of single-ended charge sensing amplifier and a balanced version thereof are preferred over simpler Miller integrators for charge sensing.
Figure 9:
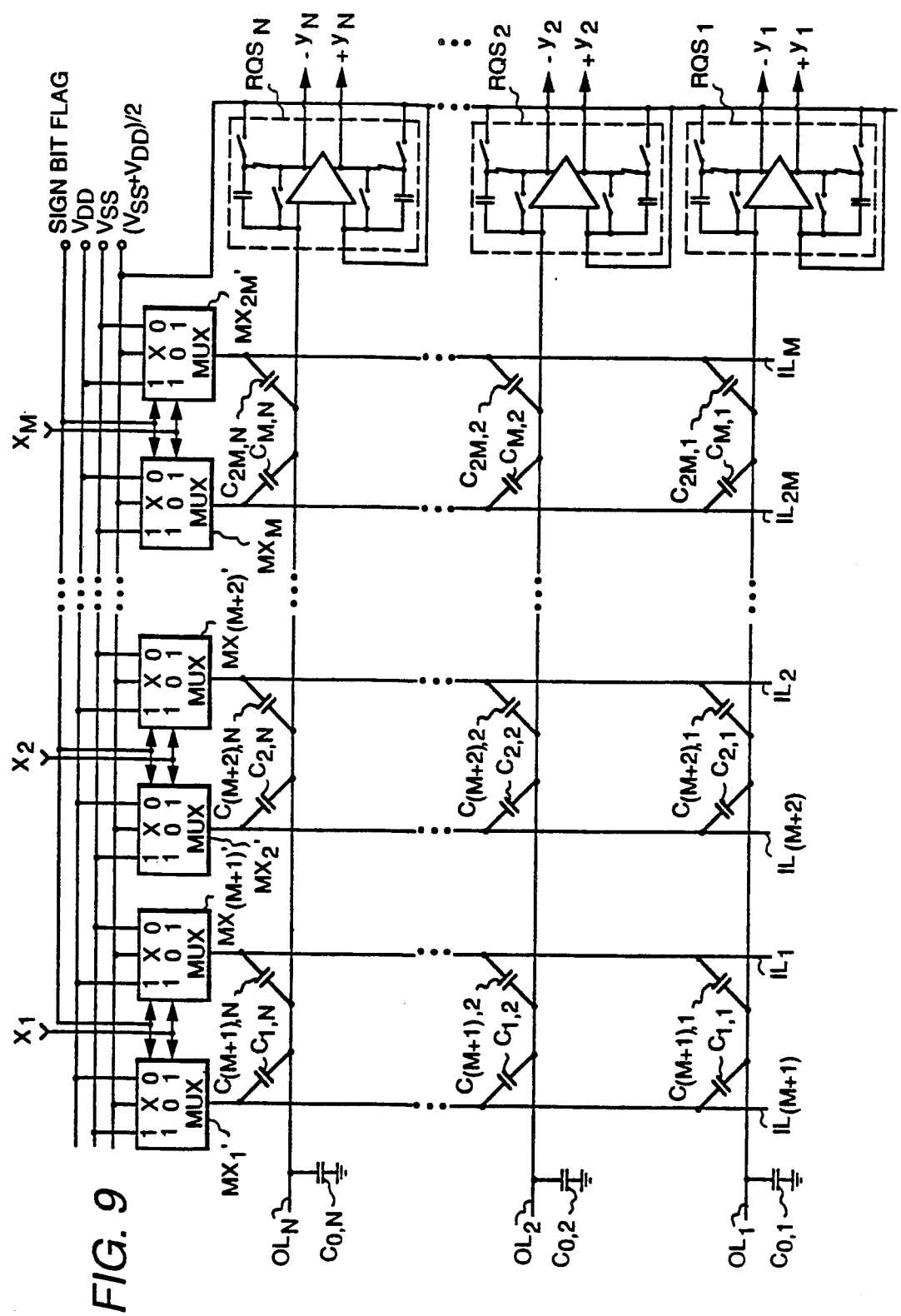
FIGS. 9 and 10 are schematic diagrams of two further apparatuses, each for performing a plurality of weighted summation procedures in parallel on a bit slice of input signals, as originally described by the inventor in U.S. patent application Ser. No. 561,404.
Figure 10:
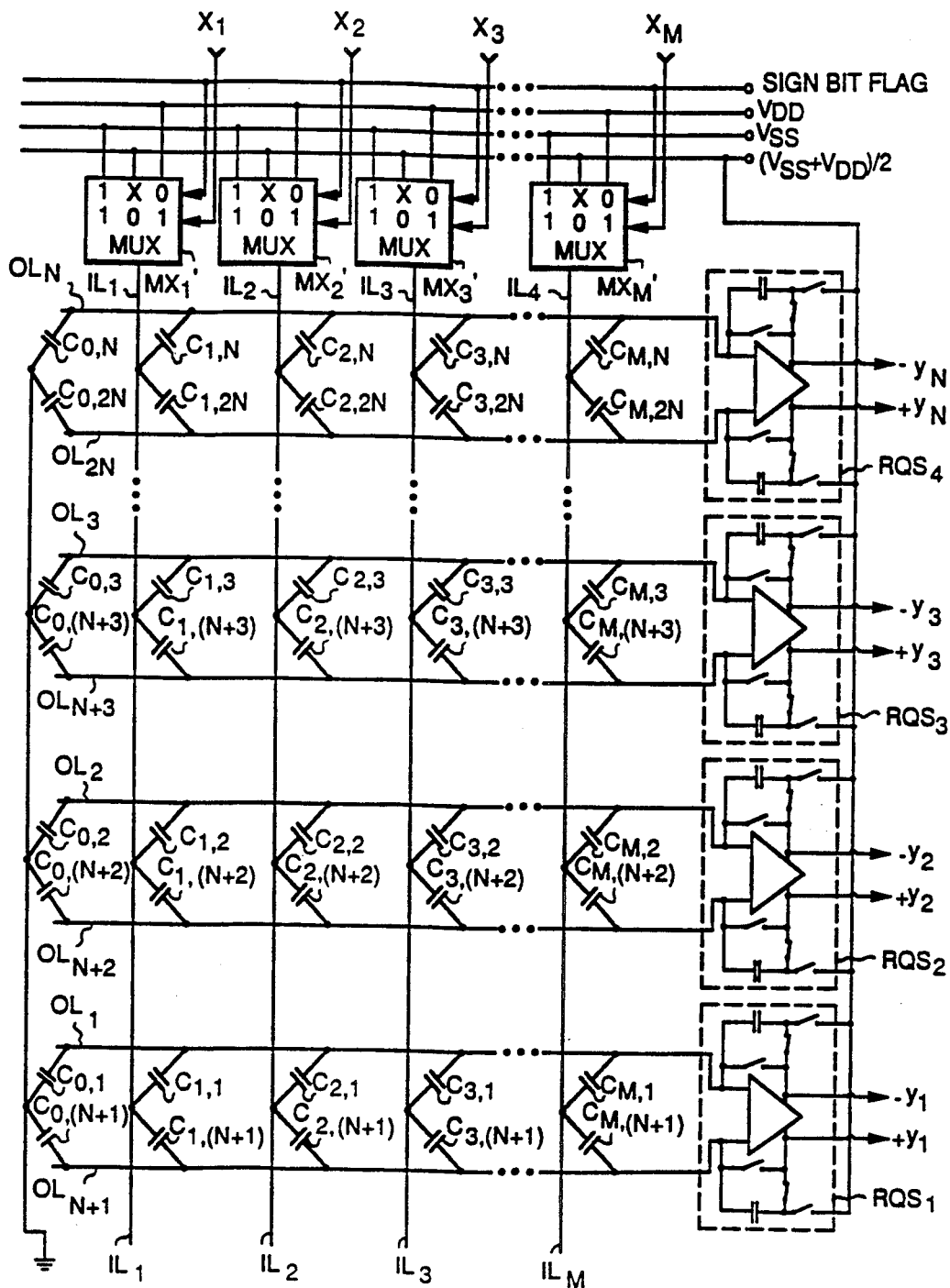

FIG. 1 shows a single-ended charge sensing amplifier $QS_k$ of a preferably type for implementing the single-ended charge sensing amplifiers used in modifications of the FIGS. 9 and 10 circuitry. The charge sensing amplifier $QS_k$ is essentially a Miller integrator that includes a differential-input operational amplifier OA having a Miller feedback capacitor MC connecting from its output connection OUT back to its inverting (−) input connection during normal operation. The non-inverting (+) input connection of the operational amplifier OA is connected to a fixed potential in the single-ended charge sensing amplifier $QS_k$, which fixed potential is shown as having a value $(V_{SS}+V_{DD})/2$ midway between a relatively high potential ($V_{DD}$) and a relatively low potential ($V_{SS}$). During normal charge-sensing operation a relatively low potential ($V_{SS}$) is applied via RESET terminal to a logic inverter INV that responds to apply a relatively high potential ($V_{DD}$) to a transmission gate TG1. The transmission gate TG1 is rendered conductive to connect the output connection OUT of operational amplifier OA to capacitor MC to complete its connection as Miller feedback capacitor. The relatively low potential applied via RESET terminal conditions a transmission gate TG2 and a transmission gate TG3 both to be non-conductive. $QS_K$ is a preferred charge sensing amplifier because differential input offset error in the operational amplifier OA is compensated against, owing to the way the Miller integrator is reset.

During periodic reset intervals for the integrator a relatively high potential ($V_{DD}$) is applied via RESET terminal to condition transmission gates TG2 and TG3 each to be conductive and to condition the logic inverter INV output potential to go low, which renders transmission gate TG1 non-conductive. The conduction of transmission gate TG2 connects the output connection OUT of operational amplifier OA directly to its inverting (−) input connection, completing a feedback connection that forces the inverting (−) input connection to the differential input offset error voltage, which voltage by reason of transmission gate TG3 being conductive is stored on the Miller capacitor MC. When normal charge-sensing operation is restored by RESET terminal going low, the differential input offset error bias remains stored on the Miller capacitor MC, compensating against its effect upon charge sensing.

Supposing the operational amplifier OA to be a differential output type having balanced output connections OUT and OUTBAR, a balanced version of the charge sensing amplifier $QS_K$ can be formed by disconnecting the non-inverting (+) input connection of the operational amplifier OA from a point of fixed potential having a value $(V_{SS}+V_{DD})/2$. Instead, the non-inverting (+) input connection of the operational amplifier OA is arranged to have a feedback connection from the OUTBAR output connection of the operational amplifier OA similar to the feedback connection from the OUT output connection of the operational amplifier OA to its inverting (−) input connection. This balanced version of the charge sensing amplifier $QS_K$ is shown in FIGS. 2-5, 9-11, 13-17 and 20-24.

M is a positive plural integer indicating the number of input signals to the FIGS. 2, 3, 4, 9 or 10 weighted summation apparatus, and N is a positive plural integer indicating the number of output signals the FIGS. 2, 3, 4, 9 or 10 apparatus can generate. To reduce the written material required to describe operation of the weighted summation apparatuses in FIGS. 2, 3, 4, 9 and 10 of the drawing, operations using replicated elements will be described in general terms; using a subscript i ranging over all values one through M for describing operations and circuit elements as they relate to the (column) input signals $x_1, x_2, \ldots x_M$; and using a subscript j ranging over all values one through N for describing operations and apparatus as they relate to the (row) output signals $y_1, y_2, \ldots y_N$. That is, i and j are the column and row numbers used to describe particular portions of the FIGS. 2, 3, 4, 9 and 10 weighted summation apparatuses and modifications of those apparatuses.

Figure 2:
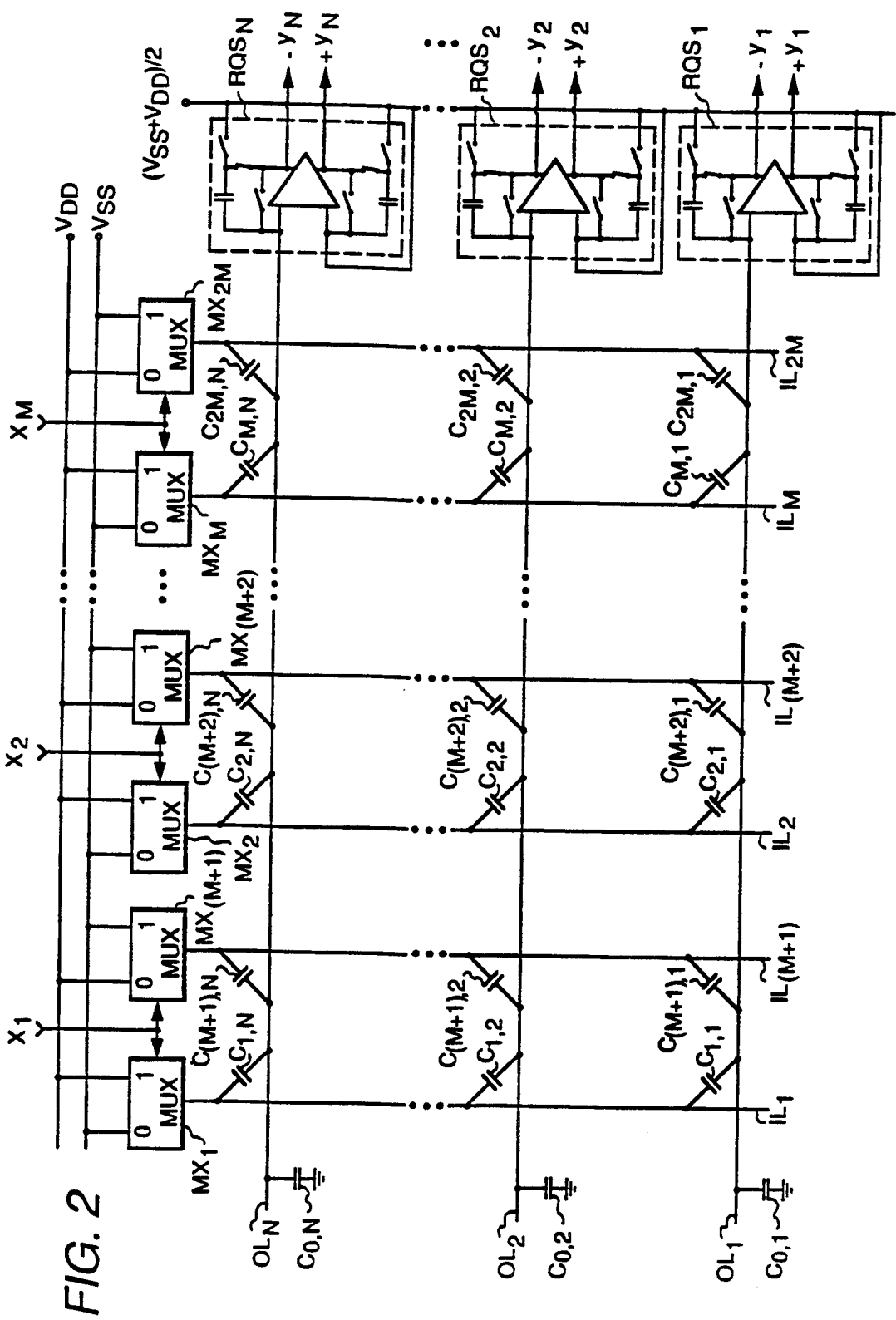
FIGS. 2, 3 and 4 are schematic diagrams of three different apparatuses, each for performing a plurality of weighted summation procedures in parallel on a bit slice of input signals to generate analog partial weighted summation results sequentially, as originally described by the inventor in U.S. patent application Ser. No. 561,404.

The FIG. 2 apparatus performs a plurality of weighted summation procedures in parallel on each successive bit slice of input signals, which input signals comprise a plurality M in number of parallel bit streams $x_1, x_2, \ldots x_M$. This apparatus is assumed to receive a first operating voltage $V_{DD}$, a second operating voltage $V_{SS}$, and a third operating voltage $(V_{SS}+V_{DD})/2$ midway between $V_{SS}$ and $V_{DD}$. $V_{DD}$ and $V_{SS}$ are presumed to be relatively positive and relatively negative respective to each other.

Each input voltage signal $x_i$ is applied as control signal to a respective multiplexer $MX_i$ and to a respective multiplexer $MX_{(M+i)}$. Multiplexer $MX_i$ responds to $x_i$ being a ONE to apply the $V_{DD}$ first operating voltage to an input (column) line $IL_i$ and responds to $x_i$ being a ZERO to apply the $V_{SS}$ second operating voltage to the input line $IL_i$. Multiplexer $MX_{(M+i)}$ responds to $x_i$ being a ONE to apply the $V_{SS}$ second operating voltage to an input (column) line $IL_{(M+i)}$ and responds to $x_i$ being a ZERO to apply the $V_{DD}$ first operating voltage to the input line $IL_{(M+i)}$.

A capacitor $C_{i,j}$ has a first plate connected to the input line $IL_i$ and has a second plate connected to an output (row) line $OL_j$. A capacitor $C_{(M+i),j}$ has a first plate connected to the input line $IL_{(M+i)}$ and has a second plate connected to the output line $OL_j$. Capacitor $C_{i,j}$ and capacitor $C_{(M+i),j}$ together are considered as a pair, for providing in effect a single weighting capacitor, the capacitance of which is the difference in the capacitances of capacitor $C_{i,j}$ and capacitor $C_{(M+i),j}$ between their respective first and second plates. These weighting capacitors may be considered to be arrayed by row and by column. The charge placed on the output line $OL_j$ by all the weighting capacitors connecting thereto is sensed on a single-ended basis by a respective charge-sensing amplifier $RQS_j$. Each of the charge-sensing amplifiers $RQS_j$ is shown as a respective Miller integrator comprising an operational amplifier and Miller feedback capacitors.

During reset or zeroing of all the charge-sensing amplifiers $RQS_j$, each of the $x_i$ input voltages is a logic ZERO. This applies $V_{SS}$ to the plates of capacitors $C_{i,j}$ connected from the multiplexers $MX_i$ and applies $V_{DD}$ to the plates of capacitors $C_{(M+i),j}$ connected from the multiplexers $MX_{(M+i)}$. The total capacitance on each output line $OL_j$ is caused to be the same as on each of the other output lines by a respective shunt capacitor $C_{0,j}$ to signal ground, which capacitor either has capacitance that is so large as to overwhelm the other capacitances on the output line $OL_j$ or preferably that complements the other capacitances on the output line $OL_j$. Causing the total capacitance on each output line $OL_j$ to be the same as on each of the other output lines makes the sensitivities of the charge-sensing amplifiers $RQS_j$ to their respective inputs uniform, presuming them to be Miller integrators of identical design. If the capacitances of capacitor $C_{i,j}$ and capacitor $C_{(M+i),j}$ between their respective first and second plates sum to a prescribed standard value, for the complete selection range of i and j, the sensitivities of the charge-sensing amplifiers $RQS_j$ to their respective inputs are uniform without need for a respective shunt capacitor $C_{0,j}$ to signal ground for each output line $OL_j$, presuming the charge-sensing amplifiers $RQS_j$ to be Miller integrators of identical design.

After reset or zeroing, when $x_i$ bits for different i may each be ZERO or ONE, each $x_i$ bit that is a ZERO creates no change in charge condition on any of the output lines $OL_j$. A bit $x_i$ that is a ONE creates an incremental change in charge on an output line $OL_j$ that, in accordance with Coulomb's Law, is equal to $(V_{SS} - V_{DD})/2$ times the difference in the capacitances of capacitors $C_{i,j}$ and $C_{(M+i),j}$ between their respective first and second plates. The sum of these incremental charges accumulates on the output line $OL_j$ and is sensed by the charge-sensing amplifier $RQS_j$.

Figure 3:
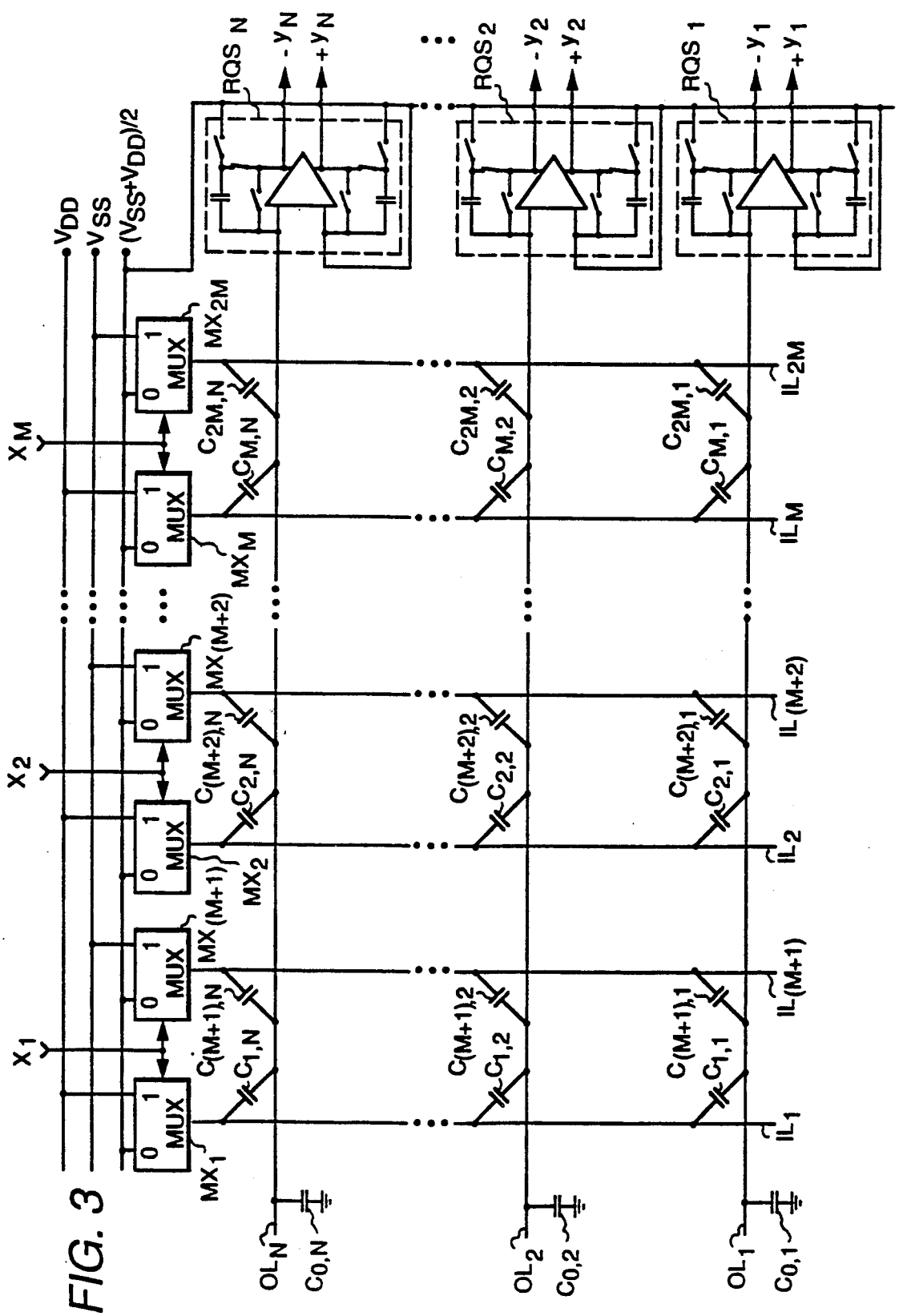

FIG. 3 shows a modification of the FIG. 2 apparatus in which the multiplexer $MX_i$ and the multiplexer $MX_{(M+i)}$ respond to $x_i$ being a ZERO to apply the third operating voltage $(V_{SS} + V_{DD})/2$ to the input line $IL_i$ and to the input line $IL_{(M+i)}$, respectively. During reset, the weighting capacitors $C_{i,j}$ and $C_{(M+i)}$ will be charged to relatively small bias voltages between their plates, rather than to bias voltages of amplitudes close to $(V_{SS} + V_{DD})/2$. The FIG. 2 apparatus is advantageous over the FIG. 3 apparatus in that, in the FIG. 2 apparatus, accuracy of the the third operating voltage $(V_{SS} + V_{DD})/2$ being exactly midway between the first operating voltage $V_{DD}$ and the second operating voltage $V_{SS}$ is not necessary for accuracy of the partial weighted summation results.

Figure 4:
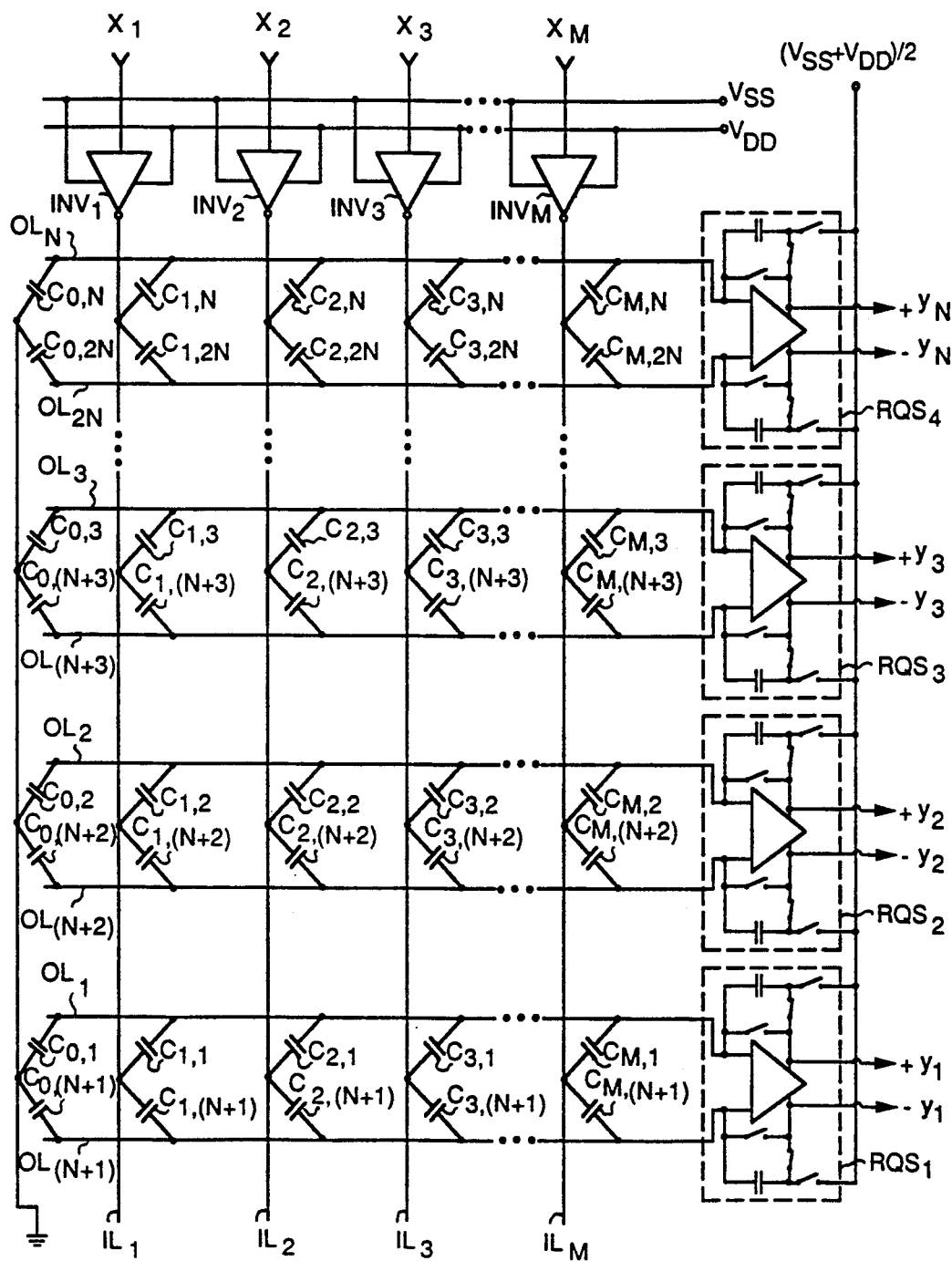

The FIG. 4 apparatus also performs a plurality of weighted summation procedures in parallel on each successive bit slice of input signals, which input signals comprise a plurality M in number of parallel bit streams $x_1, x_2, x_3, \ldots x_M$. Logic inverters $INV_1, INV_2, INV_3, \ldots INV_M$ respond to the current bits $x_1, x_2, x_3, \ldots x_M$ respectively with their respective logic complements.

(The current bits $x_1, x_2, x_3, \ldots x_M$ are assumed to be supplied in accordance with the positive logic convention.) The FIG. 4 apparatus also is assumed to receive a relatively positive first operating voltage $V_{DD}$, a relatively negative second operating voltage $V_{SS}$, and a third operating voltage $(V_{SS} + V_{DD})/2$ midway between $V_{SS}$ and $V_{DD}$.

The logic inverter $INV_i$ responds to $x_1$ being a ZERO to apply $V_{DD}$ to an input line $IL_i$ and responds to $x_1$ being a ONE to apply $V_{SS}$ to the input line $IL_i$. As in FIGS. 2 and 3, the charge-sensing amplifier $RQS_j$ is one of a plurality, N in number, of identical charge-sensing amplifiers for sensing the difference in charges accumulated on a respective pair of output lines. In FIG. 4 the charge-sensing amplifier $RQS_j$ is arranged for differentially sensing charge and is connected to sense the difference in charges accumulated on output lines $OL_j$ and $OL_{(N+j)}$. The output lines $OL_j$ and $OL_{(N+j)}$ are charged from each input line input line $IL_i$ via a capacitor $C_{i,j}$ and via a capacitor $C_{i,(N+j)}$, respectively. Capacitor $C_{i,j}$ and capacitor $C_{i,(N+j)}$ together are considered as a pair, for providing in effect a single weighting capacitor, the capacitance of which is the difference in the capacitances of capacitor $C_{i,j}$ and capacitor $C_{i,(N+j)}$ between their respective first and second plates. The total capacitance on each output line $OL_j$ is maintained the same as on each of the other output lines by a respective shunt capacitor $C_{0,j}$ to signal ground; and the total capacitance on each output line $OL_{(N+j)}$ is maintained the same as on each of the other output lines by a respective shunt capacitor $C_{0,(N+j)}$ to signal ground.

Where the capacitances of capacitor $C_{i,j}$ and and capacitor $C_{i,(N+j)}$ between their respective first and second plates are to be alterable responsive to digital programming signals, it is preferred that the capacitances of capacitor $C_{i,j}$ and capacitor $C_{i,(N+j)}$ between their respective first and second plates sum to a prescribed standard value for the complete selection range of i and j. It is further preferred that each pair of capacitors $C_{i,j}$ and $C_{i,(N+j)}$ have a corresponding further pair of capacitors $C_{(M+i),j}$ and $C_{(M+i),(N+j)}$ associated therewith, capacitor $C_{(M+i),j}$ having a capacitance equal to that of capacitor $C_{i,(N+j)}$ and connecting output line $OL_j$ to a point of connection $P_{i,j}$, and capacitor $C_{(M+i),(N+j)}$ having a capacitance equal to that of capacitor $C_{i,j}$ and connecting output line $OL_{(N+j)}$ to the same point of connection $P_{i,j}$. If all the points of connection $P_{i,j}$ connect to signal ground, the capacitors $C_{(M+i),j}$ for all values of i together provide for each value of j the respective shunt capacitor $C_{0,j}$ to signal ground, and the capacitors $C_{(M+i),(N+j)}$ for all values of i together provide for each value of j the respective shunt capacitor $C_{0,(N+j)}$ to signal ground. This is taught in greater detail in U.S. patent application Ser. No. 526,470.

The FIG. 4 apparatus may be modified to replace logic inverters $INV_1, INV_2, INV_3, \ldots INV_M$ with non-inverting driver amplifiers. In such case the other output connections of the differential-output operational amplifiers in the charge sensing amplifiers $RQS_1$, $RQS_2, RQS_3, \ldots RQS_N$ are used to supply the $y_1, y_2, y_3, \ldots y_N$ partial weighted summations.

The FIG. 4 apparatus may alternatively be modified to augment logic inverters $INV_1, INV_2, INV_3, \ldots INV_M$ with non-inverting driver amplifiers $DA_1, DA_2, DA_3, \ldots DA_M$ respectively and to use each non-inverting driver amplifier $DA_i$ to drive the points of connection $P_{i,j}$ for all values of j. This provides for full-capacitor bridge drives to each charge-sensing amplifier $RQS_j$, rather than half-capacitor bridge drives. The advantage of doing this is that the common-mode voltage on the output (row) lines $OL_j$ and $OL_{(N+j)}$ is zero, so one does not have to rely as much on the common-mode suppression of the charge-sensing amplifier $RQS_j$ to keep the integration of charge within the operating supply range of that amplifier.

Figure 6A:
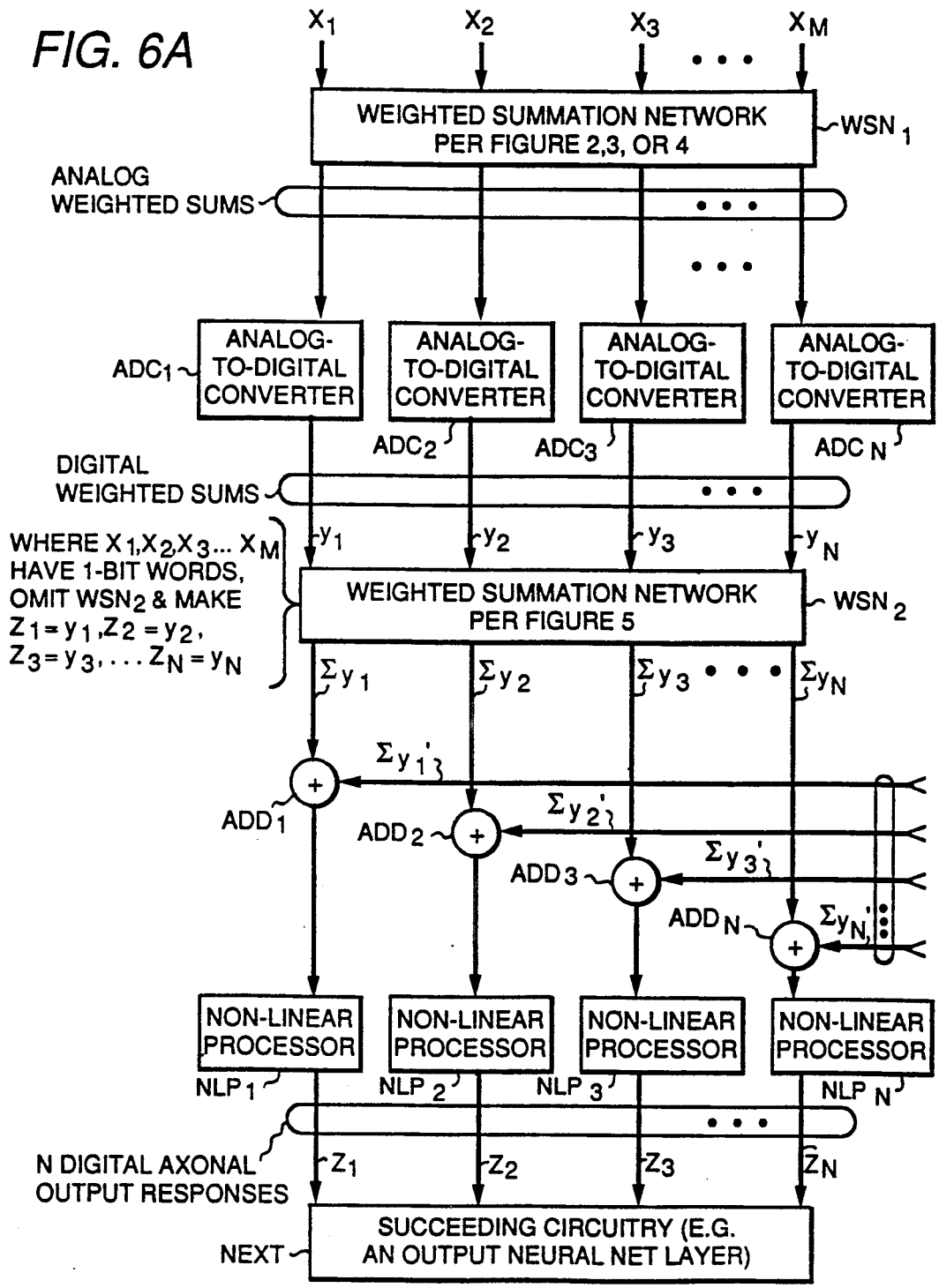
FIGS. 6A and 6B, arranged respectively on the left and on the right of the other, together form a schematic diagram (generally referred to as FIG. 6) of a neural net layer including any of the FIG. 2, FIG. 3 and FIG. 4 apparatuses for performing a plurality of partial weighted summation procedures; an array of analog-to-digital converters for digitizing the partial weighted summation results; possibly a FIG. 5 apparatus for digitally performing a plurality of digital final weighted summation procedures; and an array of digital non-linear processors generating digital axonal responses to the digital final weighted summation results, each of which alternative neural net layers.
Figure 6B:
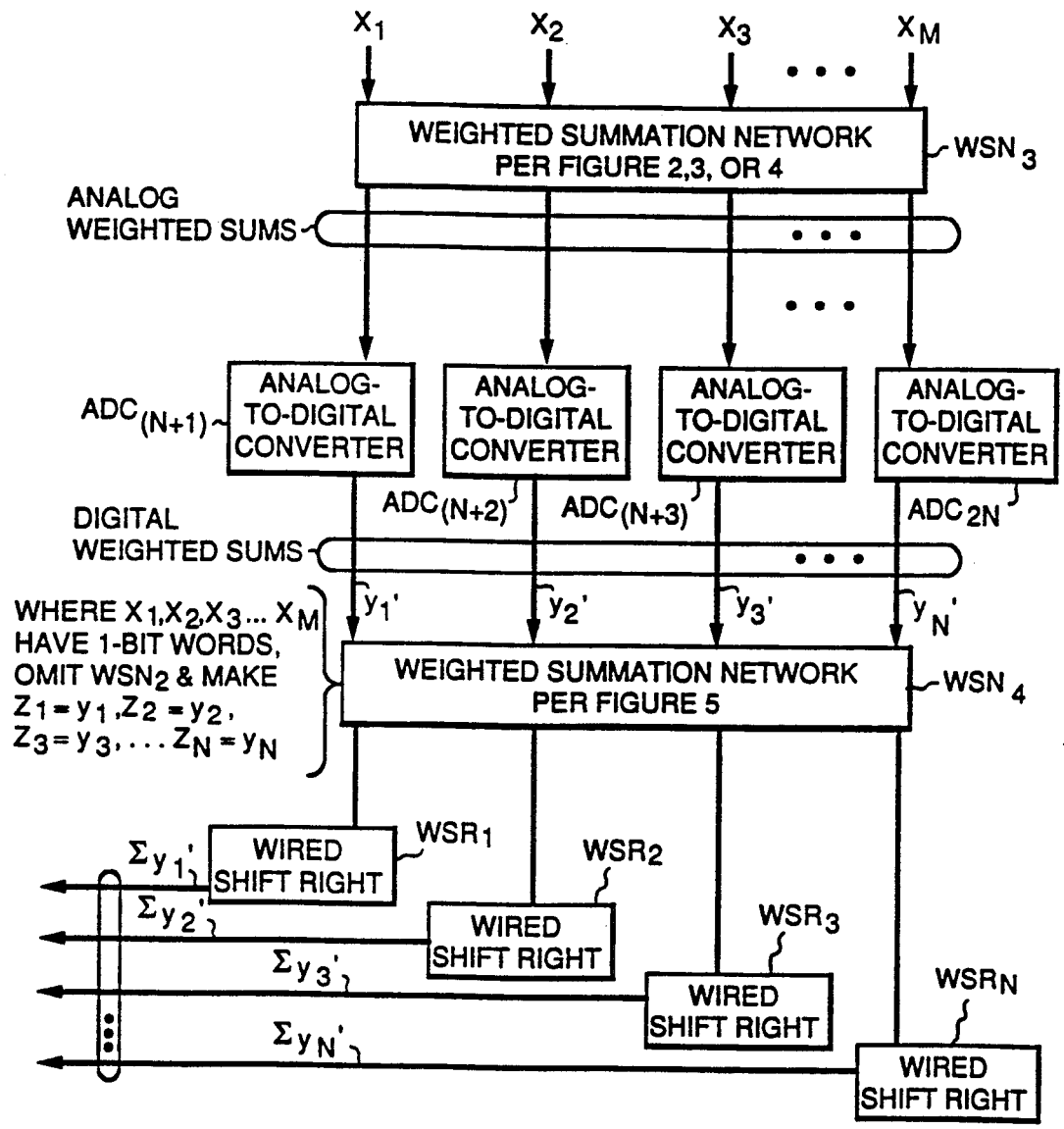

FIGS. 6A and 6B when arranged in FIG. 6 provide a schematic diagram of a neural net layer wherein the weighting capacitors are constructed on a binary-digit-sliced basis as described in U.S. patent application Ser. No. 525,931, filed May 21, 1990 by W. E. Engeler, entitled "WEIGHTED SUMMATION CIRCUITS HAVING DIFFERENT-WEIGHT RANKS OF CAPACITIVE STRUCTURES" and assigned to General Electric Company. In FIG. 6A the bit-sliced (column) input signals $x_1, x_2, \ldots x_M$ are applied to a weighted summation network $WSN_1$ that comprises a rank of capacitive weighting structures of relatively high significance; and in FIG. 6B the bit-sliced (column) input signals $x_1, x_2, \ldots x_M$ are applied to a weighted summation network $WSN_3$ that comprises a rank of capacitive weighting structures of relatively low significance. In FIG. 6A the analog weighted sums of the bit-sliced input signals $x_1, x_2, \ldots x_M$ supplied from the weighted summation network $WSN_1$, which are of relatively higher significances, are digitized in respective analog-to-digital (or A-to-D) converters $RADC_1$, $RADC_2$, $RADC_3$, $\ldots RADC_N$ to generate bit-sliced digital signals $y_1, y_2, y_3, \ldots y_N$, respectively. Analogously, in FIG. 6B the analog weighted sums of the bit-sliced input signals $x_1, x_2, \ldots x_M$ supplied from the weighted summation network $WSN_3$ which are of relatively lower significances, are digitized in respective analog-to-digital (or A-to-D) converters $RADC_{(N+1)}$, $RADC_{(N+2)}$, $RADC_{(N+3)}$, $\ldots RADC_{2N}$ to generate bit-sliced digital signals $y_{(N+1)}, y_{(N+2)}, y_{(N+3)}, \ldots y_{2N}$, respectively.

In FIG. 6A the bit-sliced digital signals $y_1, y_2, y_3, \ldots y_N$, which are partial weighted summations, are applied to a weighted summation network $WSN_2$ (as will be described in greater detail further on with reference to FIG. 5). The weighted summation network $WSN_2$ combines each set of partial weighted summations $y_j$ to generate a respective relatively more significant component $\Sigma y_j$ of the final weighted summation supplied as the sum signal output of a digital adder $ADD_j$, which respective relatively more significant component $\Sigma y_j$ is applied as augend input signal to the adder $ADD_j$. Analogously, in FIG. 6B the bit-sliced digital signals $y_{(N+1)}, y_{(N+2)}, (N+3), \ldots Y_{2N}$, which are partial weighted summations, are applied to a weighted summation network $WSN_4$ (as will be described in greater detail further on with reference to FIG. 5). The weighted summation network $WSN_4$ combines each set of partial weighted summations $y_{(N+j)}$ to generate a respective relatively less significant component $\Sigma y_{(N+j)}$ of the final weighted summation supplied as the sum signal output of a digital adder $ADD_j$, which respective relatively less significant component $\Sigma y_{(N+j)}$ is applied after appropriate wired shift right $WSR_j$ as addend input signal to the adder $ADD_j$. (Right shift of a digital signal by P binary places is reckoned as being a division of the digital signal by $2^P$.)

The sum signals from the adders $ADD_1$, $ADD_2$, $ADD_3, \ldots ADD_N$ are supplied as input signals to respective digital non-linear processors $NLP_1$, $NLP_2$, $NLP_3, \ldots NLP_N$ which respond to their respective input signals to generate a plurality, N in number, of digital axonal output responses. As shown in FIG. 6A, these digital axonal output responses can be applied to succeeding circuitry NEXT. For example, this succeeding circuitry NEXT may be an output neutral net layer where the neural net layer thusfar described is a hidden neural net layer.

Where the input signals to the FIG. 2, FIG. 3 or FIG. 4 weighted summation apparatus comprise single-bit words, the N signals $y_1, y_2, y_3, \ldots y_N$ can, per FIG. 6A, be digitized in respective analog-to-digital (or A-to-D) converters $RADC_1$, $RADC_2$, $RADC_3, \ldots RADC_N$, for application to adders $ADD_1$, $ADD_2$, $ADD_3, \ldots ADD_N$, which supply their sum signals to respective digital non-linear processors $NLP_1$, $NLP_2$, $NLP_3, \ldots NLP_N$ to generate a plurality, N in number, of digital axonal output responses. There is no need for the further, digital weighted summation apparatus $WSN_2$. Analogously, the N signals $y_{(N+1)}, y_{(N+2)}, y_{(N+3)}, \ldots y_{2N}$ can, per FIG. 6B, be digitized in respective analog-to-digital (or A-to-D) converters $RADC_{(N+1)}$, $RADC_{(N+2)}$, $RADC_{(N+3)}, \ldots RADC_{2N}$, for application with appropriate wired shifts right $WSR_1$, $WSR_2$, $WSR_3, \ldots WSR_N$ to adders $ADD_1$, $ADD_2$, $ADD_3, \ldots ADD_N$. There is no need for the further, digital weighted summation apparatus $WSN_4$.

Where only a single rank of capacitive weighting structures—that rank in the weighted summation network $WSN_1$—is used, all the elements shown in FIG. 6B are dispensed with. The adders $ADD_1$, $ADD_2$, $ADD_3, \ldots ADD_N$ are supplied zero-valued addend signals rather than being supplied $\Sigma y_{(N+1)}, \Sigma y_{(N+2)}, \Sigma y_{(N+3)}, \ldots \Sigma y_{2N}$ as respective addend signals. Alternatively, the adders $ADD_1$, $ADD_2$, $ADD_3, \ldots ADD_N$ may be omitted, with the digital non-linear processors $NLP_1$, $NLP_2$, $NLP_3, \ldots NLP_N$ receiving their respective input signals directly from the weighted summation network $WSN_2$. Or directly from the A-to-D converters $RADC_{(N+1)}$, $RADC_{(N+2)}$, $RADC_{(N+3)}, \ldots RADC_{2N}$ where the input signals $x_1, x_2, \ldots x_M$ to the weighted summation network $WSN_1$ comprise single-bit words so the weighted summation network $WSN_1$ is not used.

FIG. 5 shows further, digital weighted summation apparatus that can be used with the analog weighted summation apparatus of FIGS. 2, 3 or 4 to provide for the weighted summation of digital input signals $x_1, x_2, \ldots x_M$ having plural-bit words. The digital signals are placed in bit-serial form and in word alignment for application to the weighted summation apparatus of FIGS. 2, 3 or 4, which processes the bit-serial digital signals on a bit-slice basis to generate B partial weighted summation results, B being the number of bits per bit-serial arithmetic word. The successive bit slices of the plural-bit words of the digital input signals $x_1, x_2, \ldots x_M$ are processed in order of increasing significance, with the sign bit slice being processed last in each word. A SIGN BIT FLAG that is normally ZERO is provided, which SIGN BIT FLAG goes to ONE to signal the parallel occurrence of the sign bits in each successive group of M input signal words at the time the partial weighted summation of greatest significance is being generated, supposing the digital signals to be flows of two's complement arithmetic words.

FIG. 5 shows the plurality N in number of A-to-D converters $RADC_1$, $RADC_2 \ldots RADC_N$ used to convert the analog $y_1, y_2, \ldots y_N$ partial weighted summations from the charge sensing amplifiers $RQS_1$, $RQS_2$, $RQS_3$, ... $RQS_N$ to digital format and a weighted summation network for combining the sequences of digitized $y_1$, $y_2$, ... $y_N$ partial weighted summations to generate final weighted summations $\Sigma y_1$, $\Sigma_2$, ... $\Sigma y_N$. More particularly, the digitized $y_1$, $y_2$, ... $y_N$ partial weighted summations from the FIG. 5 A-to-D converters $RADC_1$, $RADC_2$ ... $RADC_N$ are assumed to be respective two's complement numbers. The bit resolution afforded by the A-to-D converters $RADC_1$, $RADC_2$ ... $RADC_N$ preferably increases by one bit place each successive bit slice of the digital word; in any case, each successive partial weighted summation within the same digital word is weighted by an additional factor of two respective to the previous partial weighted summation. A plurality, N in number, of accumulators $RACC_1$, $RACC_2$, ... $RACC_N$ are used for generating respective ones of N respective final weighted summation results $\Sigma y_j$. Each of the successive partial weighted summation results $y_j$ sequentially supplied by the A-to-D converter $RADC_i$ is routed through a respective selective complementor $RCMP_i$. The selective complementor $RCMP_i$ complements each bit of the partial weighted summation result the A-to-D converter $RADC_i$ generates when the SIGN BIT FLAG is ONE, then augments the result of this one's complementing procedure by adding to it a number that has a ONE as its least significant bit and has more significant bits all of which are ZEROs. This augmentation is simply carried out by applying the SIGN BIT FLAG as a carry to the adder in the accumulator $RACC_i$. When the SIGN BIT FLAG is ZERO, the selective complementor $RCMP_i$ transmits to the accumulator $RACC_i$, without complementation, each bit of the partial weighted summation result the A-to-D converter $RADC_i$ generates. Each of these accumulators $RACC_1$, $RACC_2$, ... $RACC_N$ accumulates for each word the successive partial weighted summation results $y_j$ sequentially supplied as one of the output signals of the weighted summation apparatus of FIGS. 2, 3 or 4, to generate a final weighted summation result $\Sigma y_j$. (In an alternative type of neural net layer where the bit-serial digital input signals supplying the parallel bit streams $x_1$, $x_2$, $x_3$, ... $x_M$ are invariably of one polarity and are processed as unsigned numbers, of course, the selective complementors $RCMP_1$, $RCMP_2$, ... $RCMP_N$ need not be included in the respective connections of the A-to-D converters $RADC_1$, $RADC_2$ ... $RADC_N$ to the accumulators $RACC_1$, $RACC_2$, ... $RACC_N$.)

Figure 7:
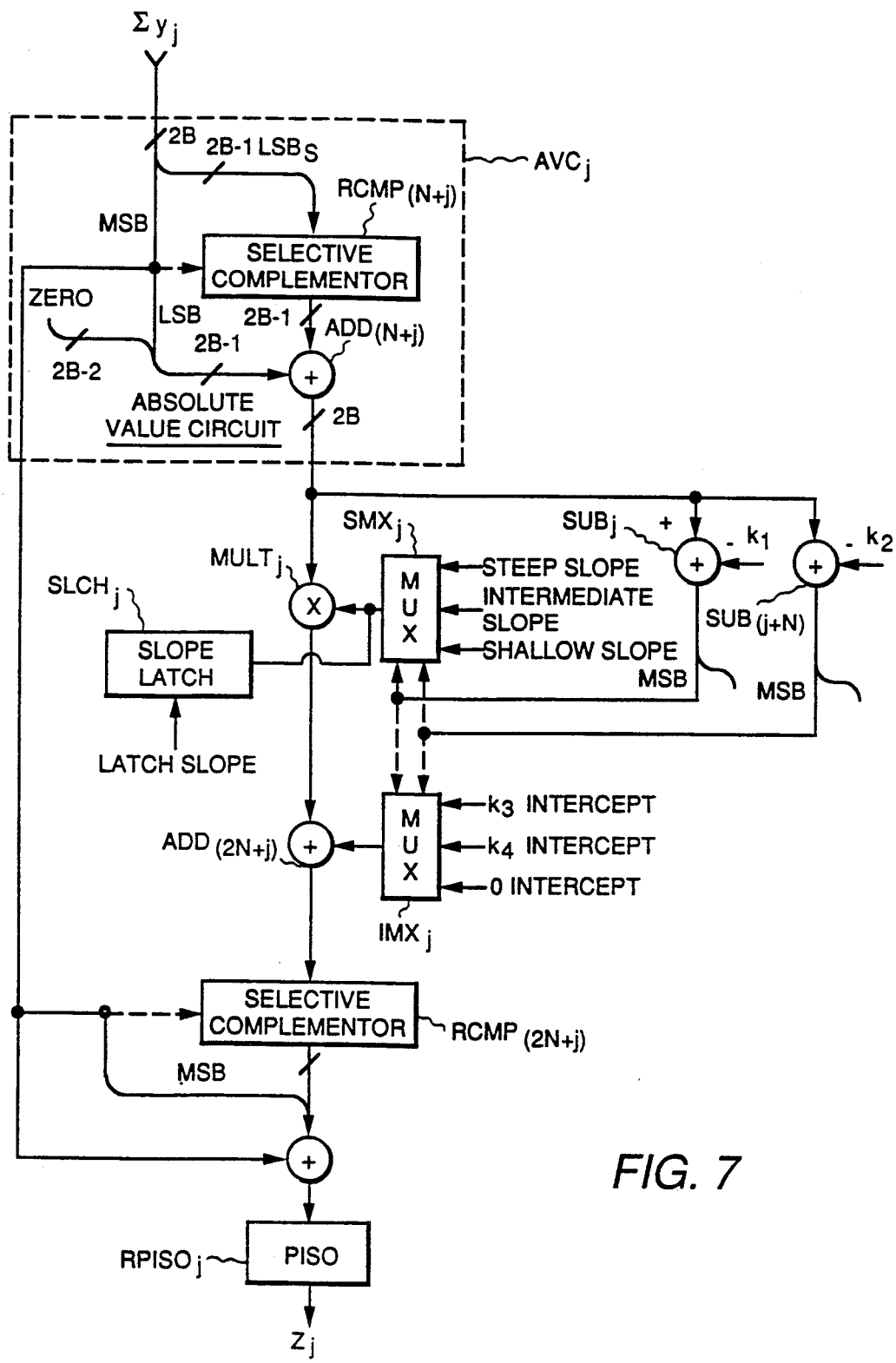
FIG. 7 is a schematic diagram of a digital non-linear processor that is used in neural net layers embodying the invention.

The respective $\Sigma y_j$ final weighted summation result generated by each accumulator $RACC_i$ is latched by a respective clocked latch $RLCH_i$ to be temporarily stored until such time as the next final weighted summation result $\Sigma y_j$ is generated by the accumulator $RACC_i$. The respective $\Sigma y_j$ final weighted summation result from latch $RLCH_i$ is supplied as augend input signal to a respective digital adder $ADD_j$, which may receive as an addend a final weighted summation result $\Sigma y_j'$ of lesser significance from a further, less significant rank of capacitors for weighting the plurality M in number of parallel bit streams $x_1$, $x_2$, ... $x_M$, which final weighted summation result $\Sigma y_j'$ of lesser significance is appropriately attenuated respective to $\Sigma y_j$ by a wired shift right $WSR_i$. The sum output signal $z_i$ from the adder $ADD_i$ is supplied to the ensuing digital non-linear processor $NLP_i$; and, as shown in FIG. 6A, the non-linear response from the digital non-linear processor $NLP_i$ is applied to the succeeding circuitry NEXT.

Where the input signals to the FIG. 2, FIG. 3 or FIG. 4 weighted summation apparatus comprise plural-bit words, the N signals $z_1$, $z_2$, ... $z_N$ from a succeeding FIG. 5 weighted summation apparatus can then, per FIG. 6, be applied to an array of respective digital non-linear processors $NLP_1$, $NLP_2$, ... $NLP_N$ to generate a plurality, N in number, of digital axonal output responses for application to the succeeding circuitry NEXT. For example, this succeeding circuitry may be an output neural net layer where the neural net layer thusfar described is a hidden neural net layer. FIG. 7 shows circuitry that can be used to implement a digital non-linear processor $NLP_j$ as may be used for each of the digital non-linear processors $NLP_1$, $NLP_2$, $NLP_3$, ... $NLP_N$ of FIG. 6. The FIG. 7 digital non-linear processor is used to obtain a transfer function as diagrammed in FIG. 8. The FIG. 8 transfer function approximates a sigmoidal symmetrically non-linear response by five straight line segments 11, 13, 15, 17 and 19. One skilled in the art of digital circuit design will after being acquainted with the following description of the FIG. 7 digital non-linear processor be able to design more complex digital non-linear processors approximating a sigmoidal transfer characteristic using an odd number greater than five of straight line segments.

Figure 8:
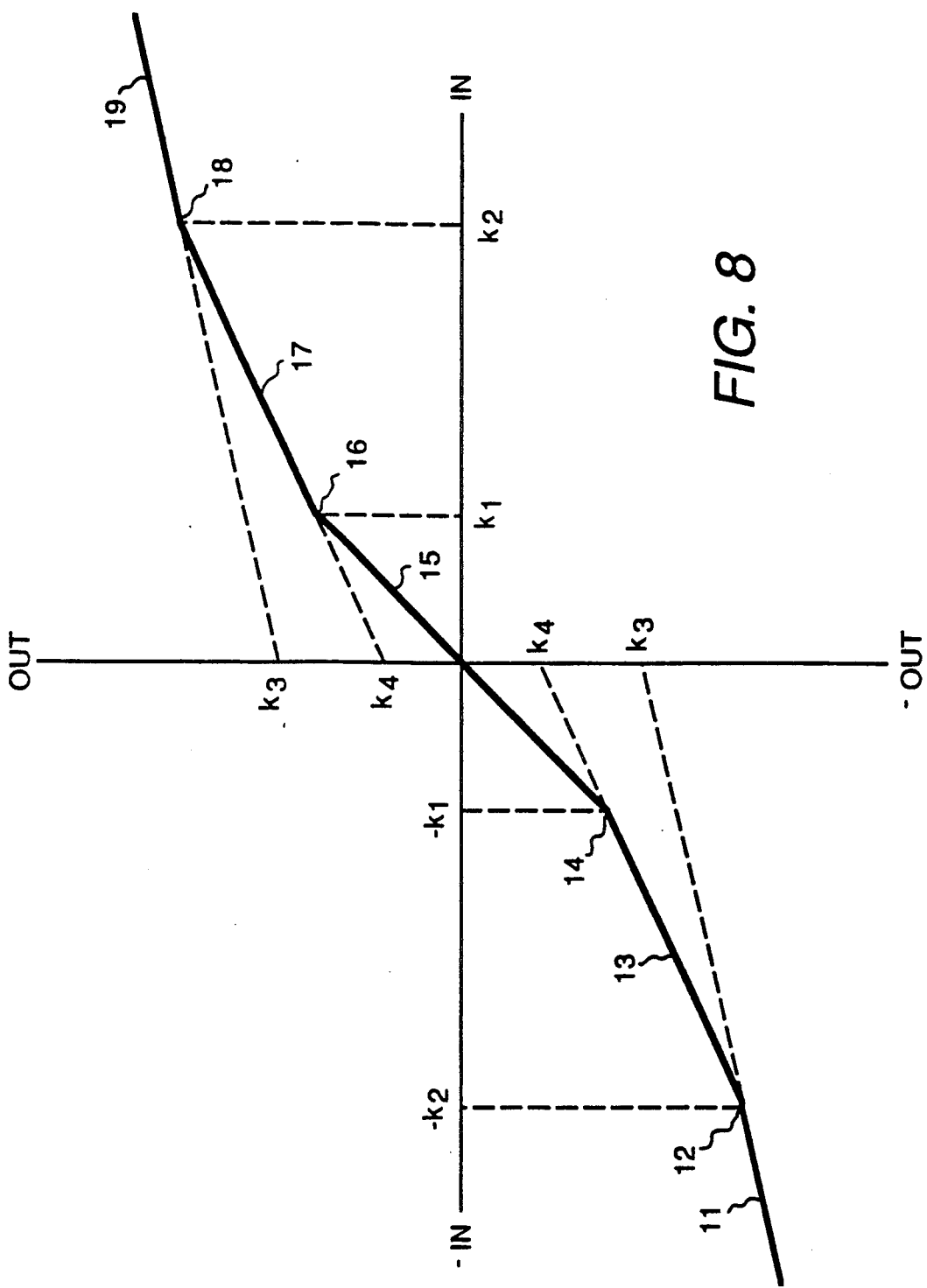
FIG. 8 is a graph showing the non-linear transfer function of the FIG. 7 digital non-linear processor.

In the FIG. 8 graph of the transfer function of the FIG. 7 digital non-linear processor, the straight line segment 15 passes through zero input signal, extending between inflection points 14 and 16 which occur at input signals of values $-k_1$ and $k_1$, respectively. The input signal has relatively small absolute magnitudes in the range defined by the straight line segment 15, which segment of the transfer characteristic has the steepest slope and passes through the origin of the transfer characteristic graph.

The straight line segment 11 extending left and down from inflection point 12 and the straight line segment 19 extending right and up from inflection point 18 have the shallowest slope. The input signal has relatively large absolute magnitudes in the ranges defined by the straight line segments 11 and 19. If the straight line segment 11 were extended without change in its direction right and up from inflection point 12 it would cross the input axis at an intercept value of $-k_3$; and if the straight line segment 19 were extended without change in its direction left and down from inflection point 18 it would cross the input axis at an intercept value of $+k_3$.

The input signal has intermediate absolute magnitudes in the ranges defined by the straight line segments 13 and 17. The straight line segment 13 extends between the inflection points 12 and 14 and, if it were extended without change in its direction beyond inflection point 14, would cross the output signal axis at an intercept value of $-k_4$. The straight line segment 17 extends between the inflection points 16 and 18 and, if it were extended without change in its direction beyond inflection point 16, would cross the output signal axis at an intercept value of $+k_4$.

In the FIG. 7 digital non-linear processor the digital final weighted summation result $\Sigma y_j$ is supplied to a respective absolute value circuit $AVC_j$ where the most significant, sign bit conditions a selective complementor $RCMP_{(N+j)}$ to complement the less significant bits of $\Sigma y_j$ when $z_j$ is negative. The output signal from the selective complementor $RCMP_{(N+j)}$ is supplied as augend signal to a digital adder $ADD_{(N+j)}$, which is supplied the most significant bit of $\Sigma y_j$ as an addend signal.

The sum output of the adder $ADD_{(N+j)}$ is the $|\Sigma y_j|$ output signal of the absolute value $AVC_j$.

A digital subtractor $SUB_j$ is used for subtracting a positive constant value $k_1$ from $|\Sigma y_j|$ to determine whether $|\Sigma y_j|$ being $<k_1$ should be on a portion of the non-linear transfer characteristic having steepest slope or whether $|\Sigma y_j|$ being $\geq k_1$ should be on a portion of the non-linear transfer characteristic having a shallower slope. If the most significant, sign bit of the difference output signal of the subtractor $SUB_j$ is a ONE, indicating $|\Sigma y_j|<k_1$, a slope multiplexer $SMX_j$ selects the steepest transfer characteristic slope as the multiplier signal for a digital multiplier $MULT_j$ that is supplied $|\Sigma y_j|$ as multiplicand signal. The digital product is then added in a digital adder $ADD_{(2N+j)}$ to a zero-value intercept, as selected by an intercept multiplexer $IMX_j$ responsive to the sign bit of the difference output signal of subtractor $SUB_j$ being a ONE, to generate the non-linear response $|z_j|$ to $|\Sigma y_j|$.

A digital subtractor $SUB_{(N+j)}$ is used for subtracting a positive constant value $k_2$ from $|\Sigma y_j|$ to determine whether $|\Sigma y_j|$ being $\geq k_2$ should be on a portion of the non-linear transfer characteristic having shallowest slope or whether $|\Sigma y_j|$ being $<k_2$ should be on a portion of the non-linear characteristic having a steeper slope. If the most significant sign bit of the difference output signal of the subtractor $SUB_{(N+j)}$ is a ZERO, indicating $|\Sigma y_j|\geq k_2$, the slope multiplexer $SMX_j$ selects the shallowest transfer characteristic slope as the multiplier signal for the digital multiplier $MULT_j$; and the intercept multiplexer $IMX_j$ selects an intercept of value $k_3$ somewhat smaller than $k_2$ to be added to the product from multiplier $MULT_j$ in adder $ADD_{(N+j)}$ to generate $|z_j|$.

Responsive to the most significant bits of the difference signals from the subtractors $SUB_j$ and $SUB_{(N+j)}$ being ZERO and ONE respectively, indicative that $|\Sigma y_j|$ should be on a portion of the non-linear transfer characteristic have a slope intermediate between the steepest and shallowest slopes, the slope multiplexer $SMX_j$ selects that intermediate slope as multiplier signal to the multiplier $MULT_j$, and the intercept multiplexer $IMX_j$ selects an intercept of value $k_4$ somewhat smaller than $k_1$ as the addend signal supplied to the adder $ADD_{(2N+j)}$.

The non-linear response $|z_j|$ to $|\Sigma y_j|$ is converted to $z_j$ response to $\Sigma y_j$ by processing $|z_j|$ through a selection complementor $CMP_{(2N+j)}$ that complements each bit of $|z_j|$ when the most significant, sign bit of $\Sigma y_j$ is a ONE indicating its negativity; inserting the most significant bit of $\Sigma y_j$ as sign bit before the selective complementor $CMP_{(2N+j)}$ output signal; and adding the resultant in a digital adder $ADD_{(3N+j)}$ to the most significant bit of $\Sigma y_j$. The sum signal from the digital $ADD_{(3N+j)}$ is then used to load a parallel-in/serial-out register $RPISO_j$ for the $j^{th}$ row, which supplies $z_j$ in bit-serial format to the succeeding circuitry NEXT (per FIG. 6).

During back-propagation training, the value of the slope selected by the slope multiplexer $SMX_j$ responsive to the $|\Sigma y_j|$ generated by a set of prescribed synapse input signals can be temporarily stored in a latch $SLCH_j$ responsive to a LATCH SLOPE command. This operation will be considered as part of an overall description of back-propagation training further on in this specification. In FIGS. 13-16 and 20-24, the slope latch $SLCH_j$ is shown external to the digital non-linear processor $NLP_j$ with which it is associated.

FIG. 9 shows a modification of the FIG. 2 or FIG. 3 apparatus in which the multiplexers $MX_1 \ldots MX_M$, $MX_{(M+1)} \ldots MX_{2M}$ that each select from between two operating voltages the voltage applied to a corresponding one of the input lines $IL_1 \ldots IL_M$, $IL_{(M+1)} \ldots IL_{2M}$ are replaced by multiplexers $MX_1' \ldots MX_M'$, $MX_{(M+1)}'$ $\ldots MX_{2M}'$ that each select from among the $V_{DD}$, $V_{SS}$ and $(V_{SS}+V_{DD})/2$ operating voltages the voltage applied to a corresponding one of the input lines $IL_1 \ldots IL_M$, $IL_{(M+1)} \ldots IL_{2M}$. The current condition of the SIGN BIT FLAG is applied to each of the multiplexers $MX_i'$ and $MX_{(M+i)}'$ as its first control bit, and the current bit of a respective input voltage signal $x_i$ is applied to each of the multiplexers $MX_i'$ and $MX_{(M+i)}'$ as its second control signal.

For all bits of $x_i$ except its sign bits, the SIGN BIT FLAG is a ZERO. The SIGN BIT FLAG being a ZERO conditions multiplexer $MX_i'$ to respond to $x_i$ being a ONE to apply the $V_{DD}$ first operating voltage to an input line $IL_i$ and to respond to $x_i$ being a ZERO to apply the third operating voltage $(V_{SS}+V_{DD})/2$ to the input line $IL_i$. The SIGN BIT FLAG being a ZERO conditions multiplexer $MX_{(M+i)}'$ to respond to $x_i$ being a ONE to apply the $V_{SS}$ second operating voltage to an input line $IL_{(M+i)}$ and to respond to $x_i$ being a ZERO to apply the third operating voltage $(V_{SS}+V_{DD})/2$ to the input line $IL_{(M+i)}$.

When the sign bits of $x_i$ occur, the SIGN BIT FLAG is a ONE. The SIGN BIT FLAG being a ONE conditions multiplexer $MX_i'$ to respond to $x_i$ being a ONE to apply the $V_{SS}$ second operating voltage to an input line $IL_i$ and to respond to $x_i$ being a ZERO to apply the third operating voltage $(V_{SS}+V_{DD})/2$ to the input line $IL_i$. The SIGN BIT FLAG being a ONE conditions multiplexer $MX_{(M+i)}'$ to respond to $x_i$ being a ONE to apply the $V_{DD}$ first operating voltage to an input line $IL_{(M+i)}$ and to respond to $x_i$ being a ZERO to apply the third operating voltage $(V_{SS}+V_{DD})/2$ to the input line $IL_{(M+i)}$. Accordingly, the reversal of sign in the weighting of the parallel sign bits of the bit-serial synapse input signals is done while performing the partial weighted summations.

FIG. 10 shows a modification of the FIG. 4 apparatus in which the multiplexers $MX_1, MX_2, MX_3, \ldots MX_M$, that each select from between two operating voltages the voltage applied to a corresponding one of the input lines $IL_1, IL_2, IL_3, \ldots IL_M$ are replaced by multiplexers $MX_1', MX_2', \ldots MX_M'$ that each select from among the $V_{DD}$, $V_{SS}$ and $(V_{SS}+V_{DD})/2$ operating voltages the voltage applied to a corresponding one of the input lines $IL_1, IL_2, IL_3, \ldots IL_M$. The multiplexers $MX_1', MX_2', \ldots MX_M'$ are controlled in the FIG. 10 apparatus similarly to the way they are in FIG. 9 apparatus, again to provide the reversal of sign in the weighting of the parallel sign bits of the bit-serial synapse input signals while performing the partial weighted summations.

Figure 11:
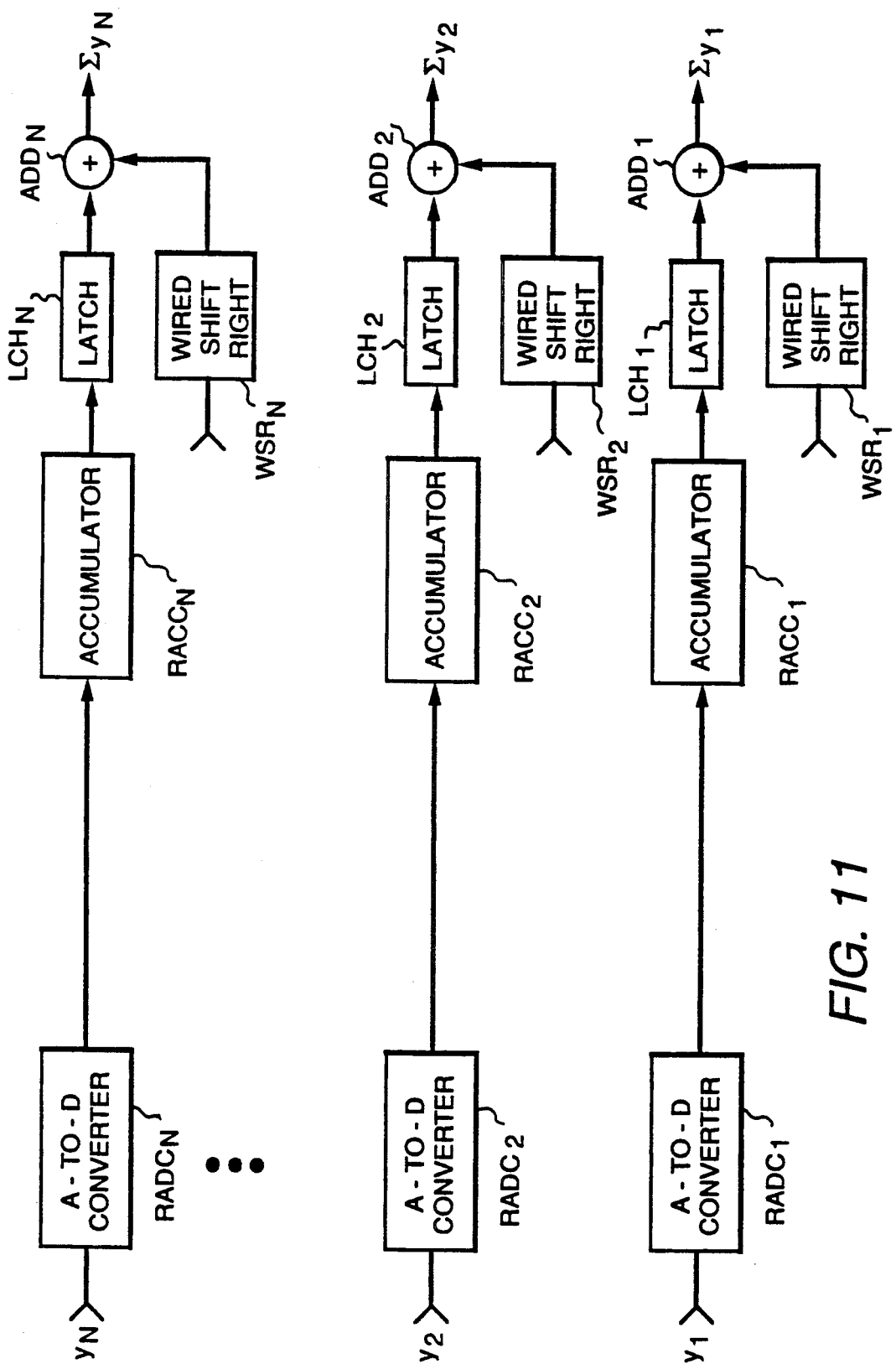
FIG. 11 is a schematic diagram of apparatus for digitizing analog partial weighted summation results as sequentially supplied from one of the FIG. 9 and FIG. 10 apparatuses and then digitally performing a plurality of weighted summation procedures, each of which weighted summation procedures weights and sums a respective succession of digitized sequentially supplied data.

FIG. 11 shows the apparatus for performing the final weighted summation of partial weighted summation results from the FIGS. 9 or 10 apparatus. The FIG. 11 apparatus differs from the FIG. 5 apparatus in that: there are no selective complementors $RCMP_1, RCMP_2, \ldots RCMP_N$ included in the respective connections of the A-to-D converters $RADC_1, RADC_2 \ldots RADC_N$ to the accumulators $RACC_1, RACC_2, \ldots RACC_N$; and the accumulators invariably have ZERO carry inputs.

Figure 12A:
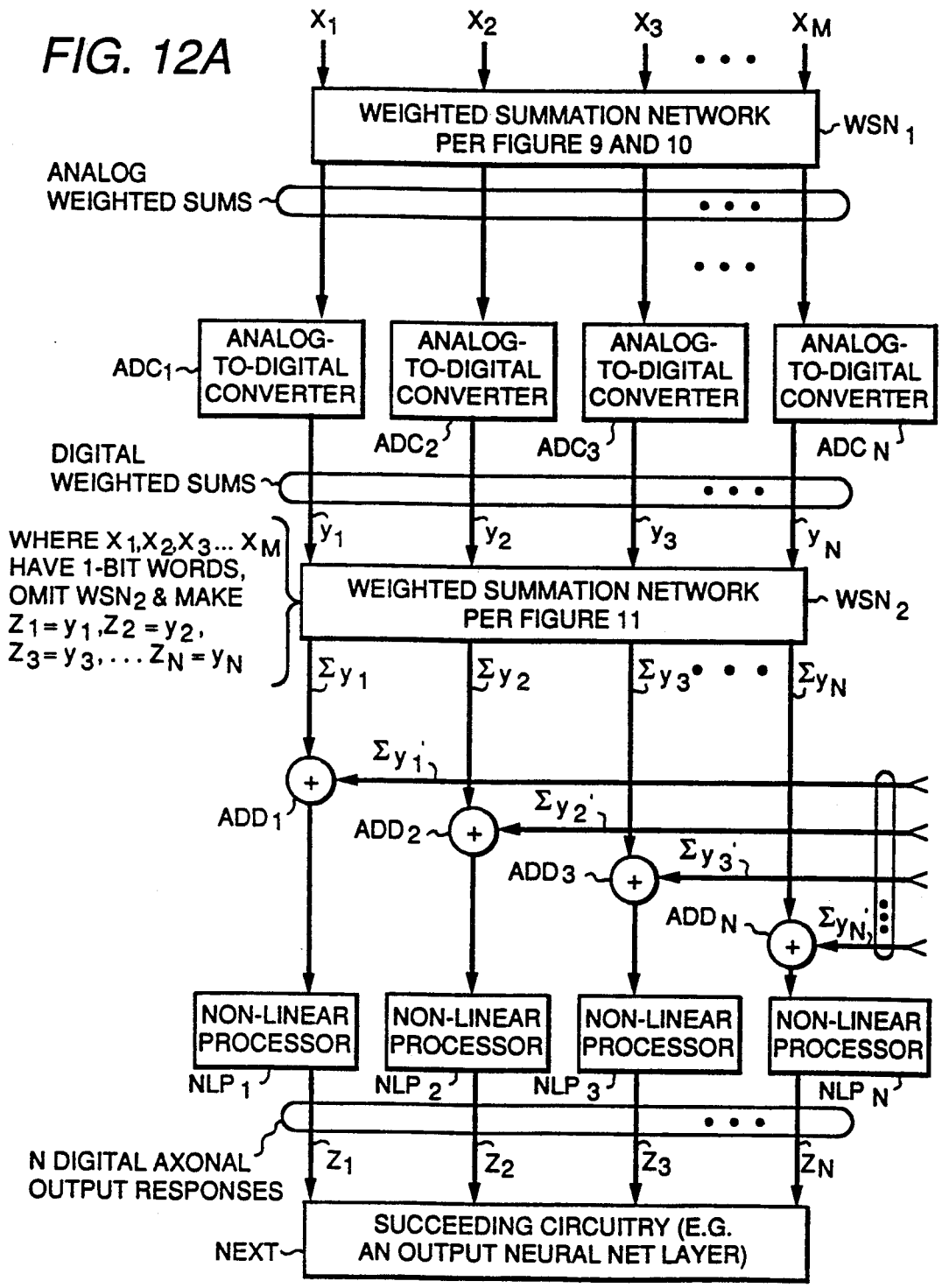
FIGS. 12A and 12B, arranged respectively on the left and on the right of the other, together form a schematic diagram (generally referred to as FIG. 12) of a neural net layer including either of the FIG. 9 and FIG. 10 apparatuses for performing a plurality of partial weighted summation procedures; an array of analog-to-digital converters for digitizing the partial weighted summation results; possibly a FIG. 11 apparatus for digitally performing a plurality of digital final weighted summation procedures; and an array of digital non-linear processors generating digital axonal responses to the digital final weighted summation results.
Figure 12B:
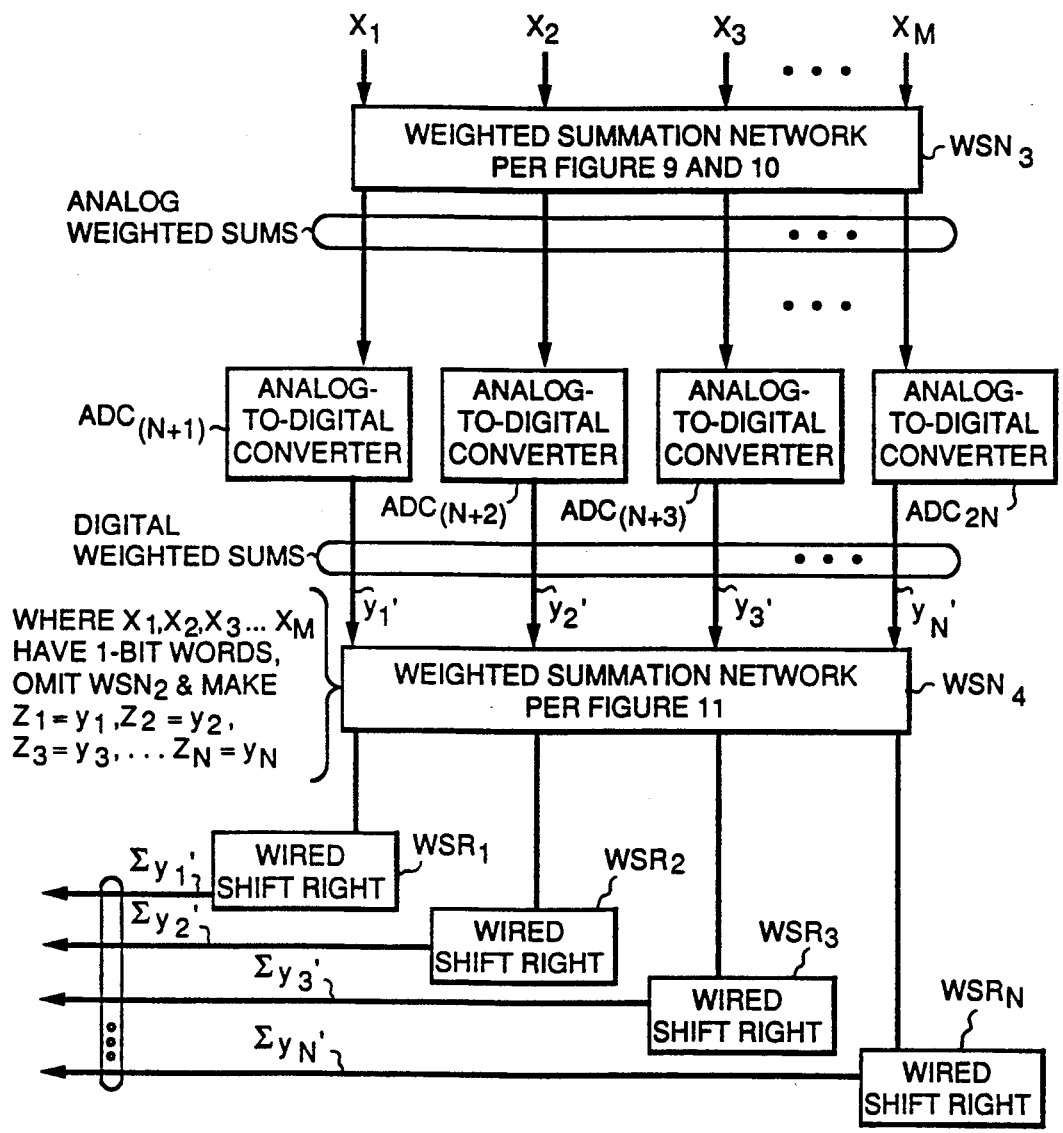

FIG. 12 is a schematic diagram of a neural net layer similar to the neural net layer of FIG. 6, but includes either of the FIG. 9 and FIG. 10 apparatuses as a weighted summation network $WSN_1'$ for performing a plurality of weighted summation procedures, so the reversal of sign in the weighting of the parallel sign bits of the bit-serial synapse input signals takes place in the weighted summation network $WSN_1'$. Where the weighted summation procedures performed in the weighted summation network $WSN_1'$ generate partial weighted summation results, a weighted summation network $WSN_2'$ comprising the FIG. 11 apparatus is used to generate final weighted summation results for application to an array of non-linear processors $NLP_1$, $NLP_2$, ... $NLP_N$. The non-linear processors $NLP_1$, $NLP_2$, ... $NLP_N$ have their analog axonal output signals digitized in respective A-to-D converters $RADC_1$, $RADC_2$, ... $RADC_N$, for application to the succeeding circuitry NEXT.

The nature of the analog-to-digital converters $RADC_i$ has thusfar not been considered in detail. Indeed, a wide variety of A-to-D converters can be used in implementing the neural network layers described above. Some A-to-D converter structures are capable of accepting input signals in charge form, and in such a structure the charge sensing means and the analog-to-digital converting means specified in certain of the claims appended to this application will both be provided. The bit-slicing of input signals already slows data word throughput rate, so oversampling A-to-D converters, as of the sigma-delta type will not be favored over successive-approximation A-to-D converters unless quite slow data processing rates are acceptable. Where fairly fast data processing rates are required, flash A-to-D converters will be preferred oversuccessive-approximation A-to-D converters. The resistive ladder used to scale reference voltage in a flash A-to-D converter can be shared with other flash A-to-D converters within the same monolithic integrated circuit, economizing the amount of hardware associated with this approach to analog-to-digital conversion.

Figure 13A:
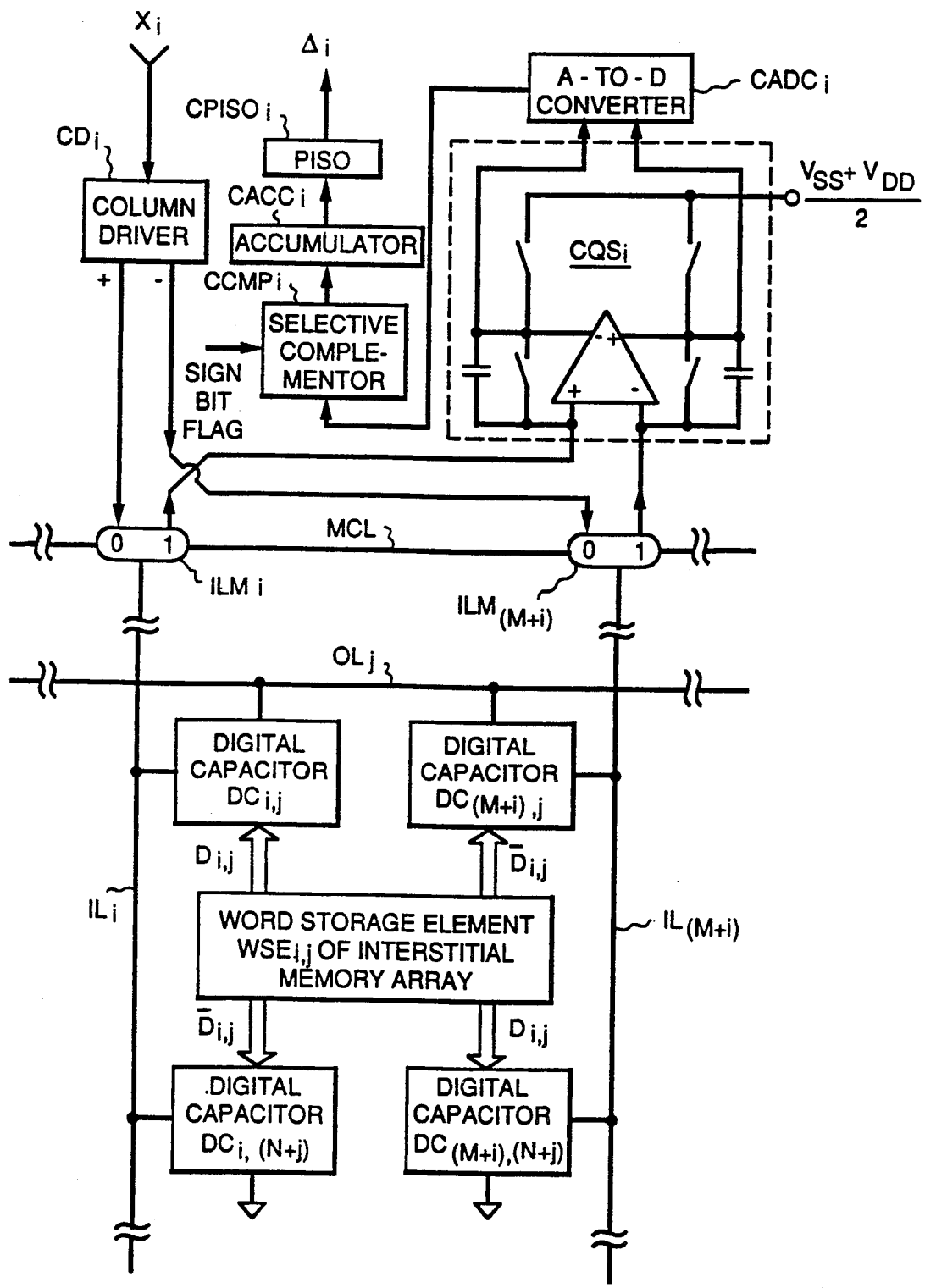
FIGS. 13A and 13B, arranged respectively on the left and on the right of the other, together form a FIG. 13 which is a schematic diagram of a modification that can be made manifold times to the neural net shown in FIGS. 2, 5 and 6.
Figure 13B:
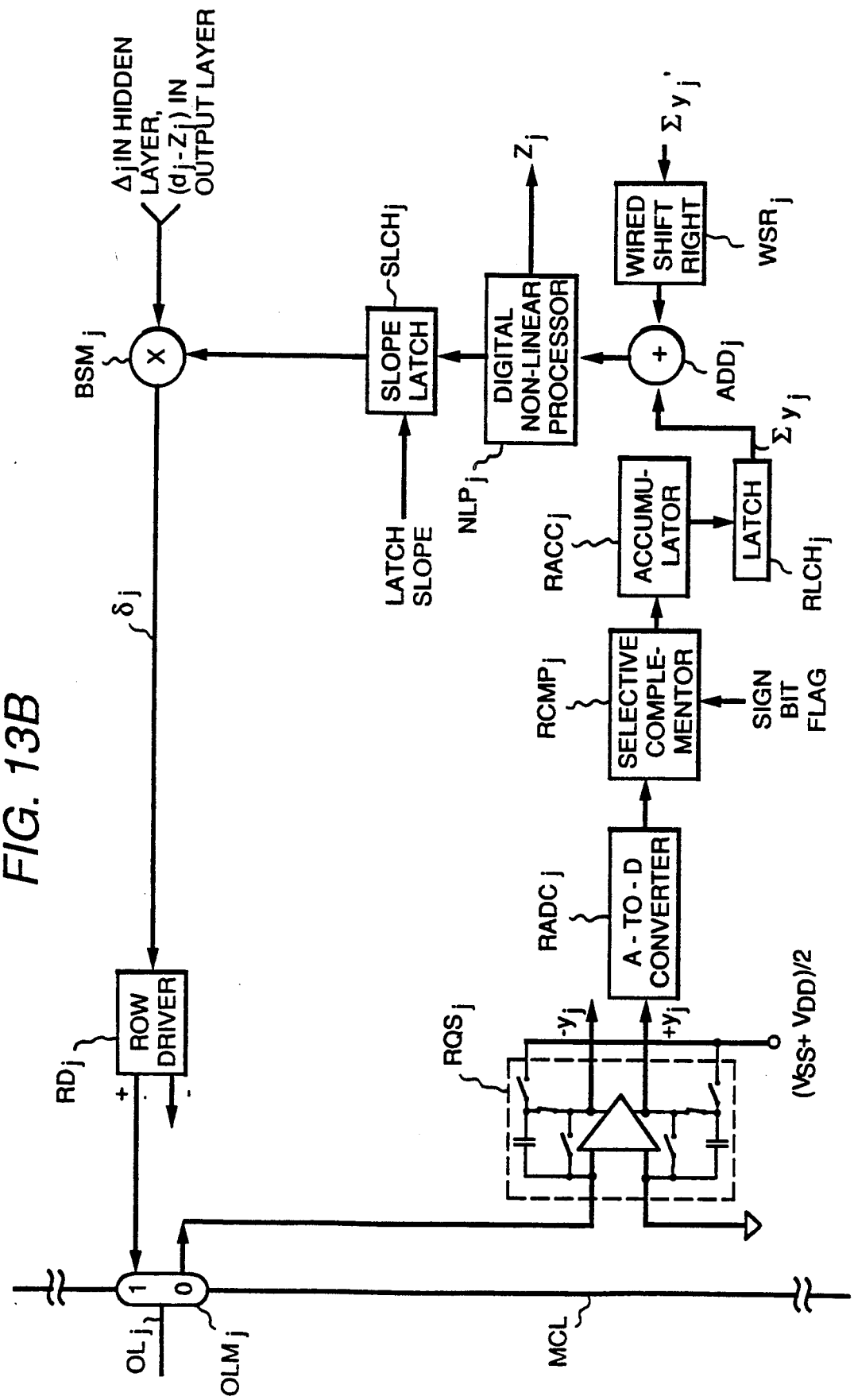

FIG. 13, comprising component FIGS. 13A and 13B, shows a representative modification that can be manifoldly made to a neural net as shown in FIGS. 2, 5 and 6 or in FIGS. 3, 5 and 6. Each neural net layer comprises a capacitive network viewed as having a plurality M in number of columns of capacitive weights and a plurality N in number of rows of capacitive weights. The description that follows focuses on the intersection of an $i^{th}$ of these columns with a $j^{th}$ of these rows, where i is a column index from 1 to M and j is a row index from 1 to N.

A respective modification is made near each set of intersections of an output line $OL_j$ with input lines $IL_i$ and $IL_{(M+i)}$ driven by opposite senses of a synapse input signal $x_i$. Such modifications together make the neural net capable of being trained. Each capacitor pair $C_{i,j}$ and $C_{(M+i),j}$ of the FIGS. 2 or 3 portion of the neural net is to be provided by a pair of digital capacitors $DC_{i,j}$ and $DC_{(M+i),j}$. Capacitors $DC_{i,j}$ and $DC_{(M+i),j}$ are preferably of the type described by W. E. Engeler in his U.S. patent application Ser. No. 526,470 filed May 21, 1990, entitled "CAPACITIVE STRUCTURES FOR WEIGHTED SUMMATION, AS USED IN NEURAL NETS". The capacitances of $DC_{i,j}$ and $DC_{(M+i),j}$ are controlled in complementary ways by a digital word and its one's complement, as drawn from a respective word-storage element $WSE_{i,j}$ in an array of such elements located interstitially among the rows of digital capacitors and connected to form a memory. This memory may, for example, be a random access memory (RAM) with each word-storage element $WSE_{i,j}$ being selectively addressable by row and column address lines controlled by address decoders. Or, by way of further example, this memory can be a plurality of static shift registers, one for each column j. Each static shift register will then have a respective stage $WSE_{i,j}$ for storing the word that controls the capacitances of each pair of digital capacitors $DC_{i,j}$ and $DC_{(M+i),j}$.

The word stored in word storage element $WSE_{i,j}$ may also control the capacitances of a further pair of digital capacitors $DC_{i,(N+j)}$ and $DC_{(M+i),(N+j)}$, respectively. Capacitors $DC_{i,(N+j)}$ and $DC_{(M+i),(N+j)}$ are also preferably of the type described by W. E. Engeler in his U.S. patent application Ser. No. 526,470 filed May 21, 1990, entitled "CAPACITIVE STRUCTURES FOR WEIGHTED SUMMATION, AS USED IN NEURAL NETS". The capacitors $DC_{i,(N+j)}$ and $DC_{(M+i),(N+j)}$ connect between "ac ground" and input lines $IL_i$ and $IL_{(M+i)}$, respectively, and form parts of the loading capacitors $CL_i$ and $CL_{(M+i)}$, respectively. The capacitances of $DC_{(M+i),(N+j)}$ and $DC_{i,j}$ are similar to each other and changes in their respective values track each other. The capacitances of $DC_{i,(N+j)}$ and $DC_{(M+i),j}$ are similar to each other and changes in their respective values track each other. The four digital capacitors $DC_{i,j}$, $DC_{(M+i)}$, $DC_{i,(N+j)}$ and $DC_{(M+i),(N+j)}$ are connected in a bridge configuration having input terminals to which the input lines $IL_i$ and $IL_{(M+i)}$ respectively connect and having output terminals connecting to output line $OL_j$ and to ac ground respectively. This bridge configuration facilitates making computations associated with back-propagation programming by helping make the capacitance network bilateral insofar as voltage gain is concerned. Alternatively, where the computations for back-propagation programming are done by computers that do not involve the neural net in the computation procedures, the neural net need not include the digital capacitors $DC_{i,(N+j)}$ and $DC_{(M+i),(N+j)}$. These digital capacitors $DC_{i,(N+j)}$ and $DC_{(M+i),(N+j)}$ are not needed either if very large loading capacitors are placed on the output lines $OL_j$, but this alternative undesirably reduces sensitivity of the row charge-sensing amplifier $RQS_j$.

A respective column driver $CD_i$ applies complementary bit-sliced digital signals to each pair of input lines $IL_i$ and $IL_{(M+i)}$. The column driver $CD_i$ comprises the multiplexers $MX_i$ and $MX_{(M+i)}$ connected per FIG. 2 or per FIG. 3. When the neural net modified per FIG. 13 is being operated normally, following programming, the $\phi p$ signal applied to a mode control line MCL is a logic ZERO. This ZERO conditions a respective input line multiplexer $ILM_i$ to connect the non-inverting output port of each column driver $CD_i$ to input line $IL_i$. The $\phi p$ signal on mode control line MCL being a ZERO also conditions a respective input line multiplexer $ILM_{(M+i)}$ to connect the inverting output port of each column driver $CD_i$ to input line $IL_{(M+i)}$.

A ZERO on mode control line MCL also conditions each output line multiplexer $OLM_j$ of an N-numbered plurality thereof to select the output line $OL_j$ to the input port of a respective row charge-sensing amplifier $RQS_j$ that performs a charge-sensing operation for output line $OL_j$. When $\phi p$ signal on mode control line MCL is a ZERO, the input signal $x_i$ induces a total change in charge on the capacitors $DC_{i,j}$ and $DC_{(M+i),j}$ proportional to the difference in their respective capacitances. The resulting displacement current flow from the input port of the row charge-sensing amplifier $RQS_j$ requires that there be a corresponding displacement current flow from the Miller integrating capacitor $CI_j$ in the row charge-sensing amplifier $RQS_j$ charging that capacitor to place thereon a voltage $v_j$ defined as follows.

$$v_j = (CI_j)^{-1} \sum_{i=1}^{M} (C_{i,j} - C_{(M+i),j}) x_i \qquad (5)$$

The voltage $V_j$ is supplied to an analog-to-digital converter $RADC_j$ for the $j^{th}$ row of the capacitive network, which digitizes voltage $V_j$ to generate a digital signal $y_j$ for the $j^{th}$ row that is assumed to be a two's complement digital signal. The digitized $V_j$ signal is supplied to a selective complementor $RCMP_j$ for the $j^{th}$ row, which passes the digitized $V_j$ signal without change for each of the bit slices of the input signals $x_1$, $x_2$, ... $x_M$ except the sign bit slices. For the sign bit slices the selective complementor $RCMP_j$ one's complements the bits of the digitized $V_j$ signal and adds unity thereto. The selective complementor $RCMP_j$ supplies its output signal to an accumulator $RACC_j$ for the $j^{th}$ row of the capacitive network. The accumulator $RACC_j$ accumulates the bit slices of each set of samples of the input signals $x_1$, $x_2$, ... $x_M$ as weighted for the output line $OL_j$, sensed and digitized; the accumulator result $\Sigma y_j$ is latched by a respective row latch $RLCH_j$ for the $j^{th}$ row; and the accumulator $RACC_j$ is then reset to zero. At the same time the accumulator $RACC_j$ is reset to zero, to implement dc-restoration a reset pulse $\phi_R$ is supplied to the charge sensing amplifier $RQS_j$ for the $j^{th}$ row and to the charge sensing amplifiers for the other rows. During the dc-restoration all $x_i$ are "zero-valued".

During training, the $\phi_P$ signal applied to mode control line MCL is a logic ONE, which causes the output line multiplexer $OLM_j$ to disconnect the output line $OL_j$ from the charge sensing amplifier $RQS_j$ and to connect the output line $OL_j$ to receive a bit-sliced $\delta_j$ error term. This $\delta_j$ error term is generated by a row driver $RD_j$ responsive to the bit-serial digital product output signal of a digital multiplier $BSM_j$, responsive to a signal $\Delta_j$ and to the slope stored in the slope latch $SLCH_j$. The term $\Delta_j$ for the output neural net layer is the difference between $z_j$ actual value and its desired value $d_j$. The term $\Delta_j$ for a hidden neural net layer is the $\Delta_j$ output of the succeeding neural net layer during the back-propagation procedure.

The row driver $RD_j$ is shown as a type having differential outputs which can be provided by a pair of multiplexers similar to input multiplexers $MX_i$ and $MX_{(M+i)}$ connected as in FIG. 2 or as in FIG. 3. Since output of only one sense is required to drive the single-ended output line $OL_j$, as used in the neural net layers shown in FIGS. 13 and 20, however, it is preferable from the standpoint of simplifying hardware to use row drivers $RD_j$ that consist of but a single multiplexer. Indeed, the row driver function may be subsumed in the bit-serial multiplier $BSM_j$. In the neural net layers shown in FIGS. 14, 16, 21 and 23 the row driver $RD_j$ must be of a type having differential outputs, as can be provided by a pair of multiplexers similar to input multiplexers $MX_i$ and $MX_{(M+i)}$ connected as in FIG. 2 or as in FIG. 3.

During training, the $\phi_p$ signal applied to the mode control line MCL being a ONE also causes the input line multiplexers $ILM_i$ and $ILM_{(M+i)}$ to disconnect the input lines $IL_i$ and $IL_{(M+i)}$ from the column driver $CD_i$ output ports and connect them instead to the non-inverting and inverting input terminals of a column charge-sensing amplifier $CQS_i$. Each successive partial summation of the weighted $\delta_1$, $\delta_2$, ... $\delta_N$, signals induces a differential change in charge between input lines $IL_j$ and $IL_{(M+i)}$ proportional to $(C_{i,j} - C_{(M+i),j})$, which differential change in charge is sensed using the column charge sensing amplifier $CQS_i$, then digitized in a respective column analog-to-digital converter $CADC_i$ for the $i^{th}$ column. The digital output signal from the column A-to-D converter $CQS_i$ is supplied to a selective complementor $CCMP_i$ for the $i^{th}$ column, which responds to a SIGN BIT FLAG to selectively one's complement the bits of that digital signal as applied to an accumulator $CACC_i$ for the $i^{th}$ column. The selective complementor $CCMP_i$ otherwise supplies the accumulator $CACC_i$ an input signal the bits of which correspond to the bits of the digital output signal from the column A-to-D converter $CQS_i$. The accumulator $CACC_i$ accumulates the successive partial summations of the weighted $\delta_1$, $\delta_2$, ... $\delta_N$, signals to generate the final weighted summation result $\Delta_i$ supplied to a parallel-in/serial-out register $CPISO_i$ for the $i^{th}$ column. The register $CPISO_i$ supplies the final weighted summation result $\Delta_i$ in bit-serial format for the bit-serial digital multiplier of the preceding neural net layer if such there be.

Resetting of the column charge sensing amplifier $CQS_i$ is normally done shortly after a ZERO to ONE transition appears in the $\phi_P$ signal applied to mode control line MCL and may also be done at other times. This procedure corrects for capacitive unbalances on the input lines $IL_i$ and $IL_{(M+i)}$ during back-propagation computations that follow the resetting procedure.

Figure 14A:
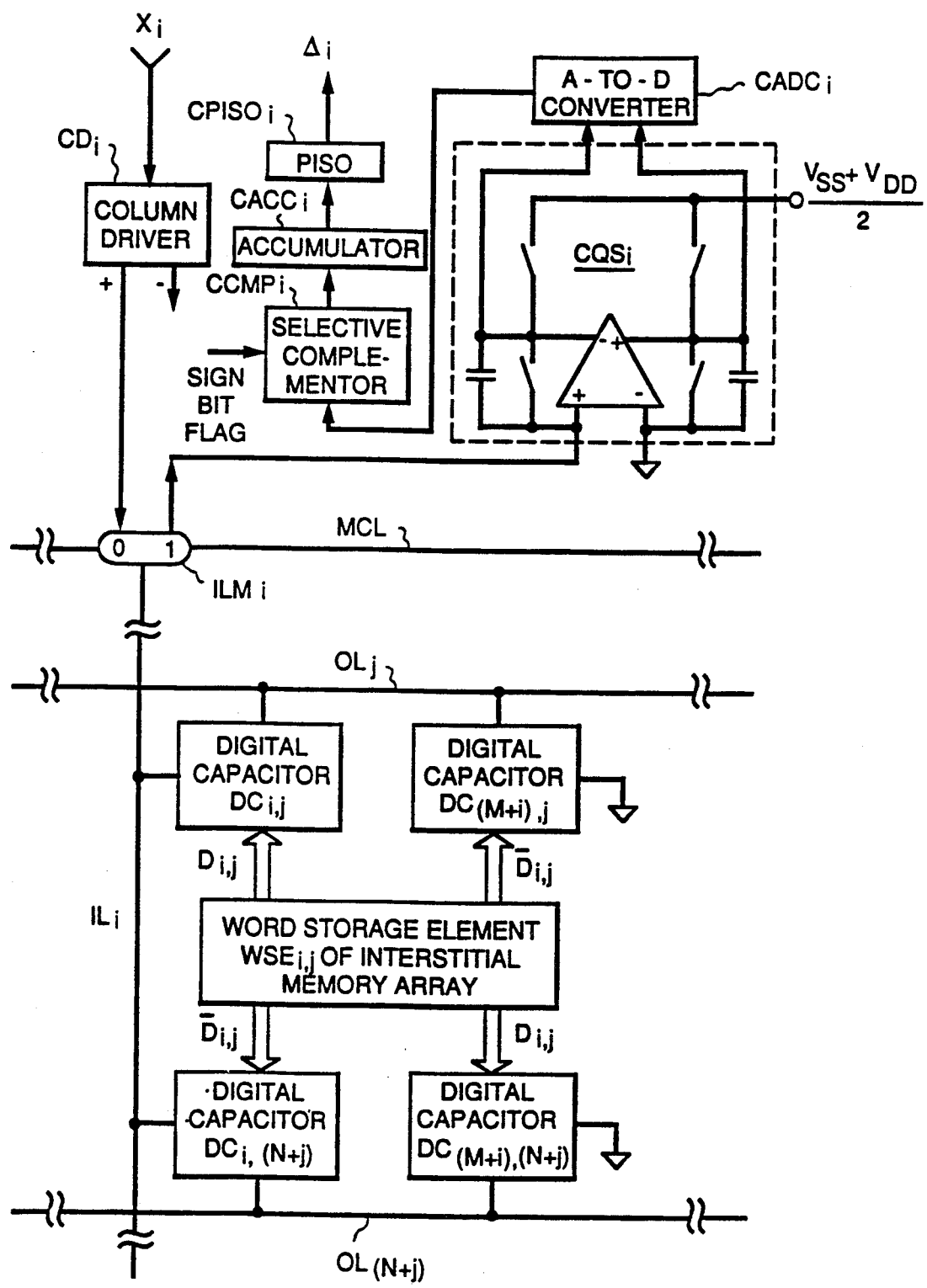
FIGS. 14A and 14B, arranged respectively on the left and on the right of the other, together form a FIG. 14 which is a schematic diagram of a modification that can be made manifold times to the neural net shown in FIGS. 4, 5 and 6, for the programmable weighting of the capacitances used in performing weighted summations of synapse signals.
Figure 14B:
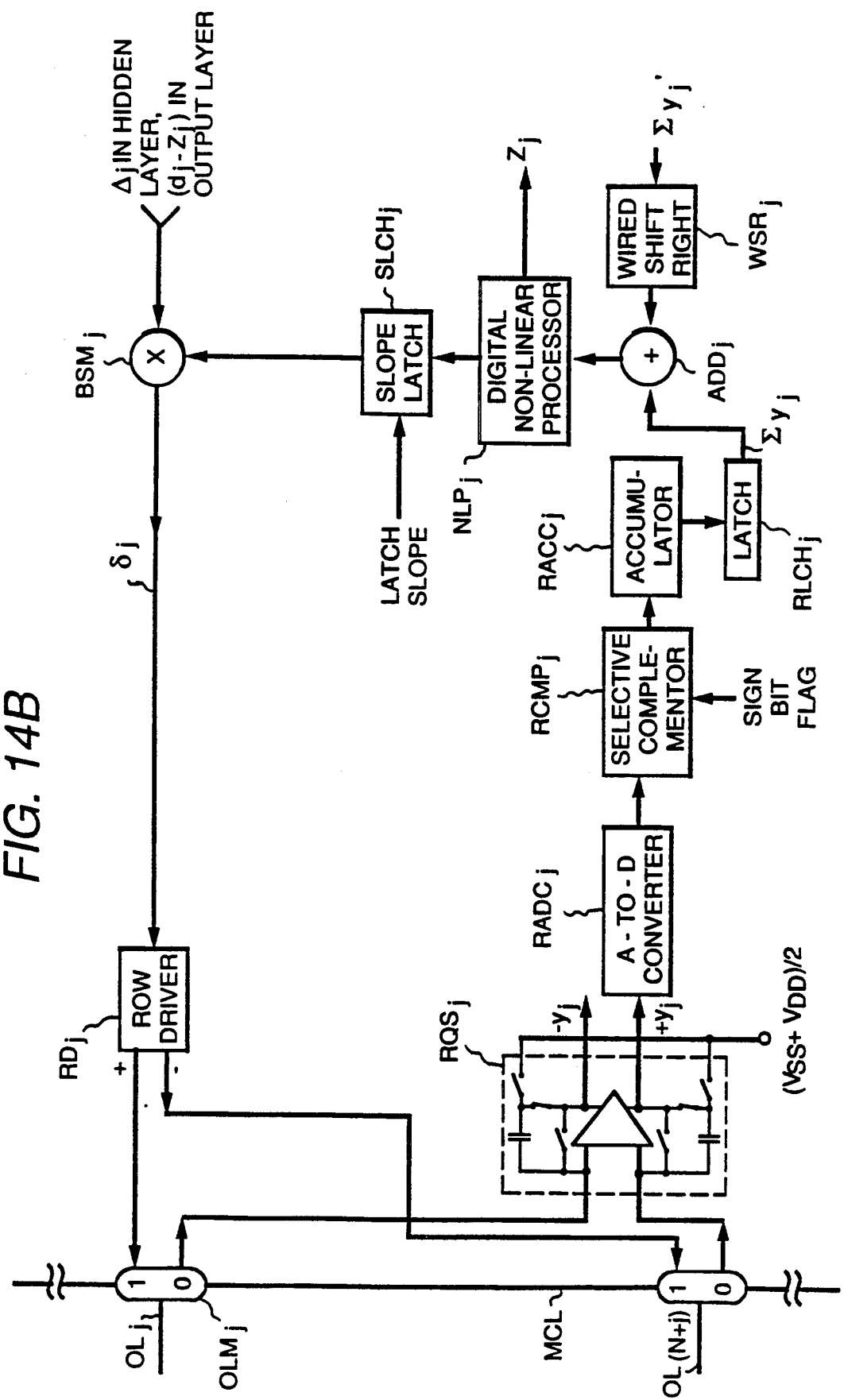

FIG. 14, comprising component FIGS. 14A and 14B, shows a representative modification that can be manifoldly made to a neural net as shown in FIGS. 4, 5 and 6. The four digital capacitors $DC_{i,j}$, $DC_{(M+i),j}$, $DC_{i,(N+j)}$ and $DC_{(M+i),(N+j)}$ are connected in a bridge configuration having input terminals connecting from the input line $IL_i$ and from a-c ground respectively and having output terminals connecting to output lines $OL_j$ and $OL_{(N+j)}$ respectively.

When the neural net layer per FIGS. 4, 5 and 6 is being operated normally, following programming, the $\phi_p$ signal applied to a mode control line MCL is a logic ZERO. This ZERO on mode control line MCL conditions each output line multiplexer $OLM_j$ of an N-numbered plurality thereof to select the output line $OL_j$ to the inverting input terminal of a fully differential amplifier in an associated differential charge sensing amplifier $RQS_j$ for the $j^{th}$ row. This ZERO on mode control line MCL also conditions each output line multiplexer $OLM_{(N+j)}$ to the non-inverting input terminal of the fully differential amplifier in the associated differential charge sensing amplifier $RQS_j$. When $\phi p$ signal on mode control line MCL is a ZERO, the input signal $x_i$ induces a total differential change in charge on the capacitors $DC_{i,j}$ and $DC_{i,(N+j)}$ proportional to the difference in their respective capacitances. The resulting displacement current flows needed to keep the input terminals of differential amplifier $DA_j$ substantially equal in potential requires that there be corresponding displacement current flow from the integrating capacitor $CI_j$ and $CI_{(N+j)}$ differentially charging those charging capacitors to place thereacross a differential voltage $v_j$ defined as follows.

$$v_j = (Cl_j + Cl_{(N+j)})^{-1} \sum_{i=1}^{M} (C_{i,j} - C_{(M+1),j}) x_i \qquad (6)$$

The A-to-D converter $RADC_j$ for the $j^{th}$ row is of a type capable of digitizing the balanced output signal from the differential charge sensing amplifier $RQS_j$. The selective complementor $RCMP_j$, the accumulator $RACC_j$, the row latch $RLCH_j$ for each $j^{th}$ row, the digital adder $ADD_j$, the digital non-linear processor $NLP_j$, the slope latch $SLCH_j$, and the digital multiplier $BSM_j$ correspond with those elements as described in connection with FIG. 13. The bit-serial product signal from the digital multiplier $BSM_j$ is supplied to the row driver $RD_j$, which can take either of the forms the column driver $CD_i$ can take in FIG. 13. During training, the $\phi_p$ signal applied to the mode control line MCL being a ONE causes the output line multiplexers $OLM_j$ and $OLM_{(N+j)}$ to connect the output lines $OL_j$ and $OL_{(N+j)}$ for receiving from the row driver $RD_j$ complementary digital responses to the bit-serial product from the digital multiplier $BSM_j$. The ONE on the mode control line MCL also causes each input line multiplexer $ILM_i$ to disconnect each input line $IL_i$ from the output port of the logic inverter $INV_i$ and connect it instead to supply charge on a single-ended basis to the input port of a column charge-sensing amplifier $CQS_i$.

Figure 15A:
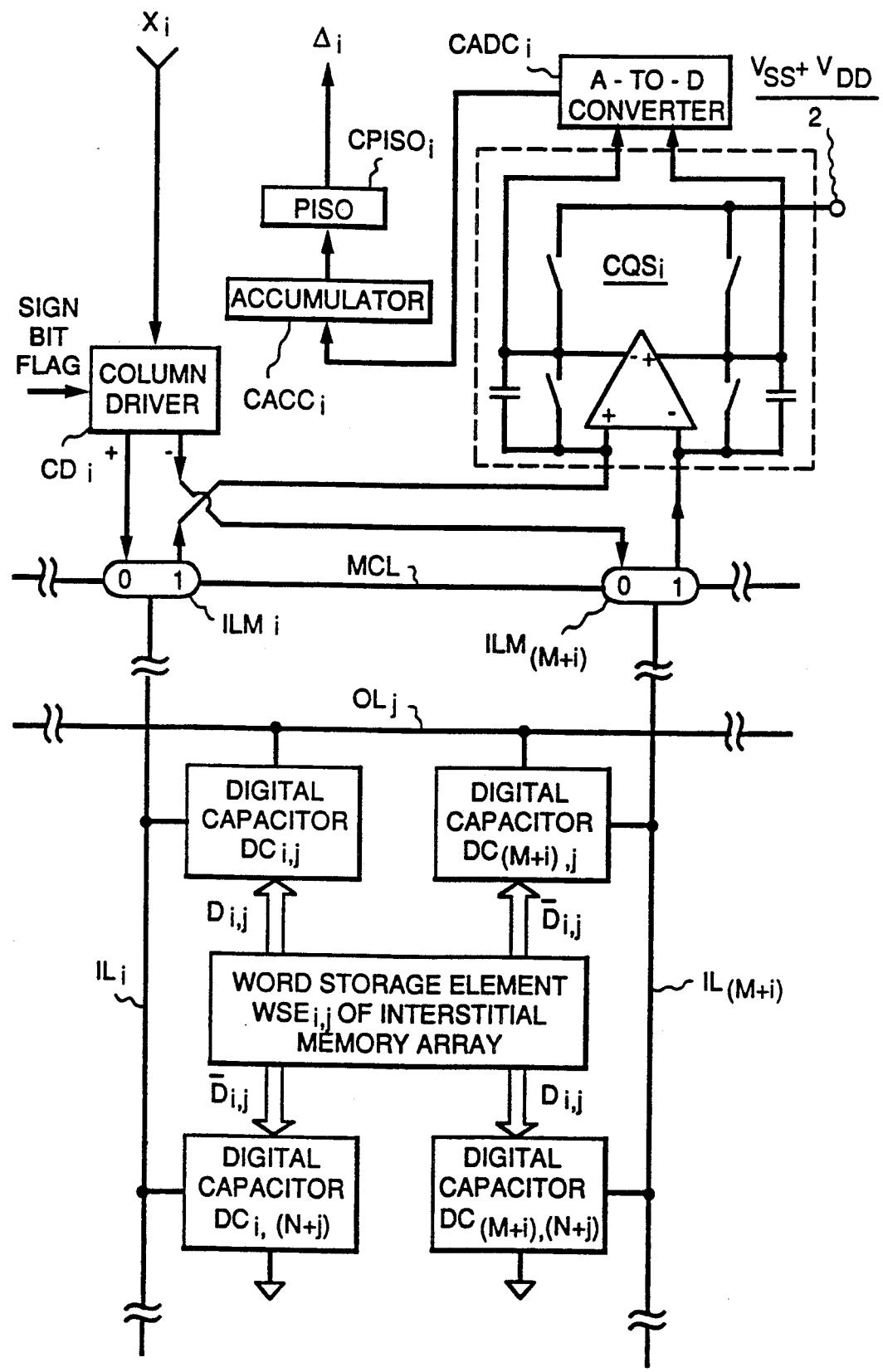
FIGS. 15A and 15B, arranged respectively on the left and on the right of the other, together form a FIG. 15 which is a schematic diagram of a modification that can be made manifold times to the neural net shown in FIGS. 9, 11 and 12 or in FIGS. 10, 11 and 12, for the programmable weighting of the capacitances used in performing weighted summations of synapse signals.
Figure 15B:
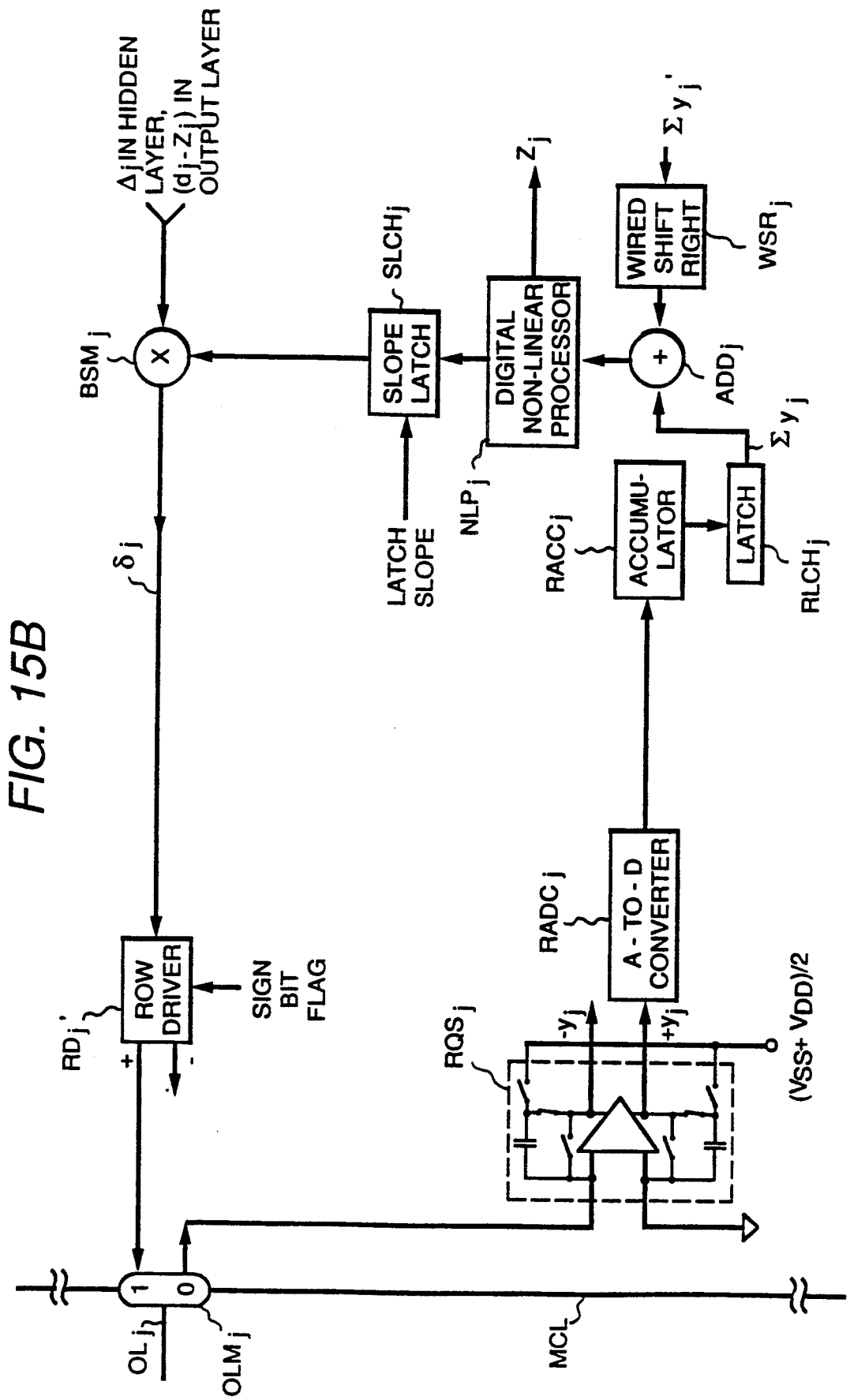

FIG. 15, comprising FIGS. 15A and 15B, shows a representative modification that can be made manifold times to the neural net shown in FIGS. 9, 11 and 12 or in FIGS. 10, 11 and 12, for the programmable weighting of the capacitances used in performing weighted summations of synapse signals. In this type of neural net the signs of the digital signals being weighted and summed are taken into account in the partial weighted summation procedure performed on an analog basis, rather than being taken into account in the final weighted summation procedure performed on an digital basis as is the case in the type of neural net shown in FIG. 13. Accordingly, respective straight-through digital bussing replaces the selective complementor $RCMP_j$ for each $j^{th}$ row and the selective complementor $CCMP_i$ for each $i^{th}$ column. Accordingly, also, each column driver $CD_i$ comprises the multiplexers $MX_i$ and $MX_{(M+i)}$ connected per FIG. 9 or per FIG. 10, rather than the multiplexers $MX_i$ and $MX_{(M+i)}$ connected per FIG. 2 or per FIG. 3.

The row driver $RD_j'$ is shown as a type having differential outputs which can be provided by a pair of multiplexers similar to input multiplexers $MX_i'$ and $MX_{(M+i)}'$ connected as in FIG. 8 or as in FIG. 9. Since output of only one sense is required to drive the single-ended output line $OL_j$, as used in the neural net layers shown in FIGS. 15 and 22, however, it is preferable from the standpoint of simplifying hardware to use row drivers $RD_j'$ that consist of but a single multiplexer. In the neural net layers shown in FIGS. 17 and 24 the row driver $RD_j'$ must be of a type having differential outputs, as can be provided by a pair of multiplexers similar to input multiplexers $MX_i'$ and $MX_{(M+i)}'$ connected as in FIG. 8 or as in FIG. 9. The row driver $RD_j'$ provides in the neural net layers shown in FIGS. 15, 17, 22 and 24 for taking care of the sign bit in the digital product $\delta_i$ in the partial weighted summation procedure, so it need not be taken care of in the final weighted summation procedure. Accordingly, the selective complementors $CCMP_i$ for each $i^{th}$ column are replaced by respective straight-through bussing.

In a variant of the FIG. 14 neural net layer not shown in the drawing, each row driver $RD_j$ is also replaced by a row driver $RD_j'$ that takes either of the forms the column driver $CD_i$ can take in FIG. 15. In this variant, too, the row driver $RD_j'$ provides for taking care of the sign bit in the digital product $\delta_i$ in the partial weighted summation procedure, so it need not be taken care of in the final weighted summation procedure. Accordingly, the selective complementors $CCMP_i$ for each $i^{th}$ column are replaced by respective straight-through bussing.

Figure 16A:
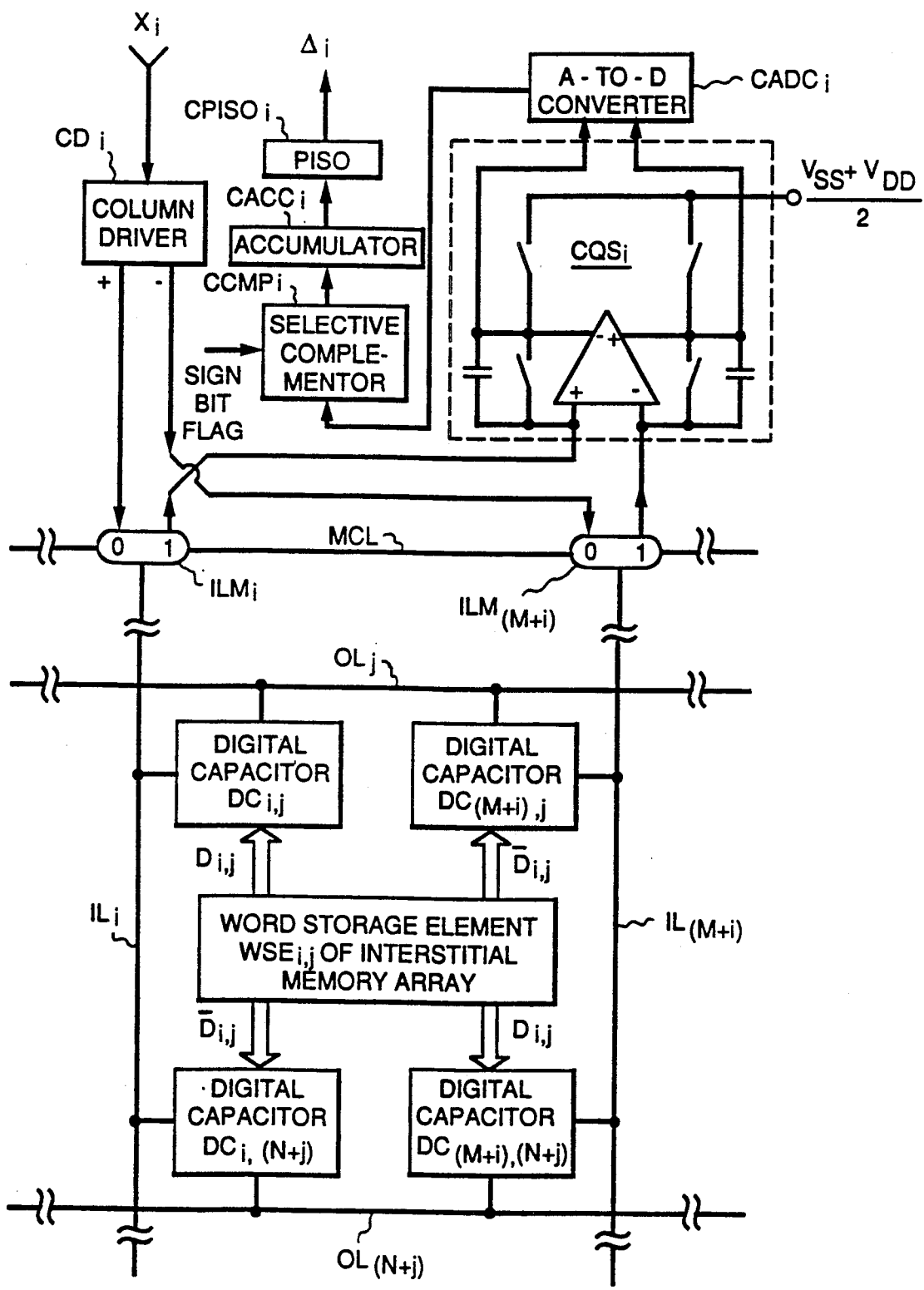
FIGS. 16A and 16B, arranged respectively on the left and on the right of the other, together form a FIG. 16 that is a schematic diagram of a neural net layer in which both forward propagation and back propagation through a capacitive network are carried out with balanced signals, in which digital capacitors have their capacitance values programmed from respective word storage locations within a digital memory, and in which the signs of the digital signals being weighted and summed are taken into account in the final weighted summation procedure performed on a digital basis.
Figure 16B:
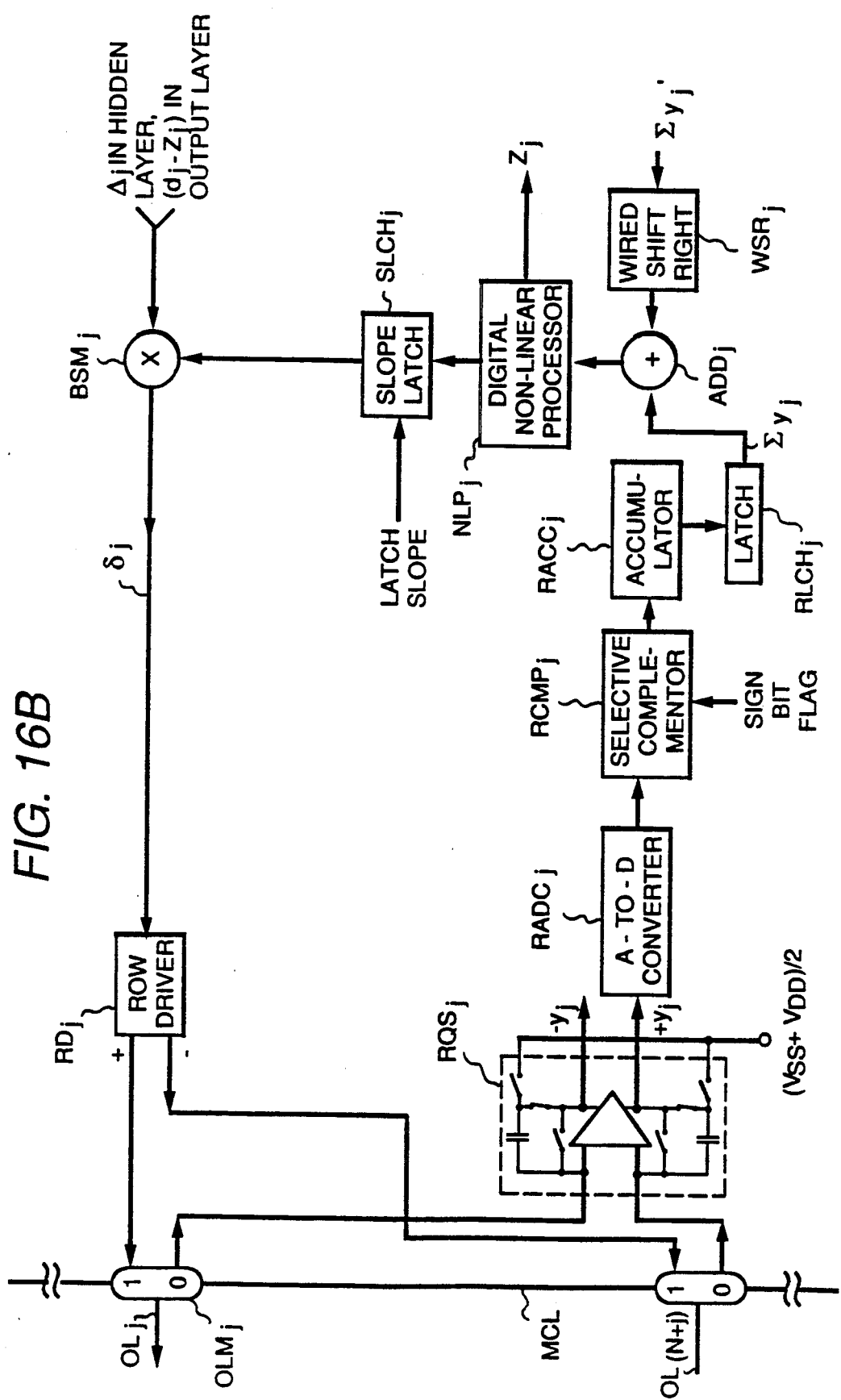

FIG. 16, comprising FIGS. 16A and 16B, shows a neural net layer in which both forward propagation and back propagation through a capacitive network are carried out with balanced signals, in which digital capacitors have their capacitance values programmed from respective word storage locations within a digital memory, and in which the signs of the digital signals being weighted and summed are taken into account in the final weighted summation procedure performed on a digital basis. The FIG. 16 neural net layer shares features with both the FIG. 13 and the FIG. 14 neural net layers. A respective set of four digital capacitors $DC_{i,j}$, $DC_{(M+i),j}$, $DC_{i,(N+j)}$ and $DC_{(M+i),(N+j)}$ is used at each intersection of an $i^{th}$ column with a $j^{th}$ row of the array of sets of digital capacitors, for weighting of forward propagated input signals during periods of normal operation, and for weighting of back propagated error signals during training periods. Each set of four digital capacitors $DC_{i,j}$, $DC_{(M+i),j}$, $DC_{i,(N+j)}$ and $DC_{(M+i),(N+j)}$ have their capacitance values programmed by a word stored in a word storage element $WSE_{i,j}$ of an interstitial memory array IMA. Each set of four digital capacitors $DC_{i,j}$, $DC_{(M+i),j}$, $DC_{i,(N+j)}$ and $DC_{(M+i),(N+j)}$ are connected in a bridge configuration having input terminals respectively connecting from paired input lines $IL_i$ and $IL_{(M+i)}$ as in FIG. 13A and having output terminals respectively connecting to output lines $OL_j$ and $OL_{(N+j)}$ as in FIG. 14A. During periods of normal operation, a respective column driver $CD_i$ that comprises the multiplexers $MX_i$ and $MX_{(M+i)}$ connected per FIG. 2 or per FIG. 3 applies complementary bit-sliced digital input signals to each pair of input lines $IL_i$ and $IL_{(M+i)}$, as in FIG. 13A; and a charge sensing amplifier $RQS_j$ for each $j^{th}$ row of the array of sets of digital capacitors, is connected to differentially sense the charges on paired output lines $OL_j$ and $OL_{(N+j)}$ as in FIG. 14B. During training periods a respective row driver $RD_j$ constructed similarly to each column driver $CD_i$ applies to each pair of output lines $OL_j$ and $OL_{(N+j)}$ complementary bit-serial responses to digital product signal from a bit-serial digital multiplier $BSM_j$, as in FIG. 14B; and a charge sensing amplifier $CQS_j$ for each $i^{th}$ column of the array of sets of digital capacitors is connected to differentially sense the charges on paired input lines $IL_i$ and $IL_{(M+i)}$, as in FIG. 13A.

Figure 17A:
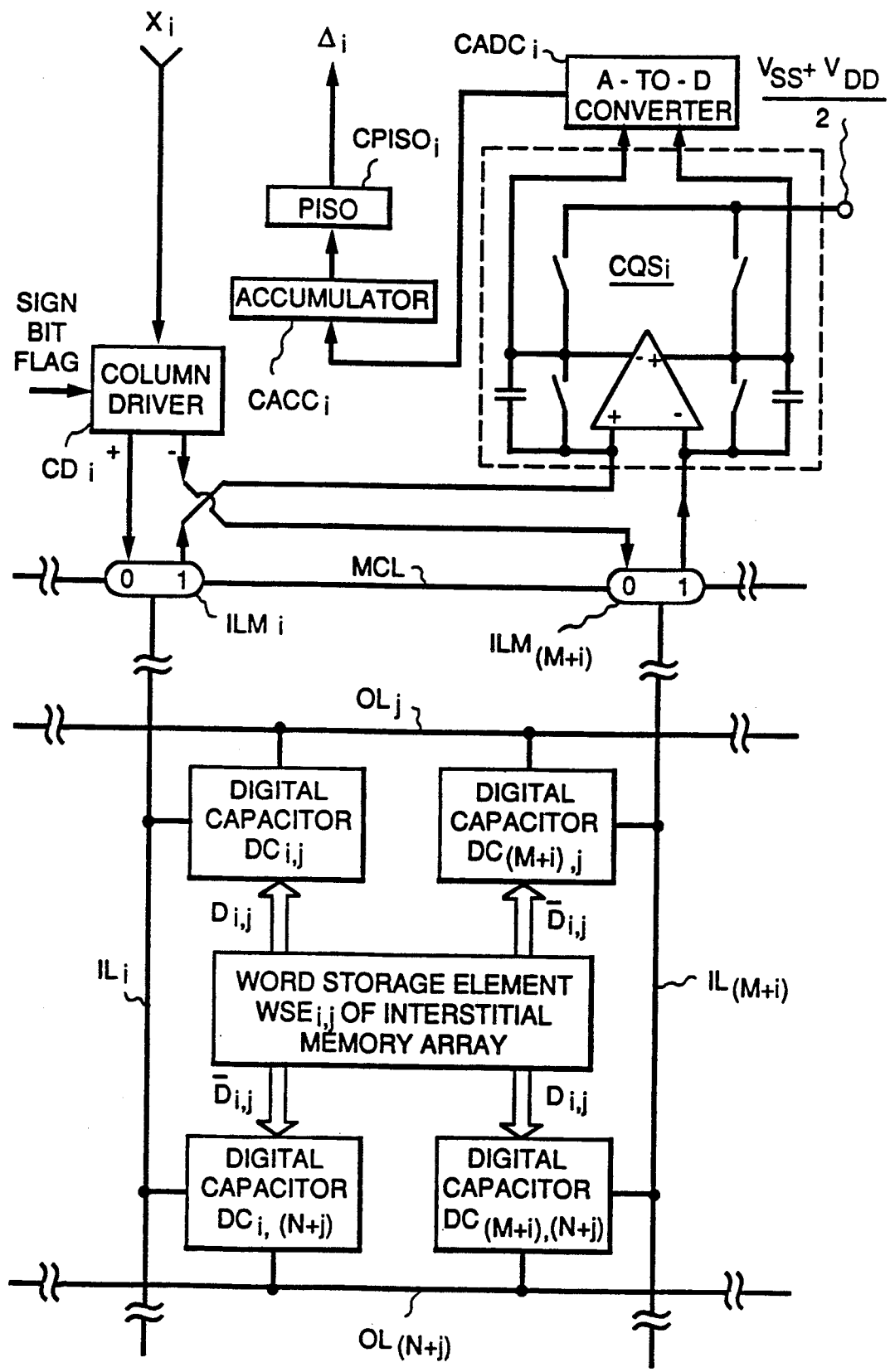
FIGS. 17A and 17B, arranged respectively on the left and on the right of the other, together form a FIG. 17 that is a schematic diagram of an alternative neural net layer in which both forward propagation and back propagation through a capacitive network are carried out with balanced signals, and in which digital capacitors have their capacitance values programmed from respective word storage locations within a digital memory. In the FIG. 17 neural net layer the signs of the digital signals being weighted and summed are taken into account in the partial weighted summation procedure performed on an analog basis.
Figure 17B:
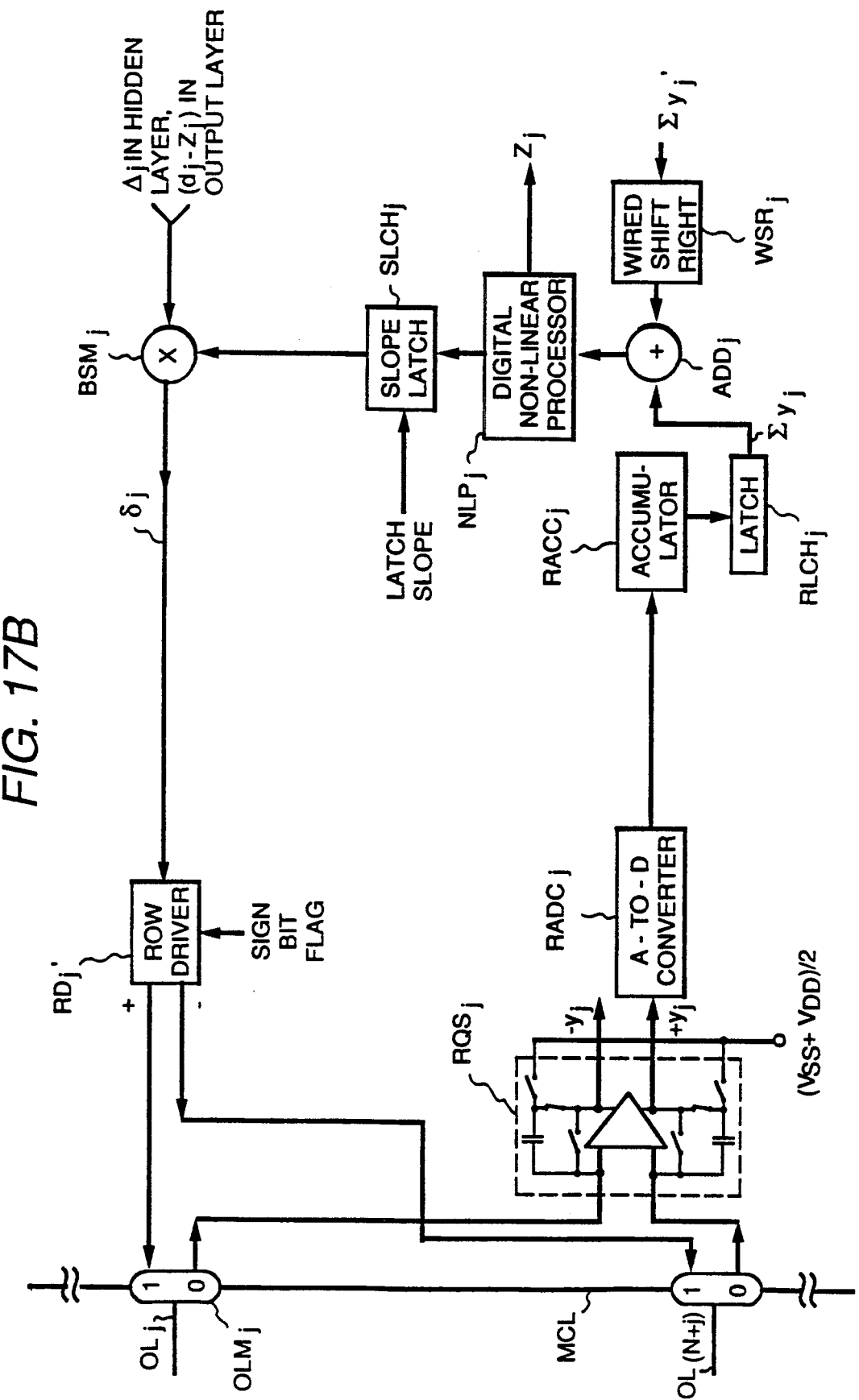

FIG. 17, comprising FIGS. 17A and 17B, shows another neural net layer in which both forward propagation and back propagation through a capacitive network are carried out with balanced signals, and in which digital capacitors have their capacitance values programmed from respective word storage locations within a digital memory. In the FIG. 17 neural net layer the signs of the digital signals being weighted and summed are taken into account in the partial weighted summation procedure performed on an analog basis, rather than being taken into account in the final weighted summation procedure performed on a digital basis. The FIG. 17 neural net layer shares features with both the FIG. 15 and the FIG. 14 neural net layers. A respective set of four digital capacitors $DC_{i,j}$, $DC_{(M+i),j}$, $DC_{i,(N+j)}$ and $DC_{(M+i),(N+j)}$ is used at each intersection of an $i^{th}$ column with a $j^{th}$ row of the array of sets of digital capacitors, for weighting of forward propagated input signals during periods of normal operation, and for weighting of back propagated error signals during training periods. Each set of four digital capacitors $DC_{i,j}$, $DC_{(M+i),j}$, $DC_{i,(N+j)}$ and $DC_{(M+i),(N+j)}$ have their capacitance values programmed by a word stored in a word storage element $WSE_{i,j}$ of an interstital memory array IMA. Each set of four digital capacitors $DC_{i,j}$, $DC_{(M+i),j}$, $DC_{i,(N+j)}$ and $DC_{(M+i),(N+j)}$ are connected in a bridge configuration having input terminals respectively connecting from paired input lines $IL_i$ and $IL_{(M+i)}$ as in FIG. 15A and having output terminals respectively connecting to output lines $OL_j$ and $OL_{(N+j)}$ as in FIG. 14A. During periods of normal operation, a respective column driver $CD_i$ that comprises the multiplexers $MX_i$ and $MX_{(M+i)}$ connected per FIG. 9 or per FIG. 10 applies complementary bit-sliced digital input signals to each pair of input lines $IL_i$ and $IL_{(M+i)}$, as in FIG. 15A; and a charge sensing amplifier $RQS_j$ for each $j^{th}$ row of the array of sets of digital capacitors, is connected to differentially sense the charges on paired output lines $OL_j$ and $OL_{(N+j)}$ as in FIG. 14B. During training periods a respective row driver $RD_j$ constructed similarly to each column driver $CD_i$ applies to each pair of output lines $OL_j$ and $OL_{(N+j)}$ complementary bit-serial responses to digital product signal from a bit-serial digital multiplier $BSM_j$, as in FIG. 14B; and a charge sensing simplifier $CQS_j$ for each $i^{th}$ column of the array of sets of digital capacitors is connected to differentially sense the charges on paired input lines $IL_i$ and $IL_{(M+i)}$, as in FIG. 15A.

Figure 18:
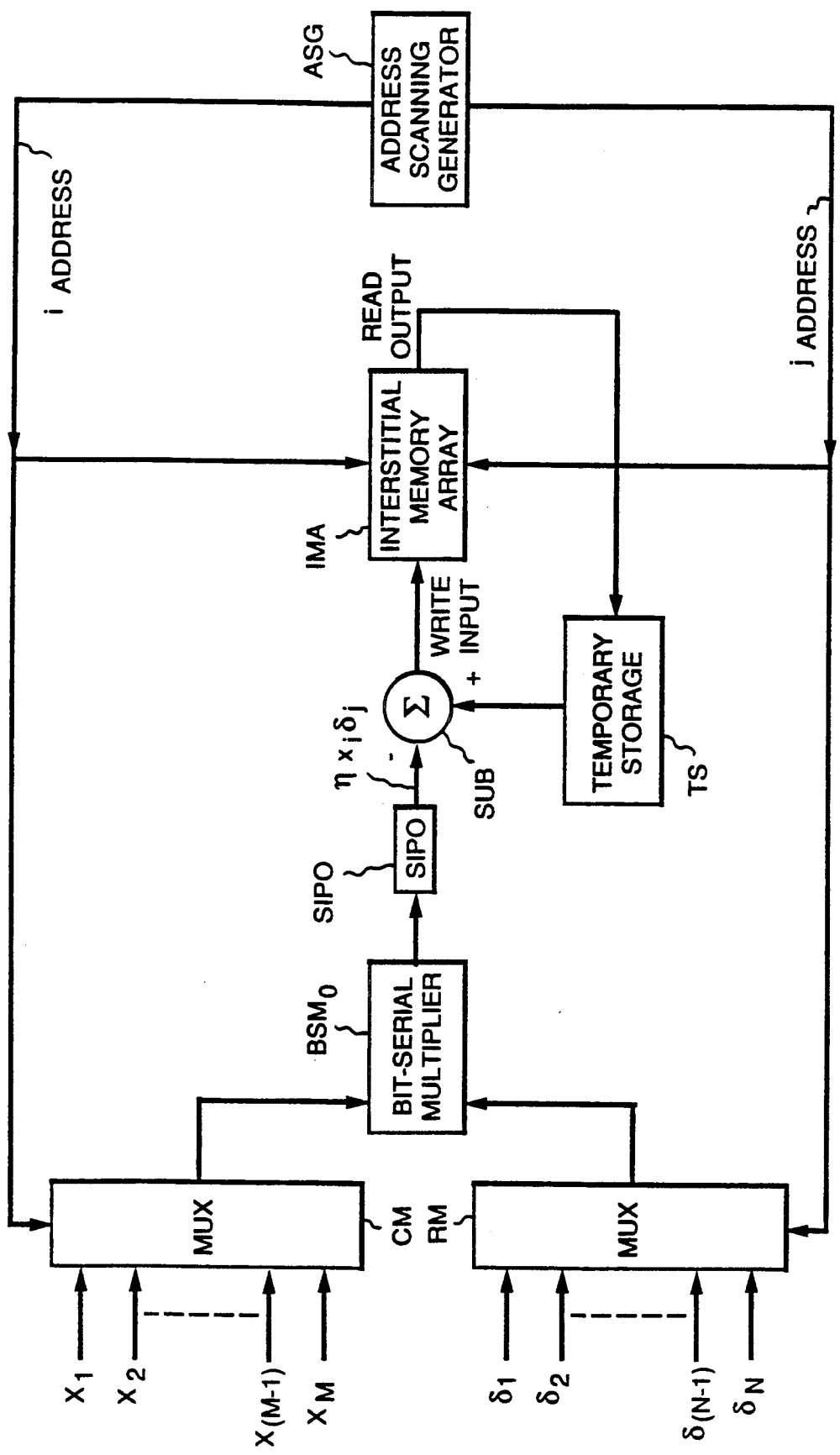
FIG. 18 is a schematic diagram of a back-propagation processor used for training a neural net having layers as shown in FIGS. 2, 5 and 6 or in FIGS. 3, 5 and 6 modified manifoldly per FIG. 13; or a neural net having layers as shown in FIGS. 4, 5 and 6 modified manifoldly per FIG. 14; or a neural net having layers as shown in FIGS. 9, 11 and 12 or in FIGS. 10, 11 and 12 modified manifoldly per FIG. 15; or a neural net having layers as shown in FIG. 16; or or a neural net having layers as shown in FIG. 17.

FIG. 18 shows apparatuses for completing the back-propagation computations, as may be used with a neural net having layers as shown in FIGS. 2, 5 and 6 or in FIGS. 3, 5 and 6 modified manifoldly per FIG. 13; or having layers as shown in FIGS. 4, 5 and 6 modified manifoldly per FIG. 14; or having layers as shown in FIGS. 9, 11 and 12 or in FIGS. 10, 11 and 12 modified manifoldly per FIG. 15; or having layers as shown in FIG. 16; or having layers as shown in FIG. 17. The weights at each word storage element $WSE_{i,j}$ in the interstitial memory array IMA are to be adjusted as the i column addresses and j row addresses are scanned row by row, one column at a time. An address scanning generator ASG generates this scan of i and j addresses shown applied to interstitial memory array IMA, assuming it to be a random access memory. The row address j is applied to a row multiplexer RM that selects bit-serial $\delta_j$ to one input of a bit-serial multiplier $BSM_0$, and the column address i is applied to a column multiplexer CM that selects bit-serial $x_i$ to another input of the multiplier $BSM_0$.

Multiplier $BSM_0$ generates in bit-serial form the product $x_i \delta_j$ as reduced by a scaling factor $\eta$, which is the increment or decrement to the weight stored in the currently addressed word storage element $WSE_{ij}$ in the memory array IMA. A serial-in/parallel-out register SIPO is used to convert the $\eta x_i \delta_j$ signal from bit-serial to the parallel-bit form of the signals stored in the memory array IMA. The former value of weight stored in word storage element $WSE_{ij}$ is read from memory array IMA to a temporary storage element, or latch, TS. This former weight value is supplied as minuend to a digital subtractor SUB, which receives as subtrahend $\eta x_i \delta_j$ from the serial-in/parallel-out register SIPO. The resulting difference is the updated weight value which is written into word storage element $WSE_{i,j}$ in memory array IMA to replace the former weight value.

Figure 19:
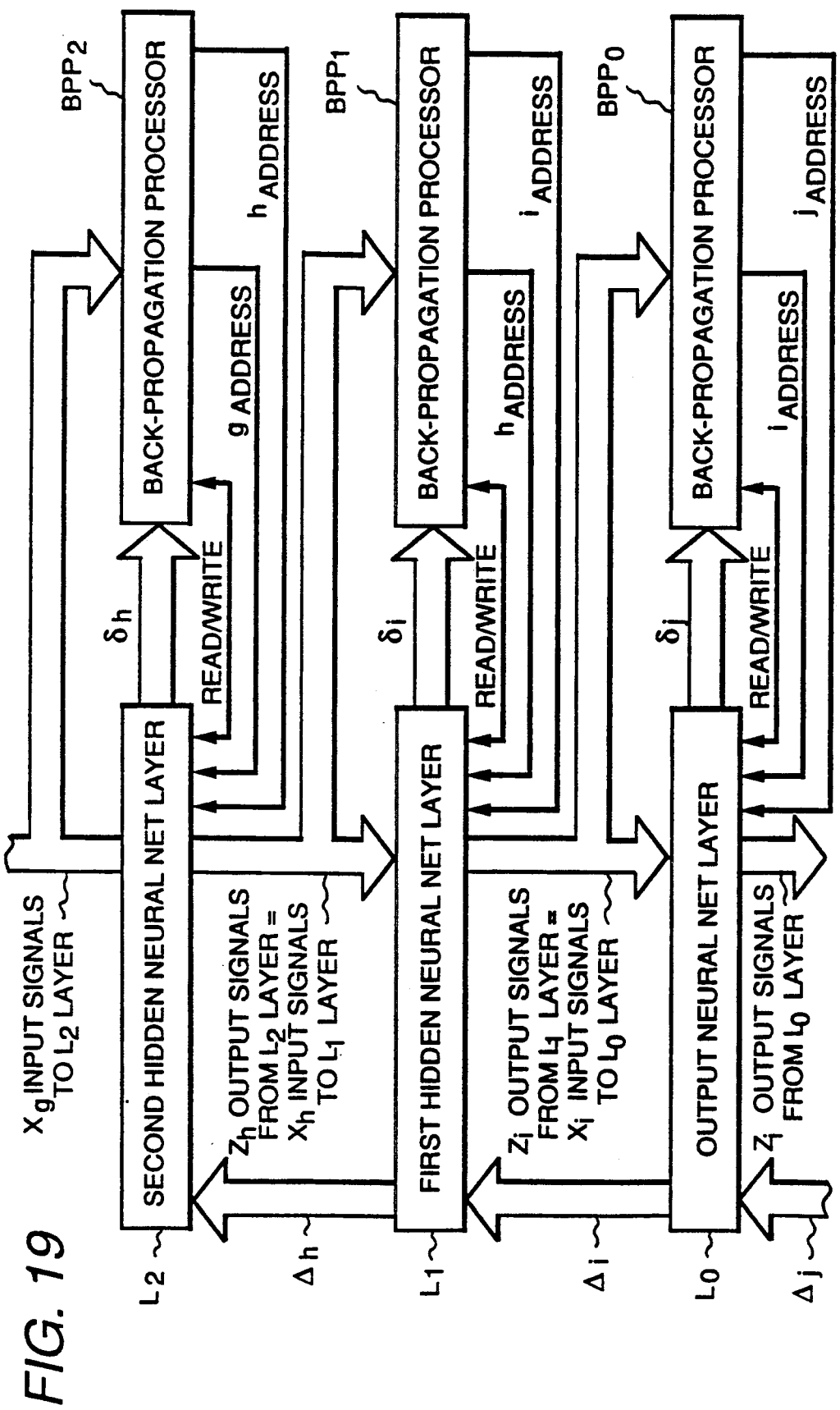
FIG. 19 is a schematic diagram of a system having a plurality of neural net layers as shown in FIGS. 2, 5 and 6 or in FIGS. 3, 5 and 6 modified manifoldly per FIG. 13; or in FIGS. 4, 5 and 6 modified manifoldly per FIG. 14; or in FIGS. 9, 11 and 12 or in FIGS. 10, 11 and 12 modified manifoldly per FIG. 15; or in FIG. 16; or in FIG. 17 each of which neural net layers has a respective back-propagation processor per FIG. 16 associated therewith.

FIG. 19 shows how trained neural net layers $L_0$, $L_1$ and $L_2$ are connected together in a system that can be trained. Each of the neural net layers is similar to neural net layers as shown in FIGS. 2, 5 and 6 or in FIGS. 3, 5 and 6 modified manifoldly per FIG. 13; or in FIGS. 4, 5 and 6 modified manifoldly per FIG. 14; or in FIGS. 9, 11 and 12 or in FIGS. 10, 11 and 12 modified manifoldly per FIG. 15; or in FIG. 16; or in FIG. 17. Each of the neural net layers has a respective back-propagation processor per FIG. 18 associated therewith.

$L_0$ is the output neural net layer that generates $z_j$ output signals and is provided with a back-propagation processor $BPP_0$ with elements similar to those shown in FIG. 18 for updating the weights stored in the interstitial memory array of $L_0$. $L_1$ is the first hidden neural net layer which generates $z_h$ output signals supplied to the output neural net layer as its $x_i$ input signals. These $z_i$ output signals are generated by layer $L_1$ as its non-linear response to the weighted sum of its $x_h$ input signals. This first hidden neural net layer $L_1$ is provided with a back-propagation processor $BPP_1$ similar to $BPP_0$. $L_2$ is the second hidden neural net layer, which generates $z_h$ output signals supplied to the first hidden neural net layer as its $x_h$ input signals. These $z_h$ output signals are generated by layer $L_2$ as its non-linear response to a weighted summation of its $x_g$ input signals. This second hidden layer is provided with a back-propagation processor similar to $BPP_0$ and to $BPP_1$.

FIG. 19 presumes that the respective interstitial memory array IMA of each neural net layer $L_0$, $L_1$, $L_2$ has a combined read/write bus instead of separate read input and write output busses as shown in FIG. 18. FIG. 19 shows the $\Delta_j$, $\Delta_i$ and $\Delta_h$ signals being fed back over paths separate from the feed forward paths for $z_j$, $z_i$ and $z_h$ signals, which separate paths are shown to simplify conceptualization of the neural net by the reader. In actuality, as previously described, a single path is preferably used to transmit $z_j$ in the forward direction and $\Delta_j$ in the reverse direction, etc. Back-propagation processor $BPP_0$ modifies the weights read from word storage elements in neural net layer $L_0$ interstitial memory array by $\eta x_i \delta_j$ amounts and writes them back to the word storage elements in a sequence of read-modify-write cycles during the training procedure. Back-propagation processor $BPP_1$ modifies the weights read from word storage elements in neural net layer $L_1$ interstitial memory array by $\eta x_h \delta_i$ amounts and writes them back to the word storage elements in a sequence of read-modify-write cycles, during the training procedure. Back-propagation processor $BPP_2$ modifies the weights read and storage elements in neural net layer $L_2$ interstitial memory array by $\eta x_g \delta_h$ amounts and writes them back to the word storage element in a sequence of read-modify-write cycles during the training procedure.

Figure 20A:
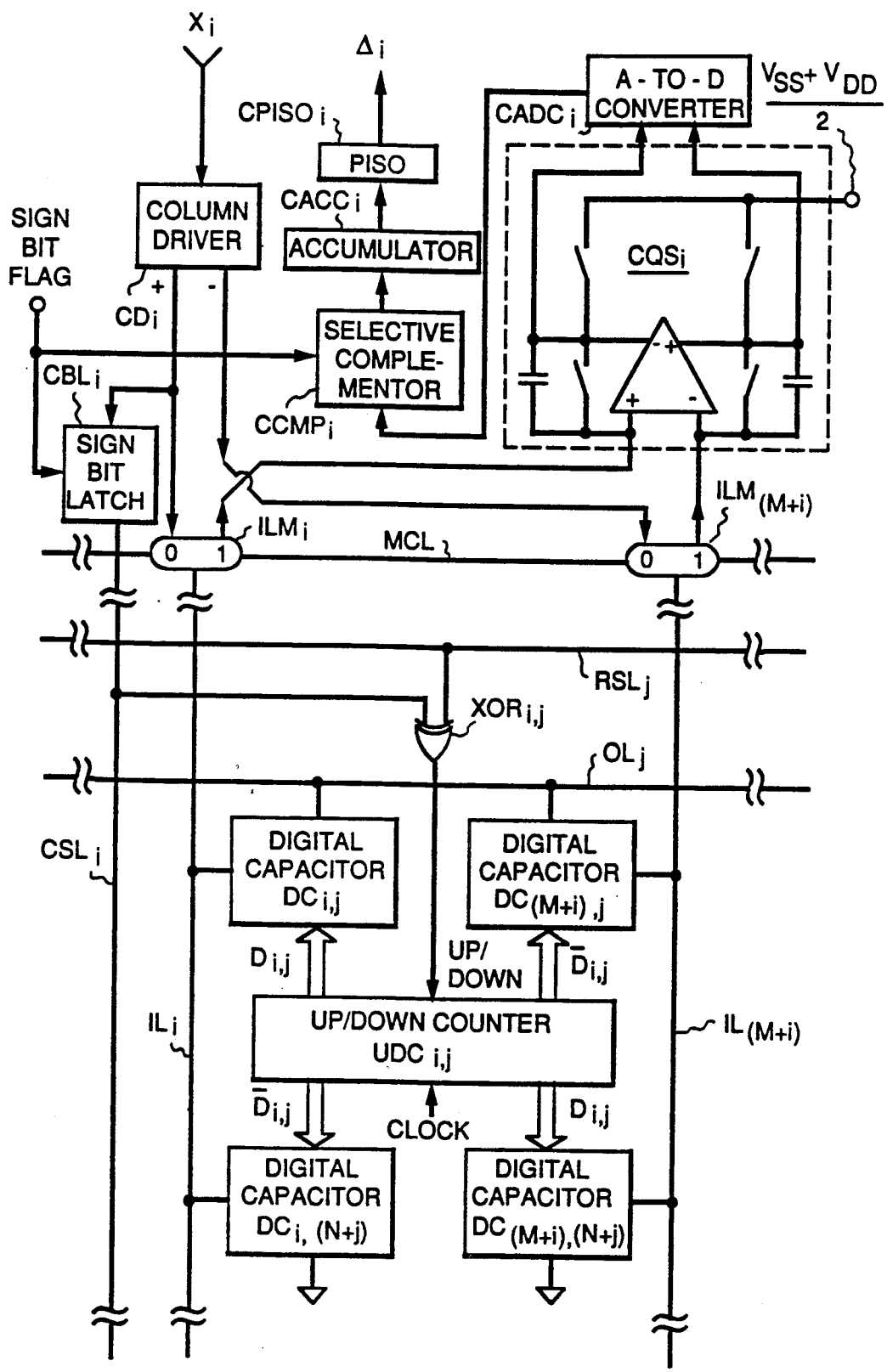
FIGS. 20A and 20B, arranged respectively on the left and on the right of the other, together form a FIG. 20 that is a schematic diagram of an alternative modification of that can be made manifold times to the neural net shown in FIGS. 2, 5 and 6 or in FIGS. 3, 5 and 6, for the programmable weighting of the capacitances used in performing weighted summations of synapse signals.
Figure 20B:
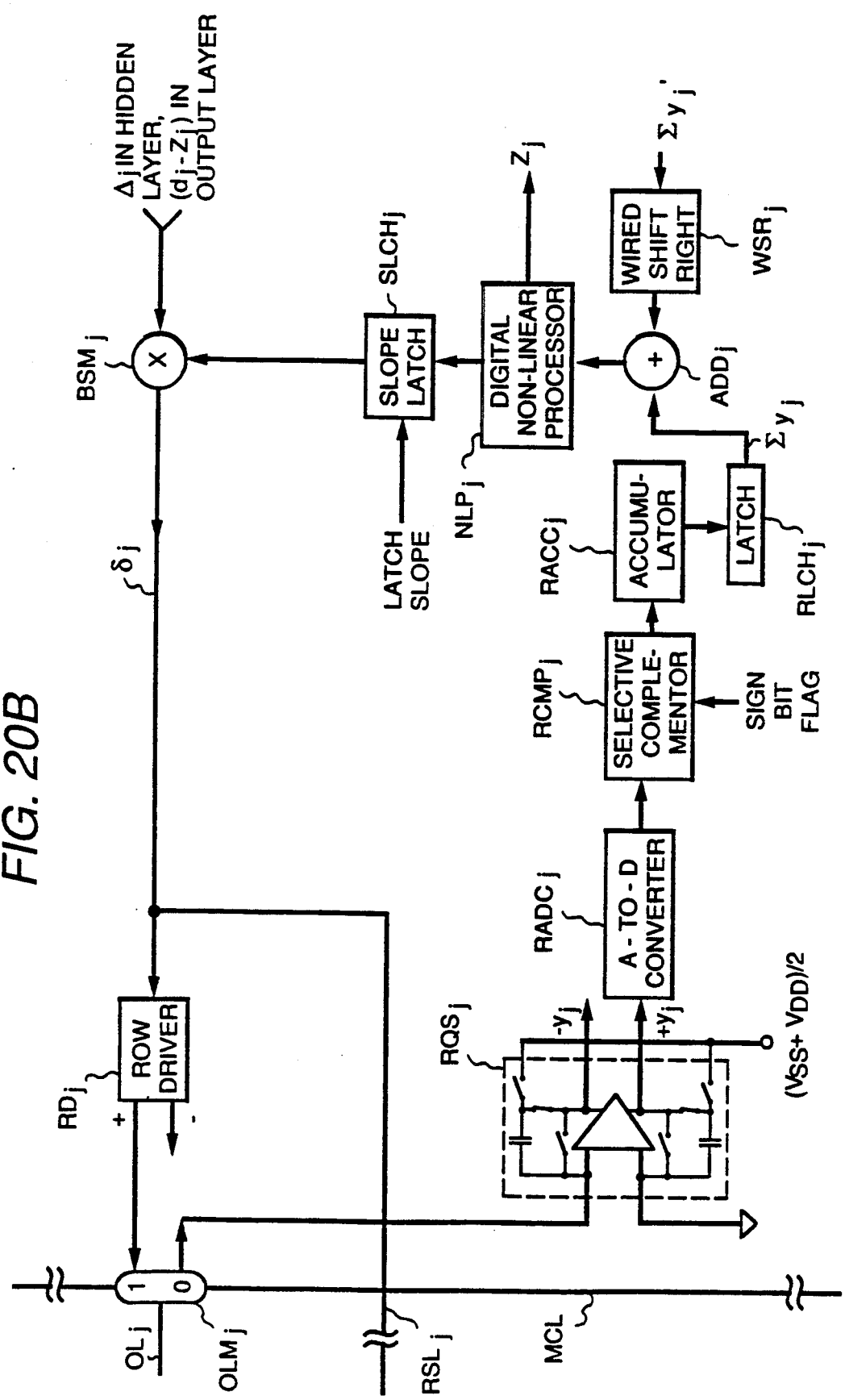

FIG. 20, comprising component FIGS. 20A and 20B shows an alternative modification that can be manifoldly made to a neural net as shown in FIGS. 2, 5 and 6 or in FIGS. 3, 5 and 6 to give it training capability. This alternative modification seeks to avoid the need for a high-resolution bit-serial multiplier $BSM_0$ and complex addressing during back-propagation calculations in order that training can be implemented. A respective up/down counter $UDC_{i,j}$ is used instead of each word storage element $WSE_{i,j}$. Correction of the word stored in counter $UDC_{i,j}$ is done a count at a time; and the counter preferably has at least one higher resolution stage in addition to those used to control the capacitances of digital capacitors $DC_{i,j}$, $DC_{(M+i),j}$, $DC_{i,(N+j)}$ and $DC_{(M+i),(N+j)}$. Each up/down counter $UDC_{i,j}$ has a respective counter control circuit $CON_{i,j}$ associated therewith. Each counter control circuit $CON_{i,j}$ may, as shown in FIG. 20A and described in detail further on in this specification, simply consist of an exclusive-OR gate $XOR_{i,j}$.

Responsive to a SIGN BIT FLAG, a row sign bit latch $RBL_j$ latches the sign bit of $\delta_j$, indicative of whether a row of weights should in general be decremented or incremented, to be applied via a respective row sign line $RSL_j$ to all counter control circuits ($CON_{i,j}$ for $i=1, \ldots, M$) in the $j^{th}$ row associated with that row sign bit latch $RBL_j$. Before making a back-propagation calculation, a respective column sign bit latch $CBL_i$ latches the sign bit of $x_i$ for each $i^{th}$ columnar position along the row which is to be updated, to provide an indication of whether it is likely the associated weight should be decremented or incremented. Each column sign bit latch $CBL_i$ is connected to broadcast its estimate via a respective column sign line $CSL_i$ to all counter control circuits ($CON_{i,j}$ for $j=1, \ldots N$) in the $i^{th}$ column associated with that column sign bit latch $CBL_i$. Responsive to these indications from sign bit latches $CBL_i$ and $RBL_j$, each respective counter control circuit $CON_{i,j}$ decides in which direction up/down counter $UDC_{i,j}$ will count to adjust the weight control signals $D_{i,j}$ and $\overline{D}_{i,j}$ stored therein The counter control circuitry $CON_{i,j}$ should respond to the sign of $+\delta_j$ being positive, indicating the response $v_j$ to be too positive, to decrease the capacitance to output line $OL_j$ that is associated with the signal $x_i$ or $-x_i$ that is positive and to increase the capacitance to output line $OL_j$ that is associated with the signal $-x_i$ or $x_i$ that is negative, for each value of i. The counter control circuitry $CON_{i,j}$ should respond to the sign of $+\delta_j$ being negative, indicating the response v to be too negative, to increase the capacitance to output line $OL_j$ that is associated with the signal $-x_i$ or $x_i$ that is negative and to decrease the capacitance to output line $OL_j$ that is associated with the signal $x_i$ or $-x_i$ that is positive. Accordingly, counter control circuitry $CON_{i,j}$ may simply consist of a respective exclusive-OR gate $XOR_{i,j}$ as shown in FIG. 20A, if the following presumptions are valid.

Each of the digital capacitors $DC_{i,j}$ and $DC_{(M+i),(N+j)}$ is presumed to increase or decrease its capacitance as $D_{i,j}$ is increased or decreased respectively. Each of the digital capacitors $DC_{(M+i),j}$ and $DC_{i,(N+j)}$ is presumed to increase or decrease its capacitance as $\overline{D}_{i,j}$ is increased or decreased respectively. A ZERO applied as up/down signal to up/down counter $UDC_{i,j}$ is presumed to cause counting down for $D_{i,j}$ and counting up for $\overline{D}_{i,j}$. A ONE applied as up/down signal to up/down counter $UDC_{i,j}$ is presumed to cause counting up for $D_{i,j}$ and counting down for $\overline{D}_{i,j}$. Column sign detector $CSD_i$ output indication is presumed to be a ZERO when $x_i$ is not negative and to be a ONE when $x_i$ is negative. Row sign detector $RSD_j$ output indication is presumed to be a ZERO when $\delta_j$ is not negative and to be a ONE when $\delta_j$ is negative. Since the condition where $x_i$ or $\delta_j$ is zero-valued is treated as if the zero-valued number were positive, forcing a false correction which is in fact not necessary, and thus usually creating the need for a counter correction in the next cycle of back-propagation training, there is dither in the correction loops. However, the extra stage or stages of resolution in each up/down counter $UDC_{i,j}$ prevent high-resolution dither in the feedback correction loop affecting the capacitances of $DC_{i,j}$, $DC_{(M+i),j}$, $DC_{i,(N+j)}$ and $DC_{(M+i),(N+j)}$.

Figure 21A:
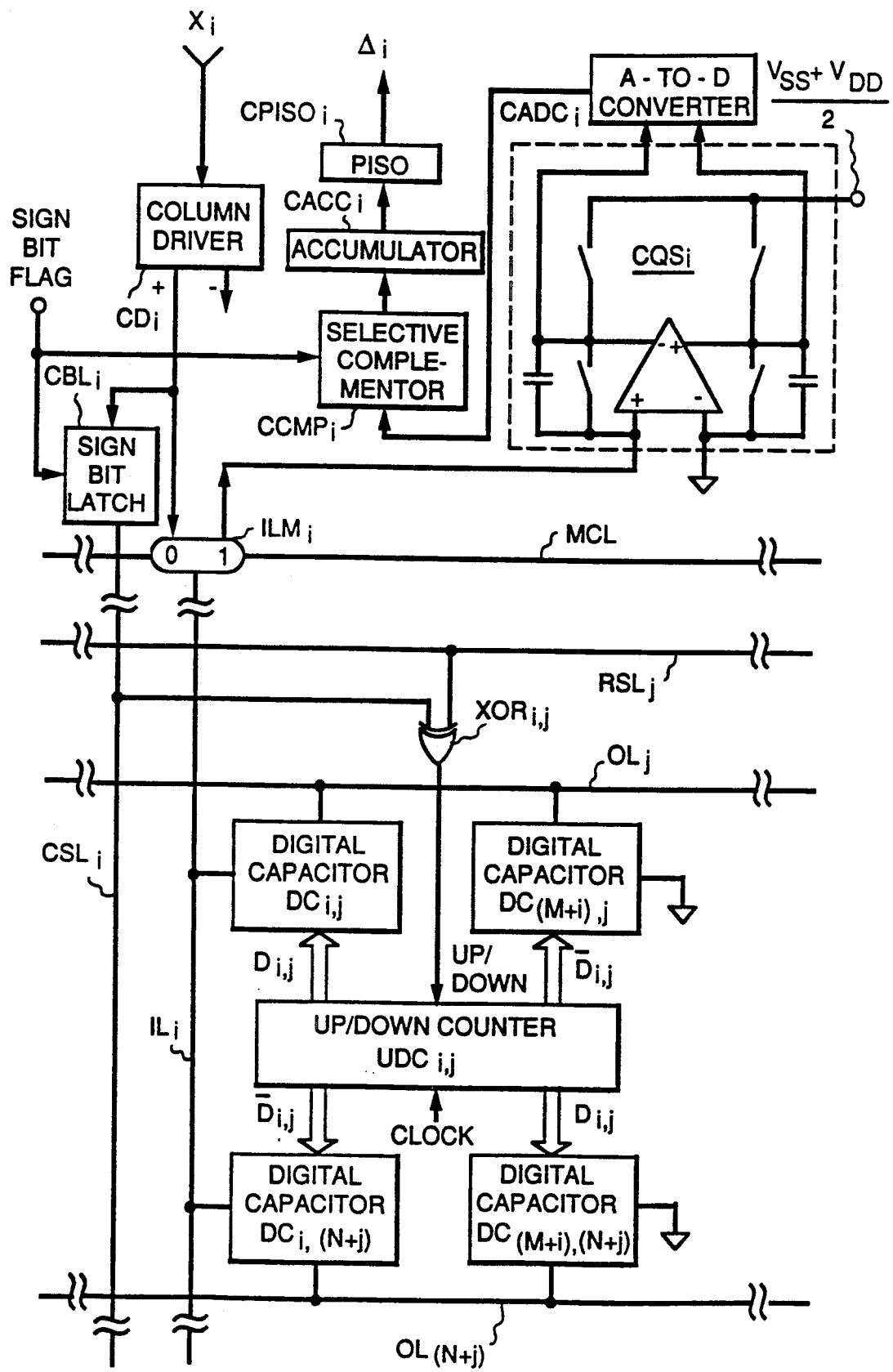
FIGS. 21A and 21B, arranged respectively on the left and on the right of the other, together form a FIG. 21 that is a schematic diagram of an alternative modification of that can be made manifold times to the neural net shown in FIGS. 4, 5 and 6, for the programmable weighting of the capacitances used in performing weighted summations of synapse signals.
Figure 21B:
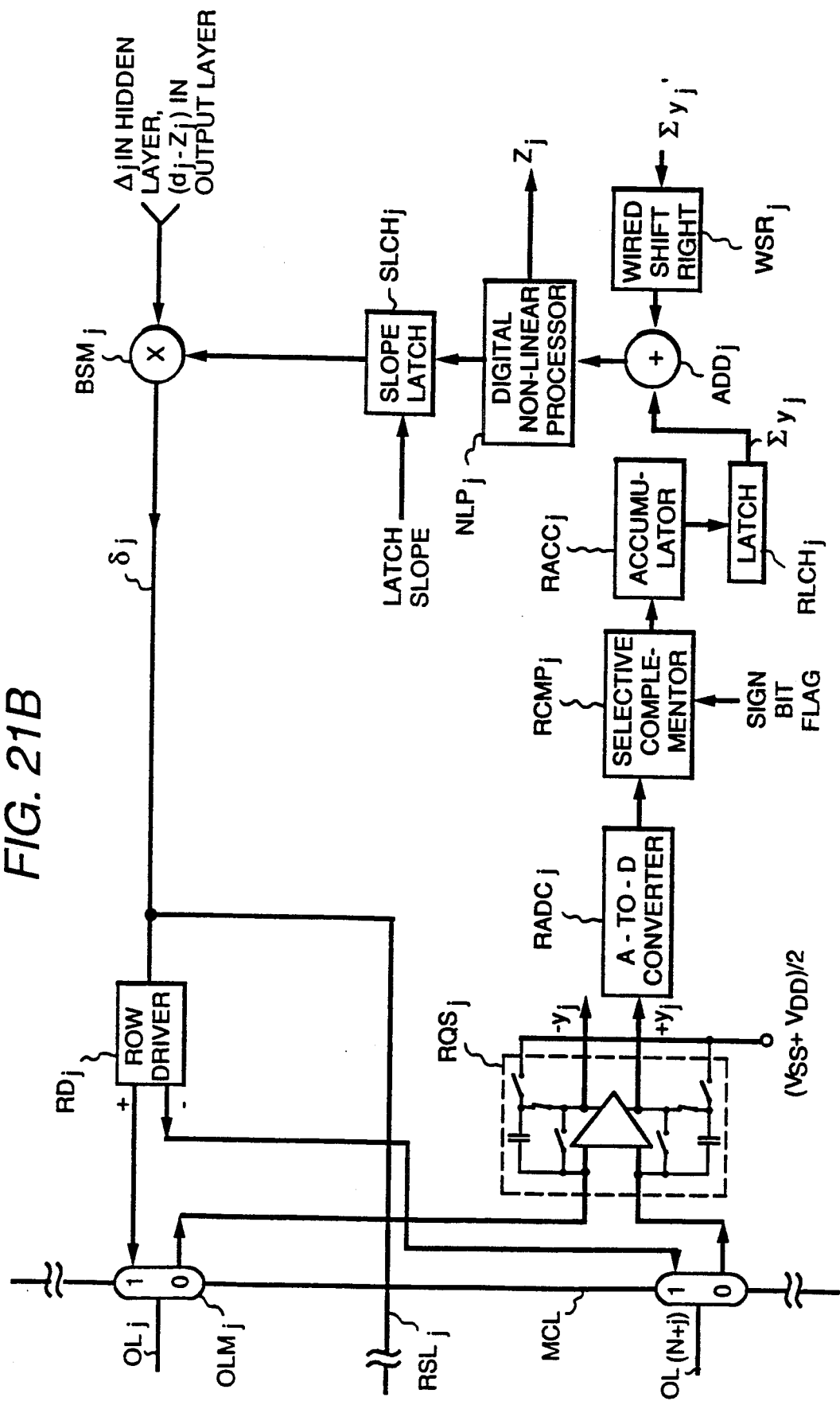

FIG. 21, comprising component FIGS. 21A and 21B shows an alternative modification that can be manifoldly made to a neural net as shown in FIGS. 4, 5 and 6 to give it training capability. A respective up/down counter $UDC_{i,j}$ is used instead of each word storage element $WSE_{i,j}$ in this FIG. 21 alternative modification; and FIG. 21 differs from FIG. 14 in substantially the same respects that FIG. 20 differs from FIG. 13.

Figure 22A:
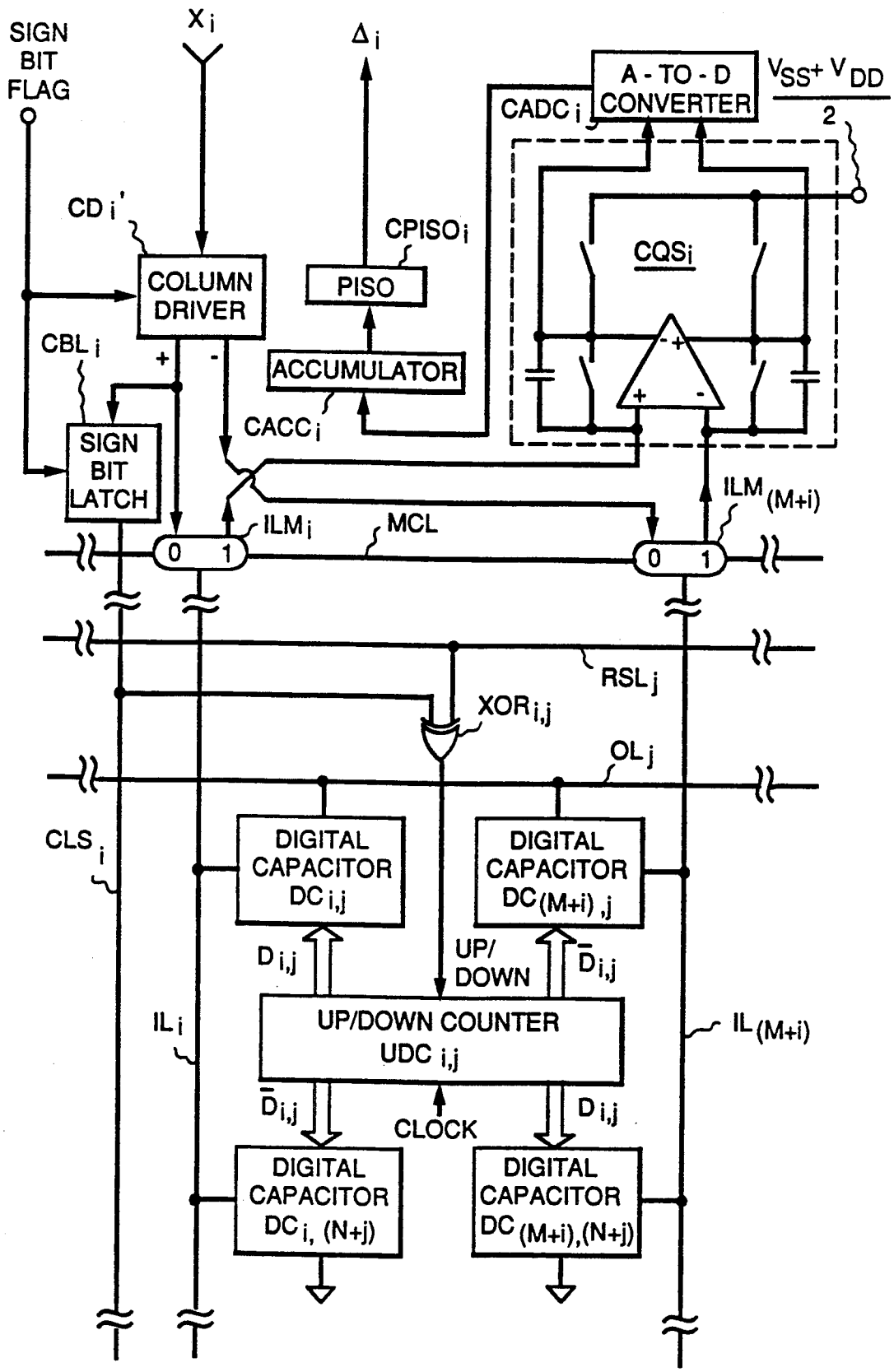
FIGS. 22A and 22B, arranged respectively on the left and on the right of the other, together form a FIG. 22 that is a schematic diagram of an alternative modification of that can be made manifold times to the neural net shown in FIGS. 9, 11 and 12 or in FIGS. 10, 11 and 12, for the programmable weighting of the capacitances used in performing weighted summations of synapse signals.
Figure 22B:
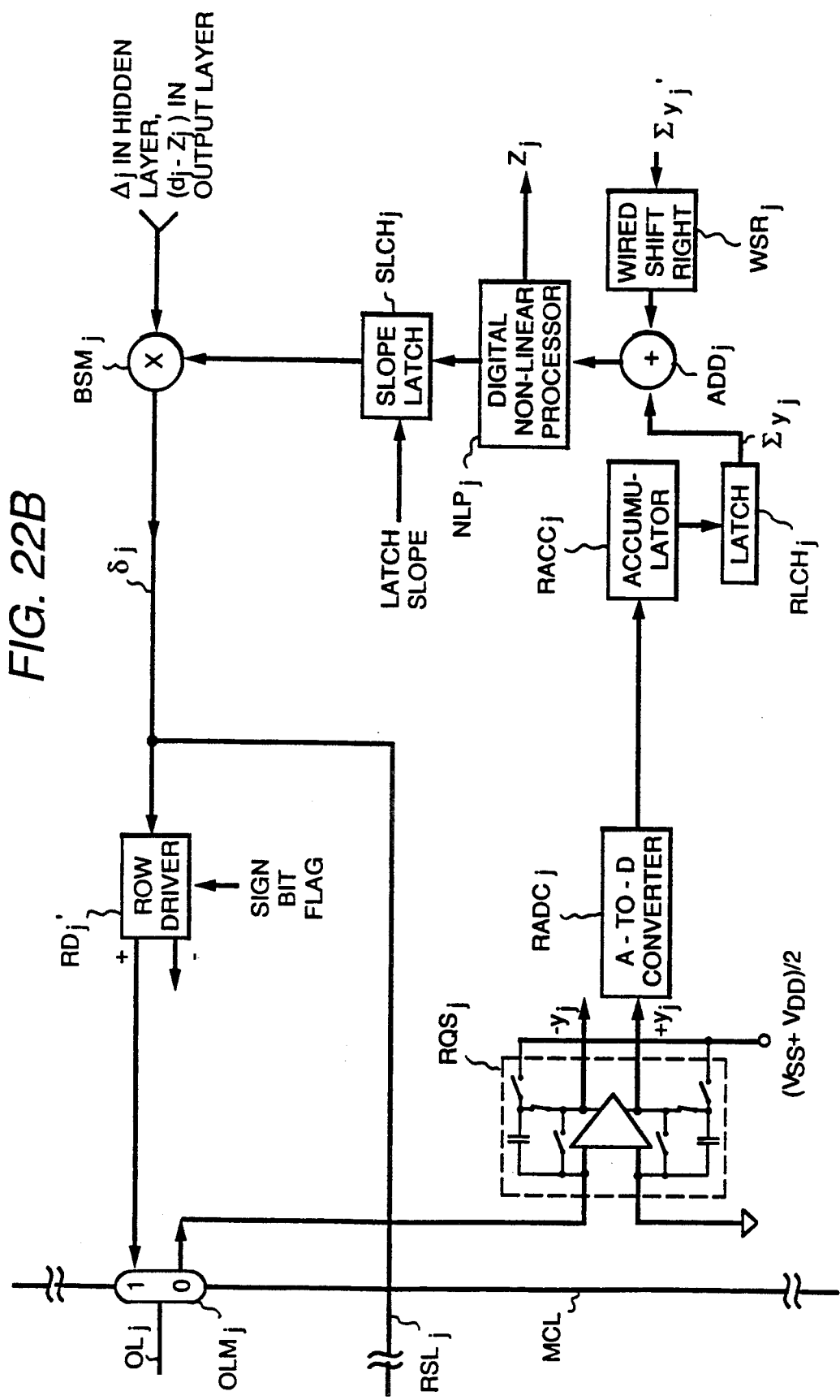

FIG. 22, comprising component FIGS. 22A and 22B shows an alternative modification that can be manifoldly made to a neural net as shown in FIGS. 9, 11 and 12 or in FIGS. 10, 11 and 12 to give it training capability. A respective up/down counter $UDC_{i,j}$ is used instead of each word storage element $WSE_{i,j}$ in this FIG. 22 alternative modification; and FIG. 22 differs from FIG. 15 in substantially the same respects that FIG. 20 differs from FIG. 13. In FIG. 22 as in FIG. 15 the signs of the digital signals being weighted and summed are taken into account in the partial weighted summation procedure performed on an analog basis, rather than being taken into account in the final weighted summation procedure performed on an digital basis as is the case in the types of neural nets shown in FIGS. 13 and 20. Accordingly, a neural net manifoldly using the FIG. 22 modification differs from a neural net manifoldly using the FIG. 20 modification in that respective straight-through digital bussing replaces the selective complementor $RCMP_j$ for each $j^{th}$ row and the selective complementor $CCMP_i$ for each $i^{th}$ column. Accordingly, also, in a neural net manifoldly using the FIG. 22 modification differs from a neural net manifoldly using the FIG. 20 modification in that each column driver $CD_i$ comprises the multiplexers $MX_i$ and $MX_{(M+i)}$ connected per FIG. 9 or per FIG. 10, rather than the multiplexers $MX_i$ and $MX_{(M+i)}$ connected per FIG. 2 or per FIG. 3. Except for these differences, a neural net manifoldly using the FIG. 22 modification resembles, in both structure and operation, a neural net manifoldly using the FIG. 20 modification.

In a variant of the FIG. 21 neural net layer not shown in the drawing, the row driver $RD_j$ takes either of the forms the column driver $CD_i$ can take in FIG. 22. This provides for taking care of the sign bit in the digital product $\delta_j$ in the partial weighted summation procedure, so it need not be taken care of in the final weighted summation procedure. Accordingly, the selective complementors $CCMP_i$ for each $i^{th}$ column are replaced by respective straight-through bussing. The extraction of the sign bit of the digital product $\delta_j$ for application to the row sign line $RSL_j$ is done before the row driver $RD_j$, of course.

Figure 23A:
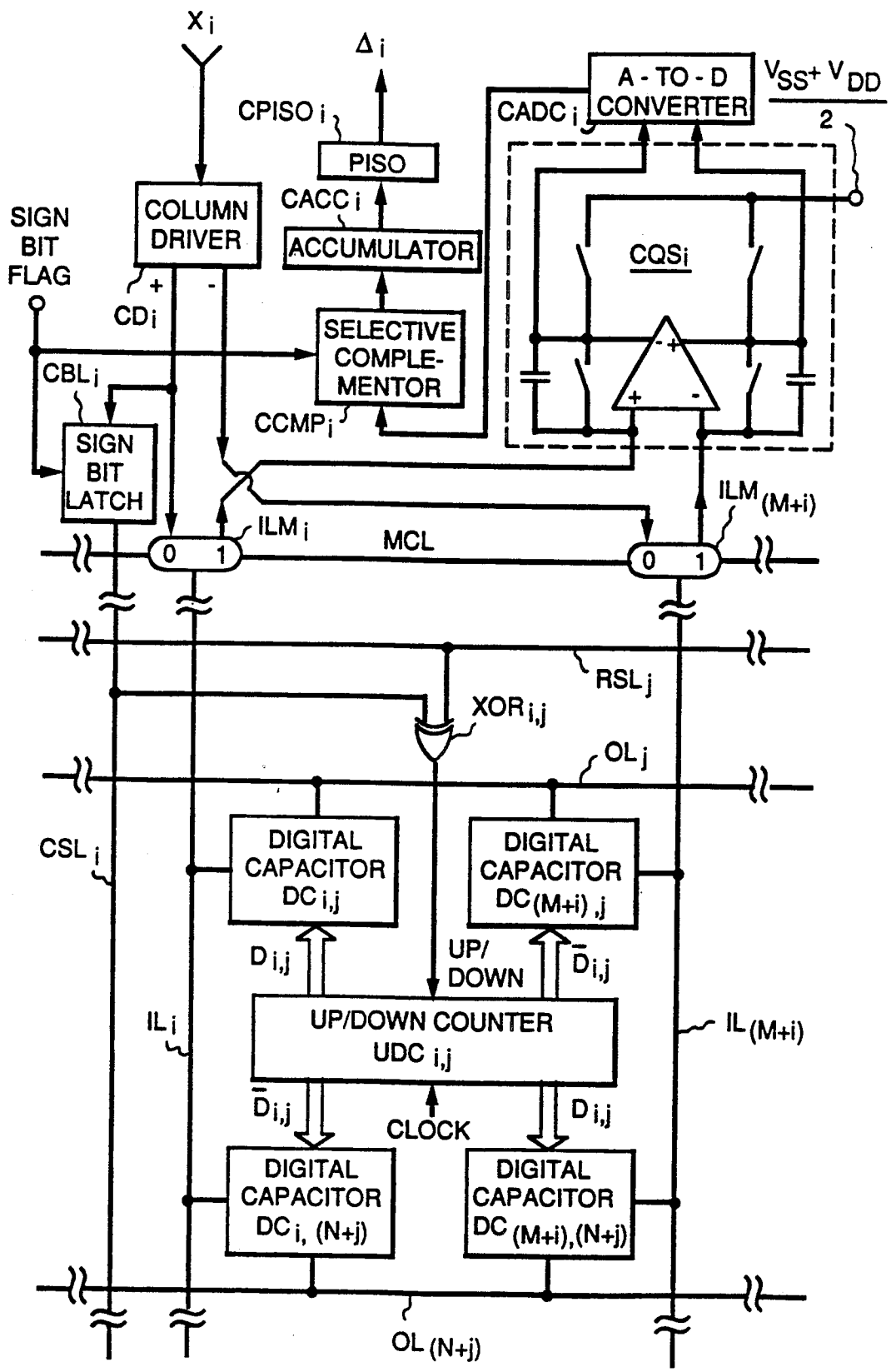
FIGS. 23A and 23B, arranged respectively on the left and on the right of the other, together form a FIG. 23 that is a schematic diagram of a neural net layer in which both forward propagation and back propagation through a capacitive network are carried out with balanced signals, in which digital capacitors have their capacitance values programmed from counters, and in which the signs of the digital signals being weighted and summed are taken into account in the final weighted summation procedure performed on a digital basis.
Figure 23B:
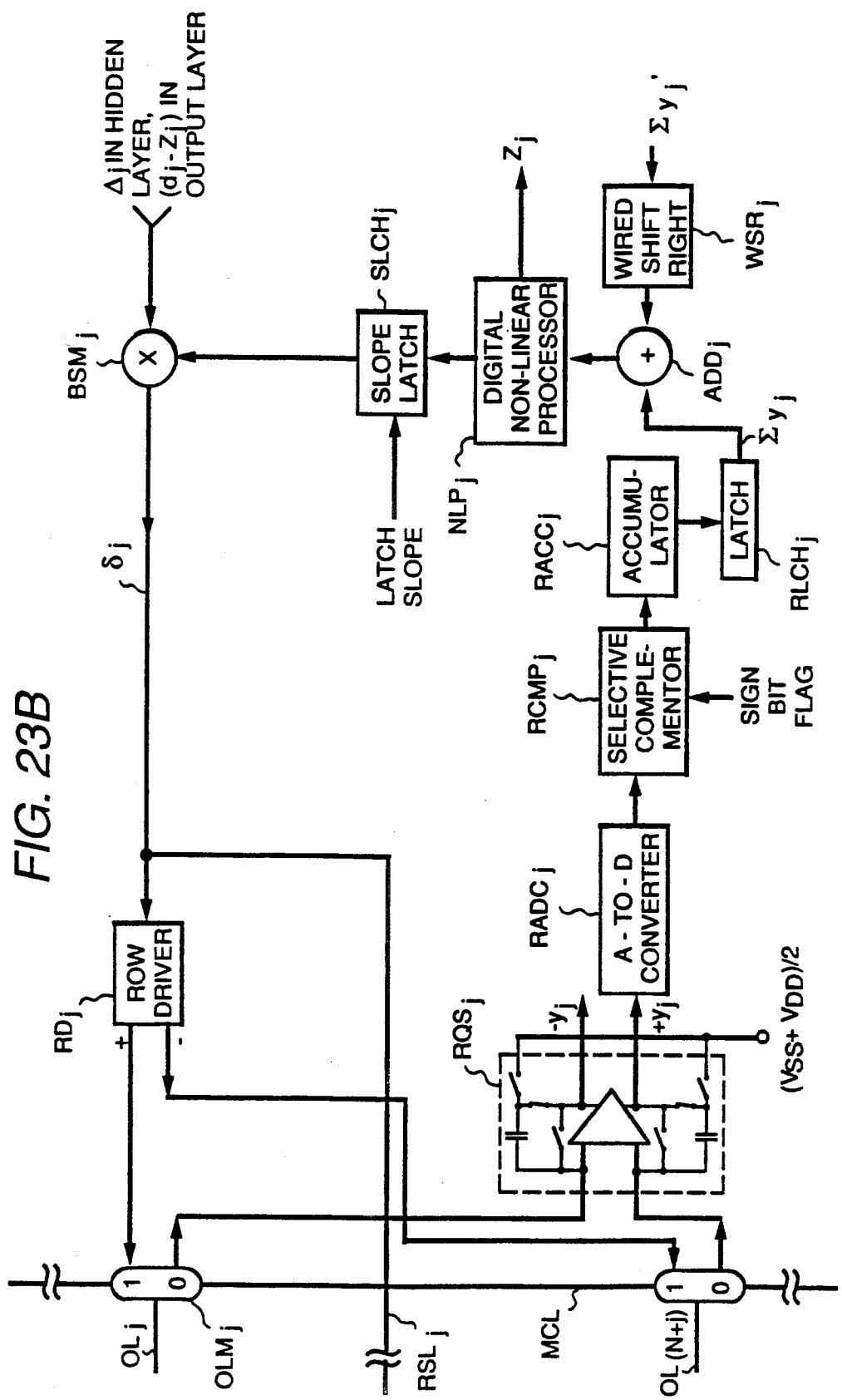

FIG. 23, comprising component FIGS. 23A and 23B shows an alternative modification that can be manifoldly made to a neural net using layers as shown in FIG. 16 to give it training capability. A respective up/down counter $UDC_{i,j}$ is used instead of each word storage element $WSE_{i,j}$ in this FIG. 23 alternative modification; and FIG. 23 differs from FIG. 16 in similar respects as FIG. 20 differs from FIG. 13 and as FIG. 21 differs from FIG. 14.

Figure 24A:
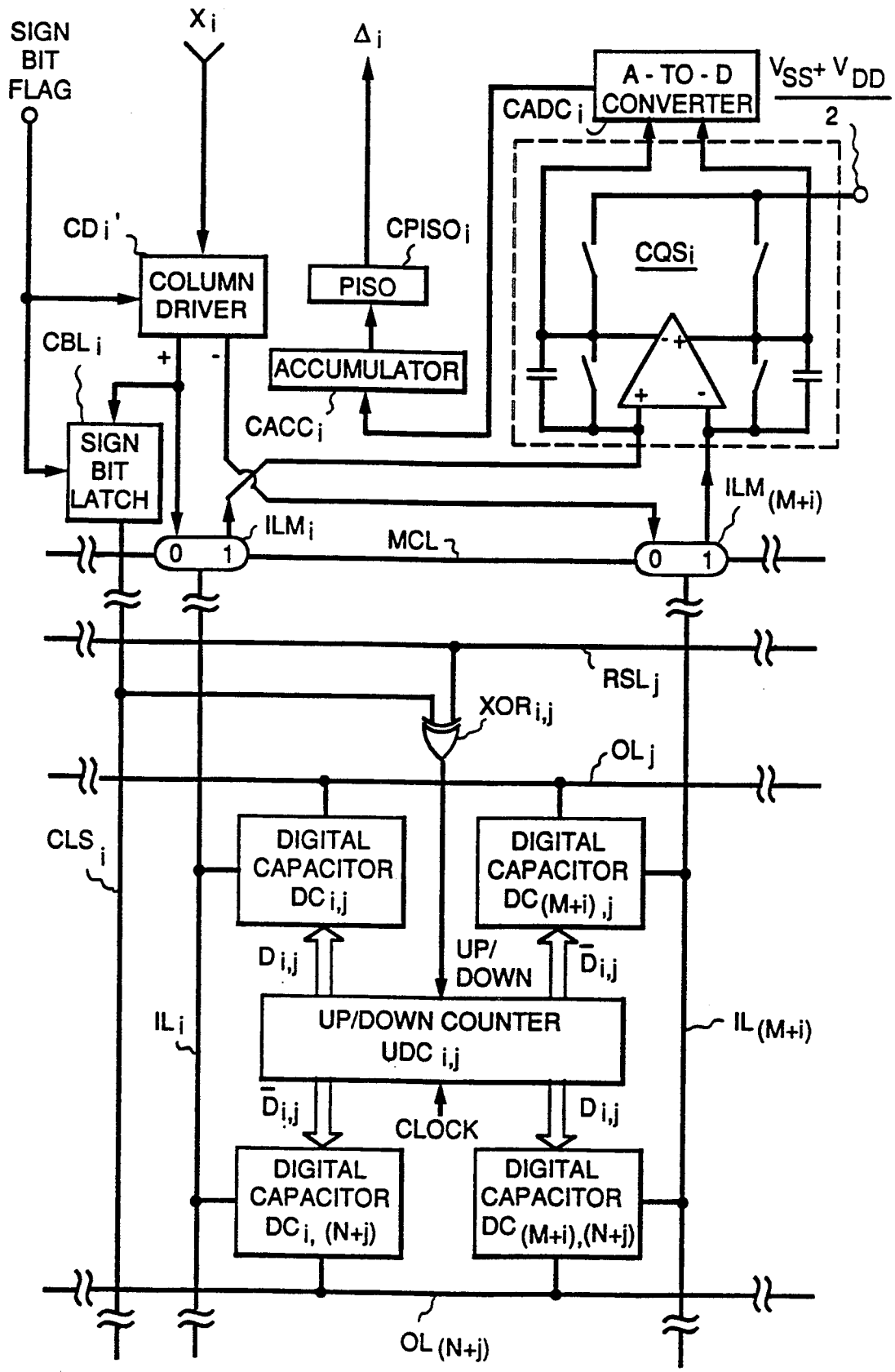
FIGS. 24A and 24B, arranged respectively on the left and on the right of the other, together form a FIG. 24 that is a schematic diagram of an alternative neural net layer in which both forward propagation and back propagation through a capacitive network are carried out with balanced signals, and in which digital capacitors have their capacitance values programmed from counters. In the FIG. 24 neural net layer the signs of the digital signals being weighted and summed are taken into account in the partial weighted summation procedure performed on an analog basis.
Figure 24B:
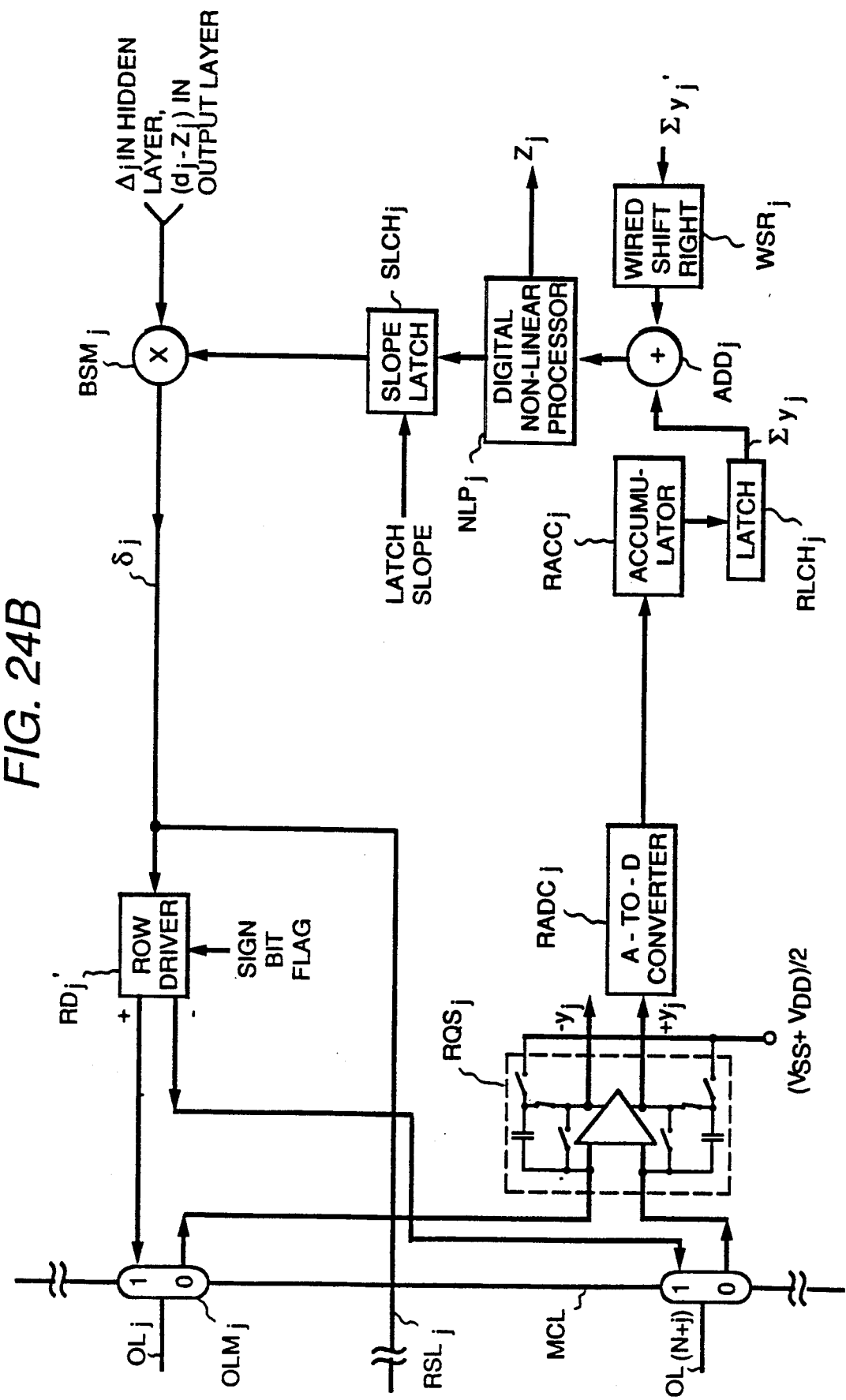

FIG. 24, comprising component FIGS. 24A and 24B shows an alternative modification that can be manifoldly made to a neural net using layers as shown in FIG. 17 to give it training capability. A respective up-/down counter $UDC_{i,j}$ is used instead of each word storage element $WSE_{i,j}$ in this FIG. 24 alternative modification; and FIG. 24 differs from FIG. 17 in similar respects as FIG. 21 differs from FIG. 14 and as FIG. 22 differs from FIG. 15. Hybrids of the FIGS. 23 and 24 neural net layers are possible, handling the sign bits of the digital input signals as in either one of the FIGS. 23 and 24 neural net layers and handling the sign bits of the digital error signals as in the other of the FIGS. 23 and 24 neural net layers.

Figure 25:
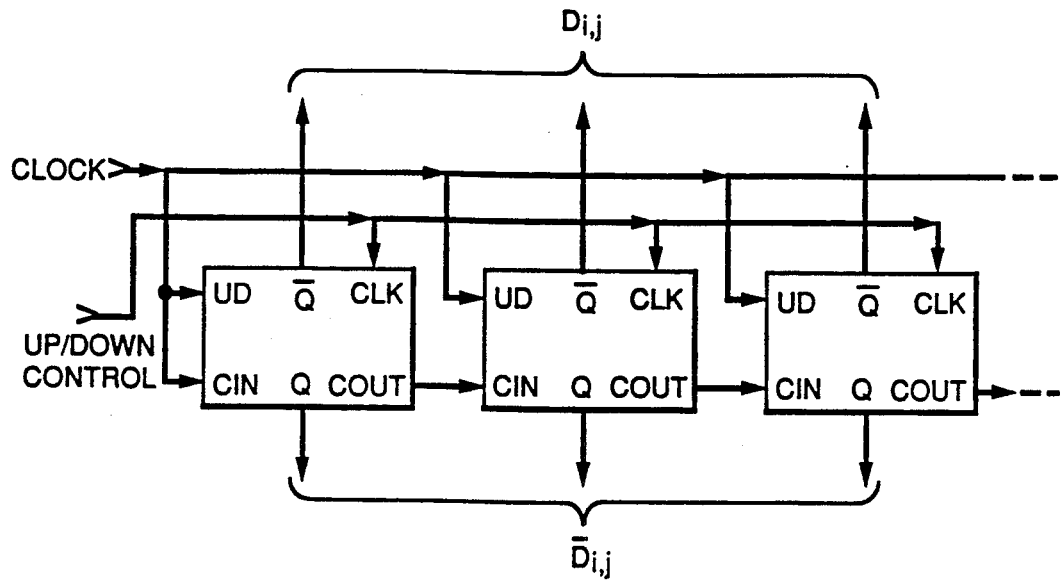
FIG. 25 is a schematic diagram of the arrangement of stages in the counters shown in FIGS. 20-24.
Figure 26:
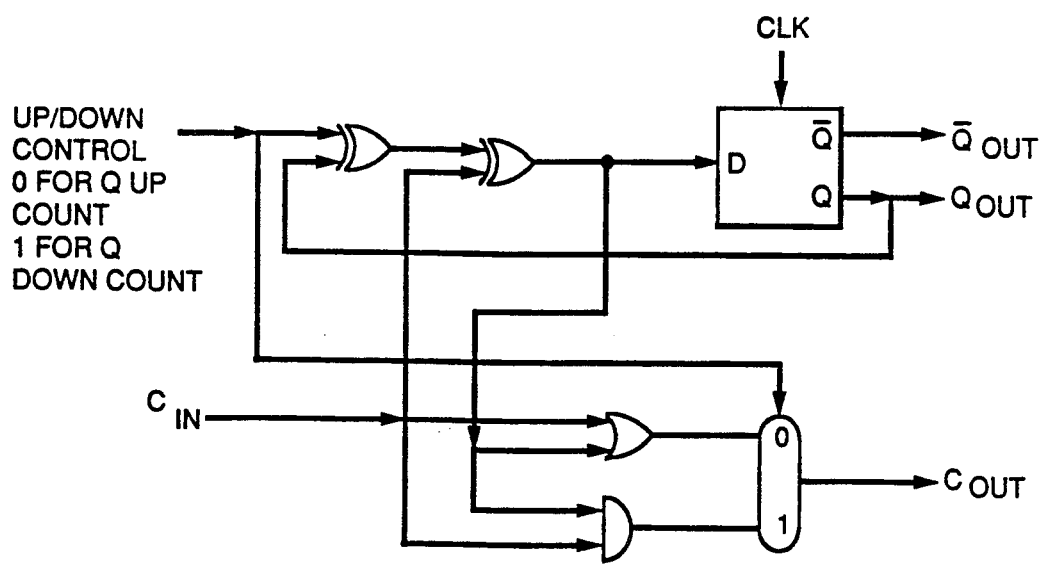
FIG. 26 is a schematic diagram of the logic elements included in each counter stage in the counters shown in FIGS. 20-25.

FIG. 25 shows the construction of counter $UDC_{i,j}$ being one that has a plurality of binary counter stages $BCS_1$, $BCS_2$, $BCS_3$ that provide increasingly more significant bits of the weight control signal $D_{i,j}$ and of its one's complement $\overline{D}_{i,j}$. FIG. 26 shows the logic within each binary counter stage which is implemented with MOS circuitry that is conventional in the art. FIGS. 25 and 26 make it clear that the opposite directions of counting for $D_{i,j}$ and $\overline{D}_{i,j}$ can be controlled responsive to a ZERO or ONE up/down control signal in either of two ways, depending on whether $D_{i,j}$ is taken from $\overline{Q}$ outputs of the flip-flops and $\overline{D}_{i,j}$ is taken from their Q outputs, as shown, or whether $D_{i,j}$ is taken from the Q outputs of the flip-flops and $\overline{D}_{i,j}$ is taken from their $\overline{Q}$ outputs. If the latter choice had been made instead, each counter control circuit $CON_{i,j}$ would have to consist of a respective exclusive-NOR circuit, or alternatively the $CSD_i$ and $RSD_j$ sign detectors would have to be of opposite logic types, rather than of the same logic type.

While bit-slicing the plural-bit digital synapse samples and processing the bit slices through the same capacitive weighting network is advantageous in that it provides good guarantee that the partial weighted summation results track are scaled in exact powers of two respective to each other, speedier processing can be required which necessitates bit-slicing be done on a spatial-division-multiplexing, rather than time-division multiplexing, basis. Each bit slice is then processed to generate a respective partial weighted summation result in a respective capacitive weighting network similar to the capacitive weighting networks respectively used to generate respective partial weighted summation results for the other bit slices, and a network of digital adders is used instead of an accumulator for generating each final weighted summation result by combining appropriately shifted partial weighted summation results.

One skilled in the art of digital design and acquainted with this and other disclosures by the inventor as catalogued in the "Background of the Invention" portion of this specification will be enabled to design readily a number of other type of preferred neural net layers, beside those shown in the drawing, that also incorporate digital circuitry of the type shown in FIG. 7, and this should be borne in specification. In particular, the analog circuits each having a sigmoidal response that are described in U.S. patent applications Ser. Nos. 546,970 and 561,404 may be replaced by analog-to-digital conversion apparatus for generating weighted summation results in digital form and digital circuits, each of the type shown in FIG. 7, for generating digital axonal responses to those weighted summation results.

variants of the preferred neural net layers shown in the drawing.

What is claimed is:

1. In a neural net comprising a plurality of neural net layers identified by respective ones of consecutive ordinal numbers zeroeth through $L^{th}$, the digital axonal output signals of each of said neural net layers except the zeroeth being supplied as respective ones of the digital synapse input signals of said neural net layer identified by next lower ordinal number, each of said neural net layers including respective means for bit-slicing respective digital synapse input signals supplied thereto, each of said neural net layers having for each of its digital axonal output signals a respective capacitive weighting network for generating an analog electric signal descriptive of a respective weighted summation of each bit-slice of its digital synapse input signals, the improvement wherein each neural net layer further comprises:

respective means corresponding to each said capacitive weighting network in that said neural net layer, for digitizing each successive said analog electric signal generated thereby to generate a corresponding digital response to each bit-slice of the digital synapse input signals to that said neural net layer;

a respective digital accumulator corresponding to each said capacitive weighting network in that said neural net layer for accumulating with appropriate weighting the corresponding digital responses to the bit-slices of the digital synapse input signals to that said neural net layer, said respective digital accumulator being reset to zero accumulation after the bit slices in each successive word of the digital synapse input signals are all accumulated to generate a respective final accumulation; and respective means corresponding to each digital accumulator for digitally non-linearly processing its respective final accumulation to generate a respective one of said digital axonal output signals of that said neural net layer, each of which means comprises;

means for determining the absolute value of the final accumulation in digital form of the corresponding digital accumulator;

a respective window comparator for determining into which of a plurality of amplitude ranges falls said absolute value of the final accumulation in digital form of the corresponding digital accumulator;

means for selecting a respective digital intercept value in accordance with the range into which said absolute value of the final accumulation in digital form of the corresponding digital accumulator is determined by its said respective window comparator to fall;

means for selecting a respective digital slope value in accordance with the range into which said absolute value of the final accumulation in digital form of the corresponding digital accumulator is determined by its said respective window comparator to fall;

means for multiplying said absolute value of of the final accumulation in digital form of the corresponding digital accumulator by said respective selected digital slope value to generate a respective digital product;

means for adding said respective digital product and said respective digital intercept value to generate an absolute value representation of said respective one of said digital axonal responses; and means for determining the polarity of its final accumulation in digital form and assigning the same polarity to said absolute value representation of said respective one of said digital axonal responses, thereby to generate said respective one of said digital axonal responses.

2. In a neural net capable of being trained during a training period of time separate from a succeeding period of time of normal operation, said neural net comprising a plurality of neural net layers identified by respective ones of consecutive ordinal numbers zeroeth through $L^{th}$, the digital axonal output signals of each of said neural net layers except the zeroeth being supplied as respective ones of the digital synapse input signals of said neural net layer identified by next lower ordinal number, each of said neural net layers including respective means for bit-slicing respective digital synapse input signals supplied thereto, each of said neural net layers having for each of its digital axonal output signals a respective capacitive weighting network including a respective set of digital weighting capacitors for each of its respective digital synapse input signals supplied thereto, each said respective capacitive weighting network for generating an analog electric signal descriptive of a respective weighted summation of each bit-slice of its digital synapse input signals, each of said neural net layers including a respective memory for temporarily storing respective binary codes written into word storage elements thereof for programming the values of the digital capacitors in each said set of digital capacitors, said neural net including training apparatus for re-writing during said training periods the respective binary codes temporarily stored in selected ones of said word storage elements of the respective memories of said neural net layers thereby to adjust the weighting provided by said sets of digital capacitors in their capacitive weighting networks, the improvement—wherein each neural net layer further comprises:

respective means corresponding to each said capacitive weighting network in that said neural net layer, for digitizing each successive said analog electric signal generated thereby to generate a corresponding digital response to each bit-slice of the digital synapse input signals to that said neural net layer;

a respective digital accumulator corresponding to each said capacitive weighting network in that said neural net layer for accumulating with appropriate weighting the corresponding digital responses to the bit-slices of the digital synapse input signals to that said neural net layer, said respective digital accumulator being reset to zero accumulation after the bit slices in each successive word of the digital synapse input signals are all accumulated to generate a respective final accumulation; and respective means corresponding to each digital accumulator for digitally non-linearly processing its respective final accumulation to generate a respective one of said digital axonal output signals of that said neural net layer—wherein each said respective means corresponding to each digital accumulator for digitally non-linearly processing its respective final accumulation to generate a respective one of said digital axonal output signals of that said neural net layer comprises:

means for determining the absolute value of the final accumulation in digital form of the corresponding digital accumulator;

a respective window comparator for determining into which of a plurality of amplitude ranges falls said absolute value of the final accumulation in digital form of the corresponding digital accumulator;

means for selecting a respective digital intercept value in accordance with the range into which said absolute value of the final accumulation in digital form of the corresponding digital accumulator is determined by its said respective window comparator to fall;

means for selecting a respective digital slope value in accordance with the range into which said absolute value of the final accumulation in digital form of the corresponding digital accumulator is determined by its said respective window comparator to fall;

means for multiplying said absolute value of the final accumulation in digital form of the corresponding digital accumulator by said respective selected digital slope value to generate a respective digital product;

means for adding said respective digital product and said respective digital intercept value to generate an absolute value representation of said respective one of said digital axonal responses; and means for determining the polarity of its final accumulation in digital form and assigning the same polarity to said absolute value representation of said respective one of said digital axonal responses, thereby to generate said respective one of said digital axonal responses—and wherein said training apparatus comprises for each respective one of said digital axonal responses of each of said zeroeth through $L^{th}$ neural net layers:

respective means for determining the slope of said sigmoidal system function associated with that said digital axonal response, as selected for a prescribed set of digital synapse input signals to said $L^{th}$ neural net layer;

means for supplying a respective input error signal in bit-serial form to said neural net layer generating that respective one of said digital axonal responses;

a respective digital multiplier for multiplying said respective input error signal supplied in bit-serial form to said neural net layer generating that respective one of said digital axonal responses, by the slope of said sigmoidal system function associated with that respective one of said digital axonal responses for said prescribed set of digital synapse input signals to said $L^{th}$ neural net layer, thereby to generate a respective digital product in bit-serial form; and means for back-propagating the successive bits of the immediately aforesaid respective digital product in bit-serial form through said weighting capacitive networks via routes traversed by the signals generating that respective one of said digital axonal responses.

3. In a neural net comprising a plurality of neural net layers identified by respective ones of consecutive ordinal numbers zeroth through $L^{th}$, each neural net layer for generating a respective set of digital axonal output signals responsive to a respective set of digital synapse input signals, the digital axonal output signals of each of said neural net layers except the zeroth being supplied as respective ones of the digital synapse input signals of said neural net layer identified by next lower ordinal number, each of said neural net layers including a plurality of neural circuits connected for generating their respective digital axonal responses to its said respective set of synapse input signals, the improvement wherein each neural circuit comprises:

means for performing a weighted summation of said respective set of synapse input signals to generate a weighted summation result in digital form;

means for determining the absolute value of said weighted summation result in digital form;

a window comparator including means for subtracting predetermined constant values from said absolute value of said weighted summation result to produce difference output signals indicative of which of a plurality of amplitude ranges falls said absolute value of said weighted summation result in digital form;

means connected with said subtracting means for selecting a digital intercept value in accordance with the range into which said absolute value of said weighted summation result in digital form is determined by said window comparator to fall, as indicated by said difference output signals;

means connected with said subtracting means for selecting a digital slope value in accordance with the range into which said absolute value of said weighted summation result in digital form is determined by said window comparator to fall, as indicated by said difference output signals;

means for multiplying said absolute value of said weighted summation result in digital form by said selected digital slope value to generate a digital product;

means for adding said digital product and said digital intercept value to generate an absolute value representation of said digital axonal response; and means for determining the polarity of said weighted summation result in digital form and assigning the same polarity to said absolute value representation of said digital axonal response, thereby to generate said digital axonal response.

4. In a neural net capable of being trained during a training period of time separate from a succeeding period of time of normal operation, said neural net comprising a plurality of neural net layers identified by respective ones of consecutive ordinal numbers zeroeth through $L^{th}$, each neural net layer for generating a respective set of digital axonal output signals responsive to a respective set of digital synapse input signals, the digital axonal output signals of each of said neural net layers except the zeroeth being supplied as respective ones of the digital synapse input signals of said neural net layer identified by next lower ordinal number, each of said neural net layers having for each of its digital axonal output signals a respective capacitive weighting network including a respective set of digital weighting capacitors for each of its respective digital synapse input signals supplied thereto, each said respective capacitive weighting network for generating an analog electric signal descriptive of a respective weighted summation of its digital synapse input signals, each of said neural net layers including a respective memory for temporarily storing respective binary codes written into word storage elements thereof for programming the values of the digital capacitors in each said set of digital capacitors, said neural net including training apparatus for rewriting during said training periods the respective binary codes temporarily stored in selected ones of said word storage elements of the respective memories of said neural net layers thereby to adjust the weighting provided by said sets of digital capacitors in their capacitive weighting networks, the improvement—wherein each neural net layer further comprises:

means for generating a respective digital response corresponding to each analog electric signal descriptive of a respective weighted summation of the digital synapse input signals for that said neural net layer and a respective neural circuit for generating from each respective digital response a respective one of said digital axonal output signals, said respective neural circuit comprising:

means for determining the absolute value of said respective digital response;

a window comparator for determining into which of a plurality of amplitude ranges falls said absolute value of said respective digital response;

means for selecting a digital intercept value in accordance with the range into which said absolute value of said respective digital response is determined by said window comparator to fall;

means for selecting a digital slope value in accordance with the range into which said absolute value of said respective digital response is determined by said window comparator to fall;

means for multiplying said absolute value of said respective digital response by said selected digital slope value to generate a digital product;

means for adding said digital product and said digital intercept value to generate an absolute value representation of the digital axonal response of said respective neural circuit; and means for determining the polarity of said weighted summation result in digital form and assigning the same polarity to said absolute value representation of said digital axonal response, thereby to generate the digital axonal response of said respective neural circuit—and wherein said training apparatus comprises for each respective one of said digital axonal responses of each of said zeroeth through $L^{th}$ neural net layers:

respective means for determining the slope of said sigmoidal system function associated with that said digital axonal response, as selected for a prescribed set of digital synapse input signals to said $L^{th}$ neural net layer;

means for supplying a respective input error signal to said neural net layer generating that respective one of said digital axonal responses;

a respective digital multiplier for multiplying said respective input error signal to said neural net layer generating that respective one of said digital axonal responses, by the slope of said sigmoidal system function associated with that respective one of said digital axonal responses for said prescribed set of digital synapse input signals to said $L^{th}$ neural net layer, thereby to generate a respective digital product; and means for back-propagating the immediately aforesaid respective digital product through said weighting capacitive networks via routes traversed by the signals generating that respective one of said digital axonal responses.

* * * * *